United States Patent
Kuno et al.

(10) Patent No.: US 6,584,552 B1
(45) Date of Patent: Jun. 24, 2003

(54) RECORDING/REPRODUCING APPARATUS, PROGRAM RECORDED MEDIUM, RECORDED MEDIUM, CACHE DEVICE, AND TRANSMITTER

(75) Inventors: Yoshiki Kuno, Moriguchi (JP); Takuya Nishimura, Osaka (JP); Hideaki Takechi, Osaka (JP); Masazumi Yamada, Moriguchi (JP); Hiroyuki Iitsuka, Katano (JP); Shoichi Goto, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/582,800

(22) PCT Filed: Oct. 29, 1999

(86) PCT No.: PCT/JP99/06000

§ 371 (c)(1),
(2), (4) Date: Jun. 30, 2000

(87) PCT Pub. No.: WO00/26910

PCT Pub. Date: May 11, 2000

(30) Foreign Application Priority Data

Nov. 2, 1998 (JP) .......................... 10-312595
Nov. 2, 1998 (JP) .......................... 10-312596
Mar. 29, 1999 (JP) .......................... 11-087007

(51) Int. Cl.$^7$ .............................................. G06F 12/14
(52) U.S. Cl. ........................................................ 711/163
(58) Field of Search .............................. 711/163; 386/94

(56) References Cited

U.S. PATENT DOCUMENTS

| 5,689,559 | A | | 11/1997 | Park |
| 5,761,302 | A | | 6/1998 | Park |
| 5,799,081 | A | | 8/1998 | Kim et al. |
| 5,987,126 | A | * | 11/1999 | Okuyama et al. ............... 380/5 |
| 6,118,871 | A | * | 9/2000 | Okuyama et al. ............ 380/201 |
| 6,223,285 | B1 | * | 4/2001 | Komuro et al. .............. 713/160 |

FOREIGN PATENT DOCUMENTS

| EP | 0 789 361 | 8/1997 |
| EP | 0 800 312 | 10/1997 |
| EP | 0 860 823 A1 | 8/1998 |
| JP | 10-74362 | 3/1989 |
| JP | 5-258463 | 10/1993 |
| JP | 7-230667 | 8/1995 |
| JP | 10-79174 | 3/1998 |
| JP | 10-224752 | 8/1998 |

OTHER PUBLICATIONS

The First Office Action (PCT Application in the National Phase), for Application No. 99803661.7, Date of Dispatch Nov. 22, 2002 (English Translation Provided).
Japanese search report for PCT/JP99/06000 dated Feb. 1, 2000.

* cited by examiner

Primary Examiner—Kevin L. Ellis
(74) Attorney, Agent, or Firm—RatnerPrestia

(57) ABSTRACT

A recording and reproducing apparatus is characterized in that said apparatus has: inputting means for receiving a packet data which is based on IEEE 1394, and in which signal information for indicating copy right information of an AV data (hereinafter, referred to as EMI) is provided in a header of a packet according to IEEE 1394; and recording and reproducing means for recording and reproducing an AV data and the EMI which are held in the packet data received by said inputting means. Four kinds of EMI are used, and, when an AV data indicating allowance "copy one generation" among them is to be recorded, said recording and reproducing means performs recording while rewriting the EMI to EMI indicating "no more copy."

24 Claims, 54 Drawing Sheets

103,105,107  AV data
108,110,     AV data

Fig. 44
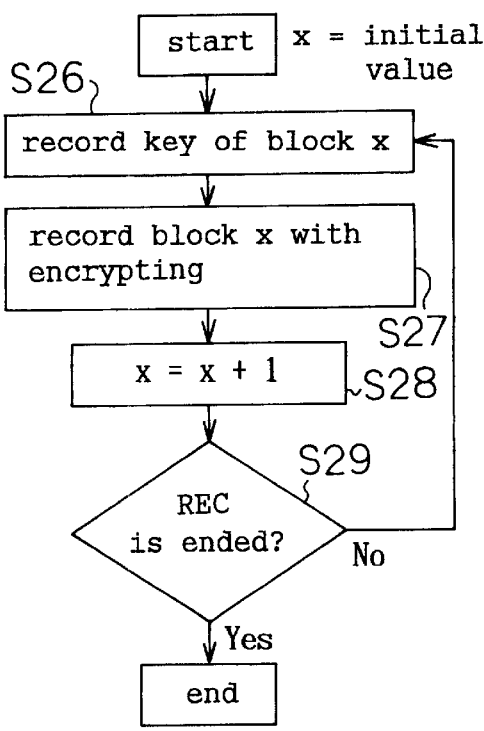
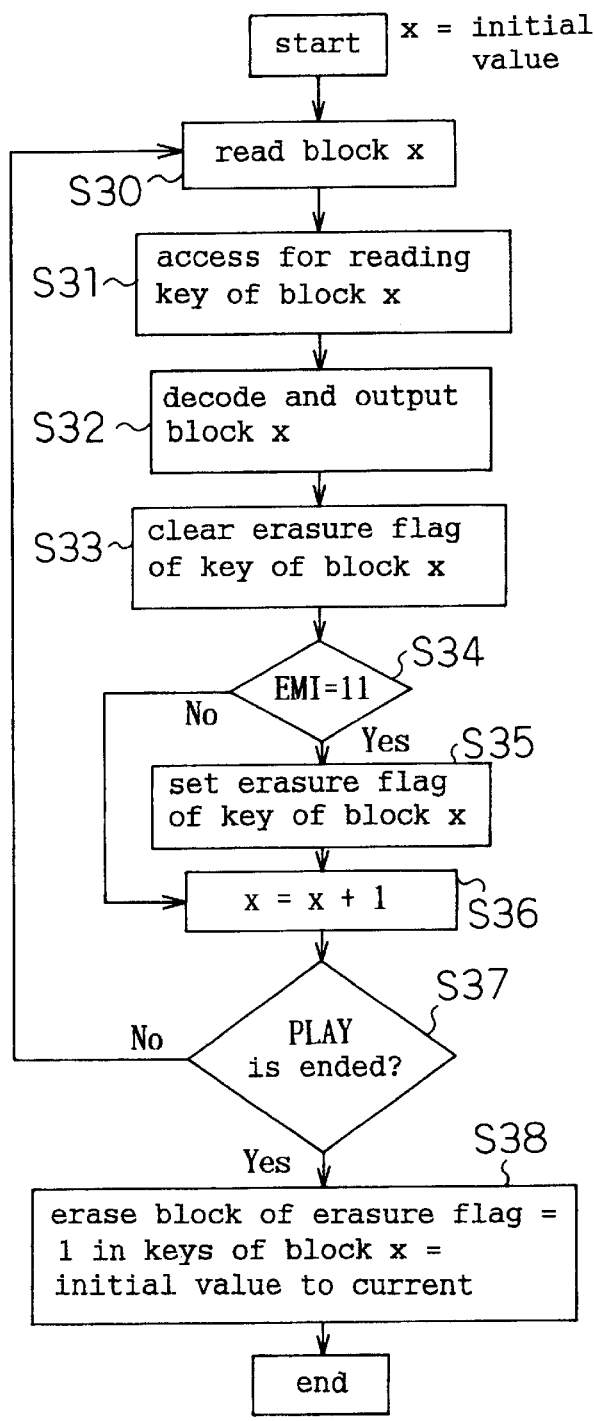

RECORDING/REPRODUCING APPARATUS, PROGRAM RECORDED MEDIUM, RECORDED MEDIUM, CACHE DEVICE, AND TRANSMITTER

This application is a U.S. national phase application of PCT international application PCT/JP99/06000.

TECHNICAL FIELD

The present invention relates to a recording and reproducing apparatus in the case where EMI information of an AV data is added to the AV data, a recording and reproducing apparatus in the case where copy right information of an AV data is added to the AV data, and a caching apparatus which handles a copyrighted data in the case where plural apparatuses are connected, a transmitting apparatus, and a program recording medium.

BACKGROUND ART

Demands for a home multimedia system and a home network are rapidly rising in the wave of digitization. In an office and a business system, needs for digitization and a multimedia system are rising at a higher degree than those in a home system. In such a situation, recently, attention is given to IEEE 1394-1995. This is a standard for a high speed serial bus which was standardized by IEEE in 1995 while focusing on a physical layer and a link layer, and also a hardware and software standard for data transfer of 100 Mbps, 200 Mbps, and 400 Mbps. IEEE 1394 has characteristic functions for plug and play and multimedia data transfer. Specifically, it is provided with isochrpnous data transfer in which a band for transferring data such as a video or audio data is ensured to enable real time transfer. Furthermore, a control program of a PC connected through an IEEE 1394 bus can simultaneously perform controls of video data of a digital camera or the like (switching of video data, and a control of the camera) by means of IEEE 1394 control commands (asynchronous data).

When a digital AV data flowing through IEEE 1394-1995 which is a standard as described above is to be recorded in a recording and reproducing apparatus, it is conventionally judged whether the data is an AV data which can be copied or not, based on a CGMS (Copy Generation Management System) which is embedded into a stream.

A CGMS exists in a transport stream which is sent from a broadcasting station. A CGMS is a 2-bit data. A CGMS takes the following values, and the meanings of the values are as follows.

Namely, when CGMS=11, it means "copy never"; when CGMS=10, it means "copy one generation"; and, when CGMS=00, it means "copy free." There is no CGMS=01. In the above, "copy never" means copy inhibit, and permits only viewing or listening of the AV data, "copy one generation" permits only a copy of one generation, or allows a copied AV data to be repeatedly viewed or listened any number of times, and "copy free" means that the data can be freely copied.

A DVC which records and reproduces a DV stream among digital AV data flowing through IEEE 1394-1995 has a DV stream decoder, extracts a CGMS from a predetermined position of the stream, and judges whether a copy is permitted or not. If CGMS=11 or "copy never," recording of the AV data is not performed. In an apparatus having a configuration in which no internal decoder is disposed, only recording and reproduction of a data are performed, and decoding of an AV data is committed to an external decoder, such as a DVHS, an HDD, or a DVD-RAM which records and reproduces an MPEG2 transport stream, a transport stream decoder circuit or the like is necessary for detecting a CGMS, and hence the hardware configuration is complicated.

In a digital broadcast stream using an MPEG2 transport stream, particularly, the place where a CGMS is to be embedded is varied depending on the service provider. In many cases, such a place is not made public. Even when a transport stream decoder circuit is provided, therefore, a CGMS cannot be sometimes detected.

On the other hand, when signal information for sending copy right information (hereinafter, referred to as EMI) is added into a header of an IEEE 1394 packet data, hardware such as a transport stream decoder circuit is not necessary.

EMI takes the following values. Namely, when EMI=11, it means "copy never"; when EMI=10, it means "copy one generation"; and, when EMI=00, it means "copy free." Furthermore, when EMI=01, it means "no more copy." In the above, "copy never" means copy inhibit, and permits only viewing or listening of the AV data, "copy one generation" permits only a copy of one generation, or allows a copied AV data to be repeatedly viewed or listened any number of times, and "copy free" means that the data can be freely copied. Moreover, "no more copy" means an AV data after copying an AV data of "copy one generation," or prohibition of further copying.

In IEEE 1394, such EMI is used for designating a method of encryption, and that of authentication. In "copy free" in the case of EMI=00, for example, encryption is not performed in transmission of an AV data. In "copy one generation" in the case of EMI=10 and "no more copy" in the case of EMI=11, a key used in encryption, and a method of authenticating an apparatus are different from those in "copy never" in the case of EMI=11.

EMI is produced from a CGMS by an STB (Set Top Box: a satellite broadcasting receiver). Namely, a CGMS is added to a data in a broadcasting station, and an STB which receives a broadcast wave transmitted from the broadcasting station sends a received program to an IEEE 1394 bus. At this time, the CGMS is embedded into a portion of service information of an MPEG2 transport stream of an isochronous packet data. In one isochronous packet data, plural MPEG data are stored, and corresponding CGMSs exist for the MPEG data, respectively.

EMI is produced from such a CGMS by the STB. The STB checks a CGMS of each data of the MPEG2 transport stream received from the broadcasting wave [sic; broadcasting station], and, as its typical value, gives one EMI to one isochronous packet data. The EMI is held in a header portion of the isochronous packet data.

The value of the EMI is equal to that of a CGMS in which the copyright is most severely restricted, among CGMSs of data existing in data of the received MPEG2 transport stream. When CGMSs of data in data of the received MPEG2 transport stream are 11, 10, and 10, for example, the value of the EMI is 11 in which the restriction is most severe. When CGMSs are 10, 10, 00, and 00, the value of the EMI is 10 in which the restriction is most severe, among them. In this way, the value of EMI is determined.

Conventionally, when a CGMS indicates that the contents of a copyright are "copy never," the corresponding data can be viewed or listened only once, but the time zone when viewing or listening is allowed is limited to that when the program is broadcast. In the case where the author intends to permit only one time of viewing or listening, therefore, also the time zone when viewing or listening is allowed is limited. In other words, even when a user wishes to view or listen a program in a time zone convenient for the user, the user is allowed to view or listen the program, only in the time zone when the program is broadcast. In the case where a CGMS indicates that the contents of a copyright are "copy one generation," when a data is once recorded onto a certain recording medium, the data cannot be thereafter moved into another recording medium.

In the case where an apparatus is configured so as not to have a transport decoder, the contents of a copyright are judged by using EMI. The same process as in the case of a CGMS applies also to the case of using EMI.

Conventionally, EMI added to the header of an IEEE 1394 packet data is deleted together with the header of the packet data when an AV data is output into a recording apparatus. Therefore, EMI is not recorded into the recording apparatus. This causes a problem in that, when an AV data is to be output, it is impossible to judge the contents of a copy right of the AV data, and which key and authentication method are to be used.

Even when EMI is recorded onto a recording medium by any method, there is a problem in that the user can tamper with the recorded EMI to modify the terms of the copy right.

In consideration of the problem in that, in the case where EMI is deleted without being recorded into a recording and reproducing apparatus, it is impossible to know copy right of an AV data in reproduction and which method of encryption is to be used, and the problem in that, in the case where EMI is recorded into a recording and reproducing apparatus, the user can easily tamper with the EMI, it is an object of the invention to provide a recording and reproducing apparatus in which EMI is recorded in a recording process, and the user cannot easily tamper with the recorded EMI, so that an AV data cannot be unauthorizedly used.

Conventionally, in the case where a CGMS indicates that copy right information is "copy never," the corresponding AV data can be viewed or listened only once, but the time zone when viewing or listening is allowed is limited to that when the program is broadcast. In the case where the author intends to permit only one time of viewing or listening, therefore, also the time zone when viewing or listening is allowed is limited. In other words, there is a problem in that, even when a user wishes to view or listen a program in a time zone convenient for the user, the user is allowed to view or listen the program, only in the time zone when the program is broadcast.

In the case where a CGMS indicates that copy right information is "copy one generation," when an AV data is once recorded onto a certain recording medium, the AV data cannot be moved into another recording medium.

It is an object of the invention to provide a recording and reproducing apparatus and a program recording medium in which, in the case where information indicative of copy right information of a program indicates copy inhibit, a user can view or listen an AV data in accordance with the intention of the author that viewing or listening is permitted only once, and the user can view or listen the AV data without limiting a time zone after the AV data is broadcast.

It is an object of the invention to provide a recording and reproducing apparatus and a program recording medium in which, in the case where copy right information of a program permits only one time of copying, an AV data can be moved from a recording medium into which the data is once recorded, to another recording medium.

Furthermore, conventionally, plural various apparatuses are connected to an IEEE 1394 bus to exchange data. In the case where such a recording and reproducing apparatus exchanges a copyrighted data with another apparatus, there is a problem in that the copyright cannot be protected in accordance with the intention of the author.

For example, there arises the case where the recording and reproducing apparatus records a data in which the contents of the copyright are "copy never," and thereafter plural apparatuses having the same function as the recording and reproducing apparatus simultaneously acquire the data from the recording and reproducing apparatus and record the data. In this case, the data of "copy never" is recorded into the plural apparatuses, and the data can be viewed or listened plural times, with the result that the copyright cannot be protected in accordance with the intention of the author that only one time of viewing or listening is permitted. Furthermore, there arises the case where the recording and reproducing apparatus records a data in which the contents of the copyright are "copy never," and thereafter a monitor and an apparatus having the same function as the recording and reproducing apparatus acquire the data. In this case, after the data is viewed or listened one time by using the monitor, the recording and reproducing apparatus can reproduce only once the data so that the data can be viewed or listened one more time. Therefore, the copyright cannot be protected in accordance with the intention of the author that only one time of viewing or listening is permitted. In the case where plural such recording and reproducing apparatuses are connected to a transmitting apparatus such as an STB, having a function of receiving a broadcast wave and transmitting the received data to another apparatus, when a data in which the contents of the copyright are "copy never" is sent from the transmitting apparatus, the plural recording and reproducing apparatuses record the data, and the data can be viewed or listened plural times. As a result, the copyright cannot be protected in accordance with the intention of the author that only one time of viewing or listening is permitted.

Some of such transmitting apparatuses have an analog terminal so that an analog monitor is connected to the analog terminal and a video or audio data sent from a broadcasting station can be viewed or listened. There is a problem in that, in the case where the recording and reproducing apparatus exists when such an apparatus outputs a data, the copyright cannot be protected in accordance with the intention of the author.

When such an apparatus outputs a copyrighted data to an IEEE 1394 bus to which the recording and reproducing apparatus is connected, the data is once viewed or listened through the analog monitor, and then recorded into the recording and reproducing apparatus connected to the IEEE 1394 bus, with the result that the data can be viewed or listened two times. Therefore, the intention of the author that only one time of viewing or listening is permitted is not protected.

As described above, a prior art apparatus which reproduces only once a copyrighted data without changing the contents of the copyright involves various problems such as those described above. In the specification, an apparatus which solves these problems is referred to as a caching apparatus.

In consideration of the problem in that, in the case where plural apparatuses including an apparatus which reproduces only once a copyrighted data without changing the contents of the copyright are connected, the copyright cannot be protected in accordance with the intention of the author, and the problem in that, also in the case where a monitor is connected to a monitor terminal, when the apparatus outputs a copyrighted data, the copyright cannot be protected in accordance with the intention of the author, it is an object of the invention to provide a caching apparatus, a transmitting apparatus, and a program recording medium in which, with respect to a copyrighted data, the copyright can be protected in accordance with the intention of the author, the data can be viewed or listened in an arbitrary time zone other than a time zone when the data is broadcast, and, even in the case where a monitor terminal is disposed and a monitor is connected to the terminal, when the data is copyrighted, the copyright can be protected in accordance with the intention of the author.

DISCLOSURE OF INVENTION

One aspect of the present invention is a recording and reproducing apparatus characterized in that said apparatus comprises:

inputting means for receiving a packet data which is based on IEEE 1394, and in which signal information for indicating copy right information of an AV data (hereinafter, referred to as EMI) is provided in a header of a packet according to IEEE 1394; and recording and reproducing means for recording and reproducing an AV data and the EMI which are held in the packet data received by said inputting means.

Another aspect of the present invention is a recording and reproducing apparatus according to the 1st invention, characterized in that four kinds of EMI are used, and, when an AV data indicating allowance "copy one generation" among them is to be recorded, said recording and reproducing means performs recording while rewriting the EMI to EMI indicating "no more copy."

Still another aspect of the present invention is a recording and reproducing apparatus according to the 1st invention, characterized in that said recording and reproducing means records the EMI into an area which a user cannot access.

Yet another aspect of the present invention is a recording and reproducing apparatus, characterized in that said area which a user cannot access is an area which cannot be accessed in the unit of LBA (logical block address), an area in which an area which can be accessed in the unit of LBA is limited, an alternate sector area, an area (AUX) other than an area which is to be reproduced as an AV data, a RAM added to a recording medium, a header area of an optical disk, a power calibration area, a recording management area, a lead-in area, or a lead-out area.

Yet another aspect of the present invention is a recording and reproducing apparatus according to the 1st invention, characterized in that, when the AV data is to be recorded, said recording and reproducing means records the AV data and the EMI in a same area with pairing the AV data and the EMI.

A further aspect of the present invention is a recording and reproducing apparatus according to the 1st invention, characterized in that, when the AV data is to be recorded, said recording and reproducing means records the AV data and the EMI in different areas with pairing the AV data and the EMI.

A still further aspect of the present invention is a recording and reproducing apparatus according to the 1st invention, characterized in that, in a case where the AV data indicates that the AV data is not "copy free," when the AV data is to be recorded, said recording and reproducing means records the AV data in plaintext.

A yet further aspect of the present invention is a recording and reproducing apparatus according to the 1st invention, characterized in that said apparatus further comprises recording encrypting means for encrypting an AV data by encryption, modulation, or a change of a recording format, and, in the case where the AV data indicates that the data is not "copy free," when the AV data is to be recorded, said recording and reproducing means records an AV data which is encrypted by said recording encrypting means.

A still yet further aspect of the present invention is a recording and reproducing apparatus, characterized in that, during recording, said recording encrypting means encrypts an AV data so that a kind of encryption and/or a key are different in accordance with a value of the EMI.

An additional aspect of the present invention is a recording and reproducing apparatus according to the 1st invention, characterized in that, in a case where authentication with respect to an apparatus which sends out the AV data succeeds, said recording and reproducing means sets the EMI so as to be accessable by a user, and, in a case where the authentication does not succeed, records EMI in an area which the user cannot access.

Still an additional aspect of the present invention is a recording and reproducing apparatus, characterized in that, when the AV data is to be recorded, said recording and reproducing means records EMI in an area which a user can access, restricts execution of a user access command for enabling the user to access the EMI, thereby disabling the user to access the EMI.

Yet an additional aspect of the present invention is a recording and reproducing apparatus, characterized in that, in a case where authentication with respect to an apparatus which sends out the AV data succeeds, said recording and reproducing means allows execution of the user access command to enable the user to access the EMI, and, in a case where the authentication with respect to the apparatus which sends out the AV data does not succeed, does not allow execution of the user access command.

A still yet additional aspect of the present invention is a recording and reproducing apparatus, characterized in that, when the AV data is to be reproduced, in a case where EMI indicates that the AV data is not "copy free," said recording and reproducing means encrypts the AV data and then outputs the encrypted data.

One aspect of the present invention is a recording and reproducing apparatus, characterized in that, when the AV data is to be reproduced, in the case where the EMI indicates that the AV data is not "copy free" and authentication with respect to an apparatus of a reproduction destination has not yet succeeded, said recording and reproducing means does not output the AV data, and outputs an invalid data, and in the case where the EMI indicates that the AV data is not "copy free" and authentication with respect to the apparatus of a reproduction destination succeeds, said recording and reproducing means outputs the AV data.

Another aspect of the present invention is a program recording medium characterized in that said medium stores a program for causing a computer to execute a whole or a part of functions of said recording and reproducing apparatus.

Still another aspect of the present invention is a recording medium characterized in that said medium records the EMI.

Yet another aspect of the present invention is a recording and reproducing apparatus characterized in that said apparatus comprises:

recording means for recording an AV data; and reproducing means for, in the case where the data is copyrighted, reproducing only once the data without changing contents of a copyright of the data which is recorded by said recording means.

Still yet another aspect of the present invention is a recording and reproducing apparatus-characterized in that said apparatus comprises:

recording means for recording an AV data; and reproducing means for, in the case where signal information indicating copy right information of the AV data shows "copy never" allowing viewing or listening to be performed only once, reproducing only once the AV data which is recorded by said recording means.

A further aspect of the present invention is a recording and reproducing apparatus characterized in that said apparatus comprises:

recording means for recording an AV data; and reproducing means for, in the case where signal information indicating copy right information of the AV data shows "copy one generation" allowing copying to be performed only once, reproducing only once the AV data while setting signal information indicating copy right information of the AV data which has been copied once by said recording means, to "copy one generation" allowing copying to be again performed only once.

A still further aspect of the present invention is a recording and reproducing apparatus, characterized in that the copy right information is held as EMI in a header of a packet according to IEEE 1394, and sent to said apparatus as a packet data on the basis of IEEE 1394.

A 21st invention of the present invention (corresponding to claim 21) is a recording and reproducing apparatus according to the 18th or 19th invention, characterized in that the copy right information is a CGMS which is embedded into a content of a packet according to IEEE 1394, and sent to said apparatus as a packet data on the basis of IEEE 1394.

A still yet further aspect of the present invention is a recording and reproducing apparatus according, characterized in that, in the case where the copy right information shows "copy never" or "copy one generation," when the AV data is to be recorded, said recording means adds reproduction information indicating that the data has not yet been reproduced, and in the case where the copy right information shows "copy never" or "copy one generation," when the AV data is to be reproduced, said reproducing means adds the reproduction information indicating that the data has already been reproduced, to a reproduced portion of the AV data, thereby discriminating the portion from a not-yet-reproduced portion of the AV data.

An additional aspect of the present invention is a recording and reproducing apparatus, characterized in that, in the case where the copy right information shows "copy never" or "copy one generation," when the AV data is to be reproduced, said reproducing means deletes allocation information relating to the AV data on a recording medium, and sets an area occupied by the AV data to a space area.

Still an additional aspect of the present invention is a recording and reproducing apparatus, characterized in that, in the case where the copy right information shows "copy never" or "copy one generation," when the AV data is to be reproduced, said reproducing means erases a recording portion on a recording medium in which the AV data is recorded.

Yet an additional aspect of the present invention is a recording and reproducing apparatus, characterized in that said recording means records the AV data and the reproduction information into a same area with being correlated with each other.

Still yet an additional aspect of the present invention is a recording and reproducing apparatus, characterized in that said recording means records the AV data and the reproduction information into different areas with being correlated with each other.

One aspect of the present invention is a recording and reproducing apparatus, characterized in that said recording means records the reproduction information into an area which a user cannot access.

Another aspect of the present invention is a recording medium characterized in that said medium records the reproduction information.

Still another aspect of the present invention is a recording and reproducing apparatus, characterized in that, when the AV data is to be reproduced, in the case where the copy right information shows that the AV data is "copy never" or "copy one generation," when the reproduction information shows that a whole or a part of the AV data has not yet been reproduced, said reproducing means encrypts the AV data in the portion and then outputs the encrypted data.

Yet another aspect of the present invention is a recording and reproducing apparatus, characterized in that, when the AV data is to be reproduced, in the case where the copy right information shows that the AV data is "copy never" or "copy one generation," when the reproduction information shows that a whole or a part of the AV data has already been reproduced, said reproducing means encrypts the AV data in the portion and then outputs the encrypted data, and does not output a key for decoding.

Still yet another aspect of the present invention is a recording and reproducing apparatus, characterized in that, when the AV data is to be reproduced, in the case where the copy right information shows "copy never" or "copy one generation," when the reproduction information shows that a whole or partial portion of the AV data has already been reproduced, said reproducing means does not output the AV data in the part, and outputs an invalid data.

A further aspect of the present invention is a recording and reproducing apparatus, characterized in that said apparatus has:

time-variant key producing means for producing a series of keys which are changed with a passage of time;

recording encrypting means for encrypting the AV data by using the key; and reproduction decoding means for decoding the encrypted AV data, when the AV data is to be recorded, in the case where the copy right information shows "copy never" or "copy one generation" said recording encrypting means sequentially encrypts the AV data by using the key produced by said time-variant key producing means, said recording means records the key and the AV data with correlating with each other, when the AV data is to be reproduced, in the case where the copy right information shows "copy never" or "copy one generation," said reproducing means fetches the encrypted AV data and the key, and erases a recording portion of the fetched key, and said reproduction decoding means decodes the encrypted AV data by using the fetched key.

A still further aspect of the present invention is a recording and reproducing apparatus, characterized in that, when the recording portion of the fetched key is to be erased, said reproducing means deletes an information related to a recorded position of said key on the medium.

A yet further aspect of the present invention is a recording and reproducing apparatus, characterized in that said apparatus has:

time-variant key producing means for producing a series of keys which are changed with a passage of time;

recording encrypting means for encrypting the AV data by using the key; and reproduction decoding means for decoding the encrypted AV data, when the AV data is to be recorded, in the case where the copy right information shows "copy never" or "copy one generation," said recording encrypting means sequentially encrypts the AV data by using the key produced by said time-variant key producing means, said recording means records the key and the AV data with correlating with each other, and performs recording with adding key reading out information indicating that the key have not yet been read out, when the AV data is to be-reproduced, in the case where the copy right information shows "copy never" or "copy one generation," said reproducing means fetches the encrypted AV data and the key, and adds the key reading out information indicating that the fetched key has already been read out, and said reproduction decoding means decodes the encrypted AV data by using the fetched key.

A still yet further aspect of the present invention is a recording and reproducing apparatus, characterized in that said recording means records the key or the key reading out information into a same area as the AV data with being correlated with each other.

An additional aspect of the present invention is a recording and reproducing apparatus, characterized in that said recording means records the key or the key reading out information into an area different from the AV data with being correlated with each other.

A still additional aspect of the present invention is a recording and reproducing apparatus, characterized in that said recording means records the key or the key reading out information into an area which a user cannot access.

A yet additional aspect of the present invention is a recording and reproducing apparatus, characterized in that said area which a user cannot access is an area which cannot be accessed in the unit of LBA (logical block address), an area in which an area which can be accessed in the unit of LBA is limited, an alternate sector area, an area (AUX) other than an area which is to be reproduced as an AV data, a RAM added to a recording medium, a header area of an optical disk, a power calibration area, a recording management area, a lead-in area, or a lead-out area.

A still yet additional aspect of the present invention is a recording medium characterized in that said medium records the key reading out information.

An aspect of the present invention is a program recording medium characterized in that said medium stores a program for causing a computer to execute a whole or a part of functions of said recording and reproducing apparatus.

Another aspect of the present invention is a caching apparatus comprising:

recording means for recording a data; and reproducing means for, in the case where the data is copyrighted, reproducing only once the data without changing contents of a copyright of the data which is recorded by said recording means, and connected to plural counter apparatuses, and characterized in that said apparatus further comprises transmission selecting means for selecting which of said connected counter apparatuses is enabled to use a data reproduced by said reproducing means, in accordance with contents of a copyright.

Still another aspect of the present invention is a caching apparatus, characterized in that, when a copyrighted data is to be sent, in the case where said counter apparatuses include one or more apparatuses having a function of said caching apparatus, said transmission selecting means enables only one of said apparatuses having a function of said caching apparatus, or all apparatuses not having a function of said caching apparatus, excluding said apparatuses having a function of said caching apparatus, to use the data in accordance with contents of the copyright, and in the case where said counter apparatuses include no apparatus having a function of said caching apparatus, said transmission selecting means enables all of said counter apparatuses to use the data in accordance with contents of the copyright.

Yet another aspect of the present invention is a caching apparatus characterized in that said transmission selecting means transfers a key for decoding an encrypted copyrighted data, to said counter apparatus, thereby selecting said counter apparatus.

Still yet another aspect of the present invention is a caching apparatus, characterized in that said transmission selecting means previously distributes keys for decoding a data, to said connected counter apparatuses, and determines one of the keys to be used for encrypting a copyrighted data, thereby selecting said counter apparatus.

A further aspect of the present invention is a caching apparatus, charatecrized in that, in advance to transfer the key to said counter apparatus, said transmission selecting means performs authentication with respect to said counter apparatus, and, only when the authentication succeeds, transfers the key.

A still further aspect of the present invention is a caching apparatus, characterized in that, when none of said counter apparatuses not having a function of said caching apparatus performs reception, said transmission selecting means detects said caching apparatus, and instructs said caching apparatus to issue an authentication request for receiving the key.

A yet further aspect of the present invention is a caching apparatus, characterized in that, when the key is to be transferred to said counter apparatus, said transmission selecting means encrypts the key by using a temporary key which is used in the authentication with respect to said counter apparatus, and transfers the encrypted key to said counter apparatus.

A still yet further aspect of the present invention is a caching apparatus characterized in that, in the case where the data is not copyrighted ("copy free"), said transmission selecting means does not encrypt the data.

An additional aspect of the present invention is a caching apparatus, characterized in that the contents of the copyright is one of "copy never" allowing viewing or listening to be performed only once, "copy one generation" allowing copying to be performed only once, and "no more copy" not allowing further copying.

A still additional of the present invention is a caching apparatus, characterized in that one of said connected counter apparatuses is a monitor which is directly connected to said caching apparatus.

A yet additional aspect of the present invention is a transmitting apparatus comprising outputting means for outputting a data, and connected to plural counter apparatuses, and characterized in that said apparatus comprises transmission selecting means for selecting which of said connected counter apparatuses is enabled to use a data output by said outputting means, in accordance with contents of copyright, and said counter apparatuses include one or more, or none of said caching apparatus.

A still yet additional aspect of the present invention is a transmitting apparatus, characterized in that, when a copyrighted data is to be sent, in the case where said counter apparatuses include one or more apparatuses having a function of said caching apparatus, said transmission selecting means enables only one of said apparatuses having a function of said caching apparatus, or all apparatuses not having a function of said caching apparatus, excluding said apparatuses having a function of said caching apparatus, to use the data in accordance with contents of the copyright, and in the case where said counter apparatuses include no apparatus having a function of said caching apparatus, said transmission selecting means enables all of said counter apparatuses to use the data in accordance with contents of the copyright.

One aspect of the present invention is a transmitting apparatus characterized in that said apparatus comprises:

analog outputting means for outputting a data in an analog manner; and digital outputting means for outputting the data in a digital manner, and when said digital outputting means outputs a copyrighted data in a digital manner, an analog output of said analog outputting means is nullified.

Another aspect of the present invention is a transmitting apparatus, characterized in that, when said digital outputting means outputs a copyrighted data in a digital manner to a recording and reproducing apparatus comprising:

recording means for recording a data; and reproducing means for, in the case where the data is copyrighted, reproducing only once the data without changing contents of the copyright of the data, the analog output of said analog outputting means is nullified.

Still another aspect of the present invention is a transmitting apparatus, characterized in that one of said connected counter apparatuses is a monitor which is directly connected to said transmitting apparatus.

Yet another aspect of the present invention is a transmitting apparatus characterized in that the contents of the copyright is one of "copy never" allowing viewing or listening to be performed only once, "copy one generation" allowing copying to be performed only once, and "no more copy" not allowing further copying.

Still yet another aspect of the present invention is a program recording medium characterized in that said medium stores a program for causing a computer to execute a whole or a part of functions of said caching apparatus or said transmitting apparatus according to any one of the 41st to 56th inventions.

BRIEF DESCRIPTION OF DRAWINGS

FIG. 44 is a flowchart showing the flow of processes in the fourteenth embodiment of the invention in the case where the key is erased after reproduction of an AV data is ended.

Figure 1:
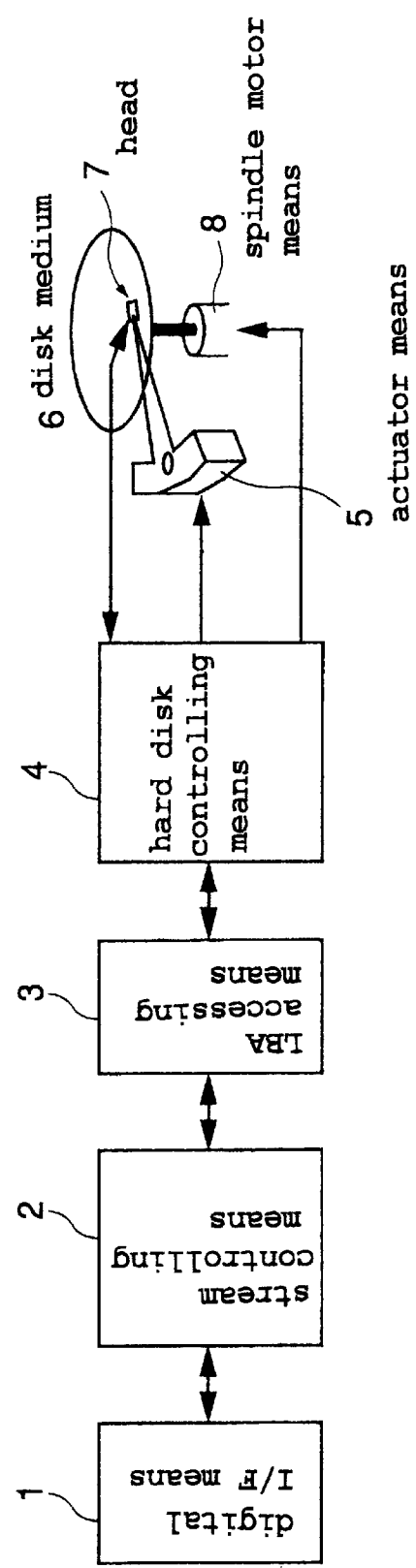
FIG. 1 is a basic configuration view of a hard disk apparatus in first, fourth to eighth, ninth, tenth, eleventh, fourteenth, and twentieth embodiments of the invention.

DESCRIPTION OF THE REFERENCE NUMERALS 1 digital I/F means
2 stream controlling means 3 LBA accessing means
4 hard disk controlling means
5 actuator means
6 disk medium
7 head
8 spindle motor means
9 stream controlling means
10 deformatting means
11 formatting means
12 controlling means
13 memory accessing means
14 reproducing means
15 recording means
17 recording head
18 reproducing head
19 tape medium
20 memory
21 EMI detecting means
22 EMI giving means
23 EMI accessing/rewriting means
24 EMI judging means
25 authenticating and encrypting means
26 recording encrypting means
27 data block accessing means
28 file accessing means
29 stream accessing means
30 decoding means
31 authenticating means
32 key producing means
33 encrypting means
34 changeover switch
35 changeover switch
36 key producing means
37 decoding means A
38 decoding means B
39 encryption selecting means
40 encrypting means A
41 changeover switch
42 changeover switch
209 EMI detecting means
210 EMI giving means
211 EMI accessing means
212 EMI judging means
213 authenticating and encrypting means
214 invalid data outputting means
215 file accessing means
216 stream accessing means
217 reproduction information managing means A
218 data block accessing means
219 changeover switch
220 decoding means
221 authenticating means
222 key producing means
223 encrypting means
224 changeover switch
225 changeover switch
226 reproduction information updating means
227 already-reproduction judging means
228 reproduction information producing means
229 reproduction information accessing means
230 changeover switch
301 transmission selecting means
302 mode storing means
303 receiving device candidate determining means
304 receiving device judging means
305 mode determining means
306 notifying means
307 key producing and outputting means
308 encrypting means
309 authenticating means
310 changeover switch
311 noncaching apparatus
312 caching apparatus
313 receiving device grouping means
314 key producing means
315 key distributing means
316 current transmission group storing means
317 transmission group determining means
318 transmission request detecting means
319 antenna
320 tuner section
321 transport stream decoder section
322 EMI giving means
323 digital I/F means
324 AV stream decoder section
325 D/A converting section
326 changeover switch
327 digital I/F means
328 EMI detecting means
329 authenticating and decoding means
330 display apparatus Best Mode for Carrying Out the Invention Hereinafter, embodiments of the invention will be described with reference to the drawings.

Embodiment 1

Initially, a first embodiment will be described.

In the embodiment, taking a hard disk apparatus as an example of a recording and reproducing apparatus, the case will be described where EMI is recorded in an area which the user cannot access; when EMI is not 00 during recording, an AV data is reencrypted for recording and then recorded; when EMI is not 00 during reproduction, an AV data is encrypted and then output; when EMI is 10 during recording, it is rewritten to 01 and then recording is performed; and, when EMI is 11 during recording, recording is not performed, and EMI and an AV data are stored into different areas.

FIG. 1 is a basic configuration view of the hard disk apparatus of the embodiment.

The hard disk apparatus is configured by digital I/F means 1, stream controlling means 2, LBA accessing means 3, hard disk controlling means 4, actuator means 5, a disk medium 6, a head 7, and spindle motor means 8.

The digital I/F means 1 is means for interconnecting external AV apparatuses such as an STB (Set Top Box: a satellite broadcasting receiver), a television monitor, a DVHS, and the hard disk apparatus, for controlling the AV apparatuses, and for transferring an AV data, and is, for example, an IEEE standard for High performance Serial Bus which is described in IEEE 1394-1995. The transfer of an AV data in the digital I/F means 1 is performed by a transfer system which is called an isochronous system, and the transfer process can be performed while ensuring the real time of a transferred data. For example, a transferred data is an MPEG2 transport stream or a DV stream. The AV apparatuses of the digital I/F means 1 are controlled by an asynchronous transfer system which is called an asynchronous system. The stream controlling means 2 is means for performing accessing of a stream and an authenticating process. The LBA accessing means 3 is I/F means for accessing the disk medium 6 with designating an LBA (logical block address), and in the hard disk apparatus. The hard disk controlling means 4 is means for controlling the actuator means 5 and the spindle motor means 8, and for performing signal processing for performing recording and reproduction on the disk medium 6 via the head 7. The head 7 is means for recording and reproducing a signal from/to the disk medium 6. The spindle motor means 8 is means for rotating the disk medium at a constant speed. The actuator means 5 is means for positioning the head 7 to an objective position of the disk medium 6.

In the embodiment, an EMI (Encryption Mode Indicator) which is produced from a CGMS is used as copy right information. Therefore, an EMI will be described.

Before the description, the data transfer protocol of IEEE 1394 which has been slightly mentioned in the description of the digital I/F means 1 will be briefly described. When an AV data is viewed or listened through a monitor, data must be transmitted periodically and synchronously. When stop of the hard disk apparatus, start of video recording, and the like are to be controlled, it is necessary to transmit and receive a control command asynchronously and at an arbitrary timing. In IEEE 1394, the former data is an isochronous packet data, and the latter data is an asynchronous packet data.

In a data transfer, the right to use the bus is requested to a management node in advance to the transfer, and a copy right is then obtained.

In an asynchronous transfer, the transmission node ID and the reception node ID are sent together with the transferred data, as a packet data. In the reception node, when its own ID is confirmed and the packet is received, an acknowledge signal is sent to the transmission node. As a result, one transaction is ended.

In an isochronous transfer, the side of the transmission node requests an isochronous channel together with the transmission rate. The channel ID is sent together with a transmitted data, as a packet data. The reception node confirms the channel ID desired by oneself, and then receives the packet.

In the above, the data transfer protocol of IEEE 1394 has been briefly described.

Returning to the description of EMI, a CGMS is added to an AV data in a broadcasting station. An STB which receives a broadcast wave transmitted from the broadcasting station sends a received program to an IEEE 1394 bus. At this time, the CGMS is embedded into a portion of service information of an MPEG2 transport stream of an isochronous packet data. In one isochronous packet data, plural MPEG2 data are stored, and corresponding CGMSs exist for the MPEG2 data, respectively.

EMI is produced from such a CGMS by the STB. The STB checks a CGMS of each of AV data which are to be transmitted by one isochronous packet data, and, as its typical value, gives one EMI to one isochronous packet data. The EMI is held in the header portion of the isochronous packet data.

The value of EMI is equal to that of a CGMS in which the terms of the copy right are most severely restricted, among CGMSs of AV data existing in one isochronous packet data. When CGMSs of AV data existing in one isochronous packet data are 11, 10, and 10, for example, the value of the EMI is 11 in which the restriction is most severe. When CGMSs are 10, 10, 00, and 00, the value of the EMI is 10 in which the restriction is most severe, among them. In this way, the value of EMI is determined.

In the above, EMI has been described.

Figure 3:
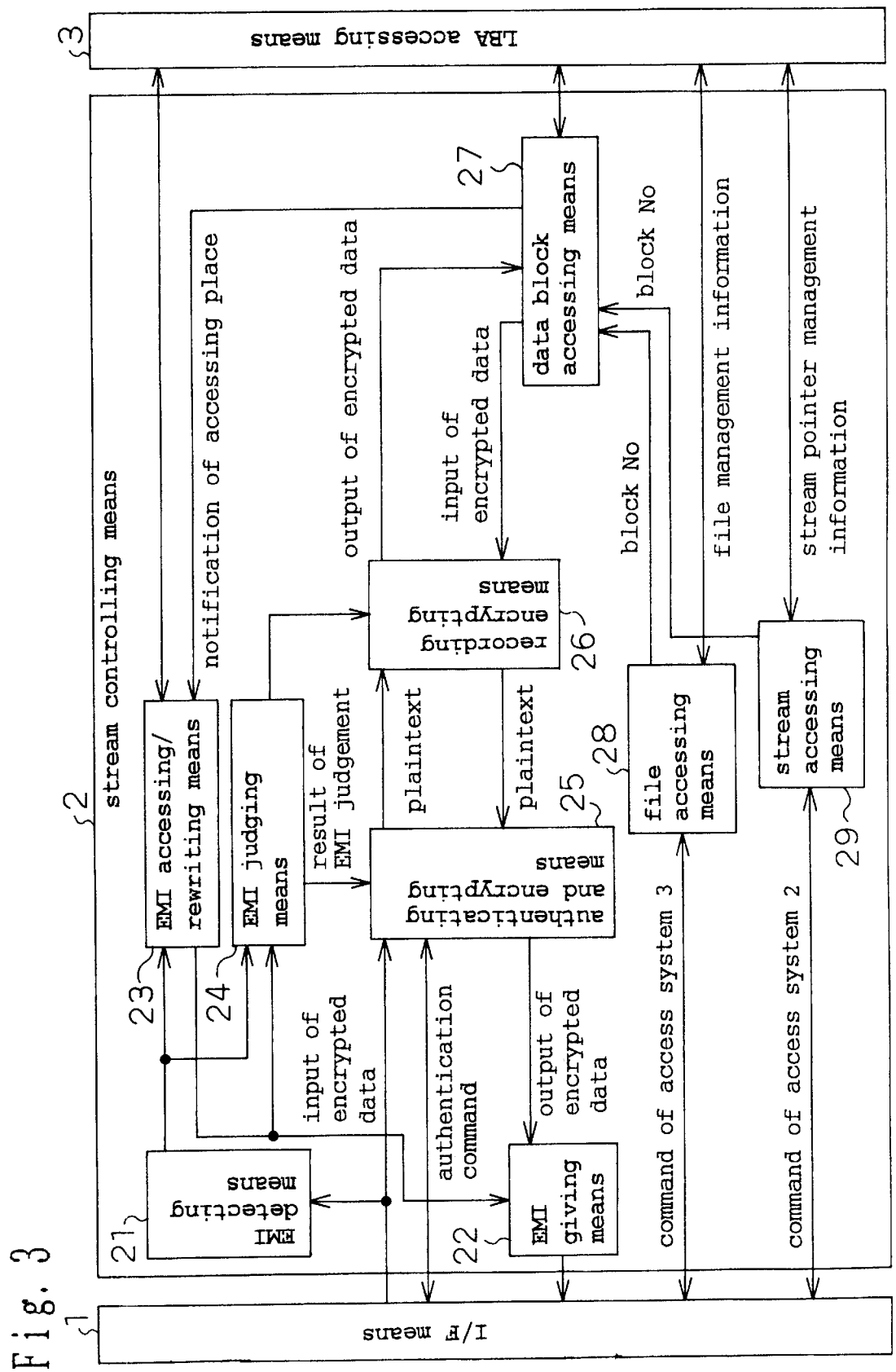
FIG. 3 is a block diagram of stream controlling means constituting a hard disk apparatus in first and third embodiments of the invention.

Returning to FIG. 1, the stream controlling means 2 of the hard disk apparatus is configured as shown in FIG. 3. Namely, the stream controlling means 2 is configured by EMI detecting means 21, EMI giving means 22, EMI accessing/rewriting means 23, EMI judging means 24, authenticating and encrypting means 25, recording encrypting means 26, data block accessing means 27, file accessing means 28, and stream accessing means 29.

The EMI detecting means 21 is means for detecting a field in which EMI is described, from a header portion in an isochronous packet data which is input from the digital I/F means 1. The EMI giving means 22 is means for giving instructed EMI to a header portion in an isochronous packet data which is to be output to the digital I/F means 1. The EMI accessing/rewriting means 23 is means for recording detected EMI information into the disk medium 6 via the LBA accessing means 3. It is means for, in this case, recording EMI while rewriting "copy one generation" into "no more copy." The EMI accessing/rewriting means 23 is means for, when EMI of an input signal from the digital I/F means 1 is "copy never" or "no more copy," inhibiting recording, and for recording and reproducing read out EMI information correspondingly with a designated data block. The EMI judging means 24 is means for judging the presence or absence and the kind of a copy right from the EMI information. The authenticating and encrypting means 25 is means for performing authentication among the AV apparatuses via the digital I/F means 1, for decoding an encrypted AV data which is input from the digital I/F means 1, and for encrypting an AV data which is read out from the side of the disk medium 6 via the data block accessing means 27. The authenticating and encrypting means 25 will be described later. The recording encrypting means 26 is means for encrypting a decoded AV data for the purpose of recording. The recording encrypting means 26 will be described later. The data block accessing means 27 is means for recording or reproducing data of a designated block number via the LBA accessing means 3, and for notifying the number of a block which is currently accessed, to the EMI accessing/rewriting means 24. The stream accessing means 29 is means for designating the number of a block which is to be recorded or reproduced to the data block accessing means 27 in order to execute a command of access system 2 which is received from the digital I/F means 1, for managing a stream pointer indicating the position of the block in which the stream currently exists, in accordance with instructions such as reproduction, recording, or stop while assuming the initial data block to the final data block of the user area of the disk medium 6 as one tape, and for performing recording or reading of stream pointer management information on the disk medium 6 via the LBA accessing means 3. The access system 2 is a system conforming to, for example, AV/C Digital Interface Command Set VCR subunit Specification version 2.0.1. The file accessing means 28 is means for designating the number of a block which is to be recorded or reproduced to the data block accessing means 27 in order to execute a command of access system 3 which is received from the digital I/F means 1, for managing the order configuration of names of files and plural data blocks constituting the files, having file management information, for managing also a file pointer indicating the position of the current block in a file, in accordance with instructions such as reproduction, recording, or stop according to the command of access system 3, and for performing recording or reading of information of the order configuration of data blocks of these files, file pointer information, and the like on the disk medium 6 via the LBA accessing means 3. The access system 3 is an accessing system which conforms to, for example, AV/C Digital Interface Command Set General Specification, and which controls an AV apparatus by instructing the name of a file and the contents of the process on the file, such as reproduction, recording, or stop.

Figure 4:
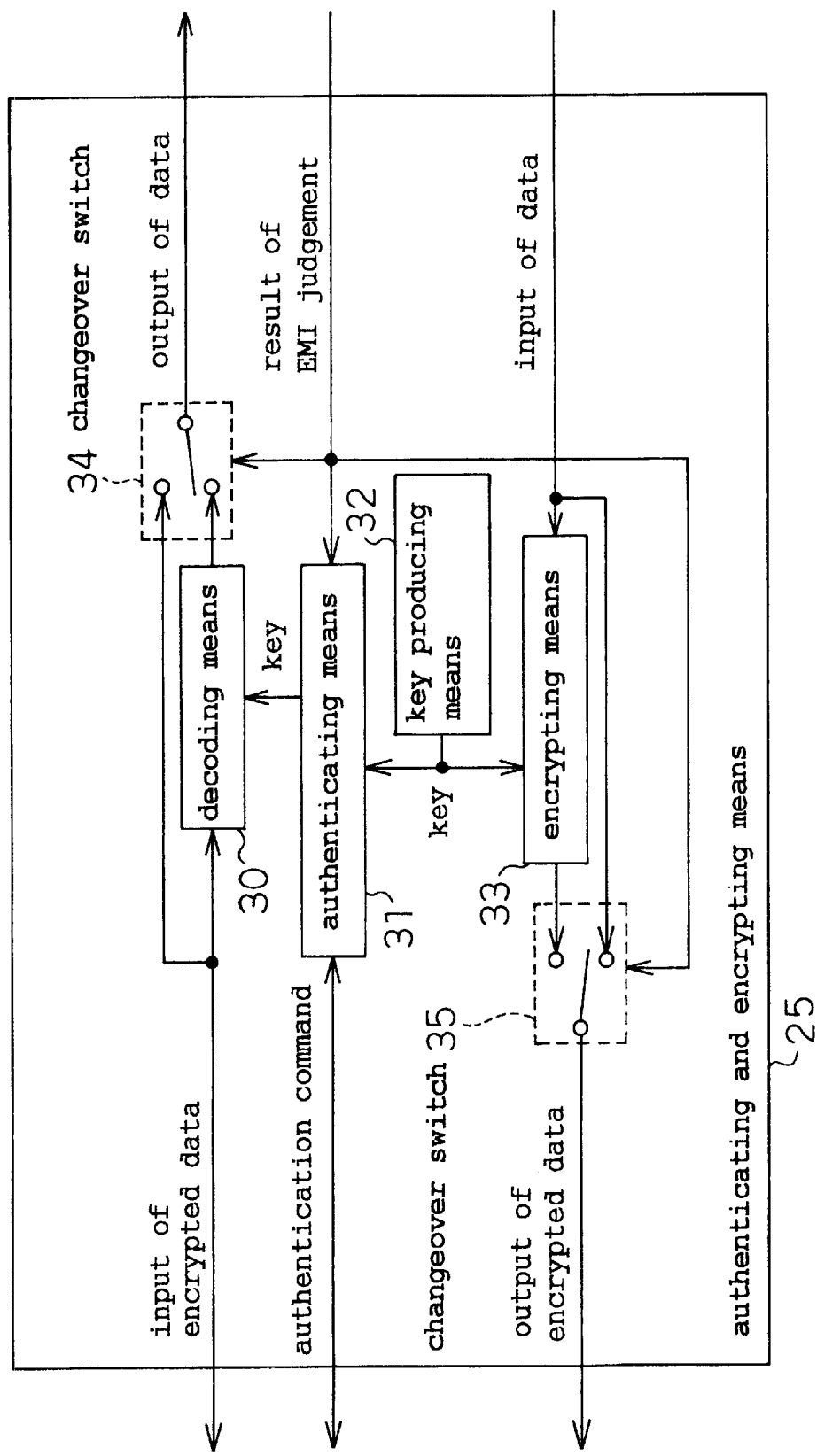
FIG. 4 is a block diagram of authenticating and encrypting means in the first to eighth embodiments of the invention.

The authenticating and encrypting means 25 of FIG. 3 is configured as shown in FIG. 4, or by decoding means 30, authenticating means 31, key producing means 32, encrypting means 33, a changeover switch 34, and a changeover switch 35.

The authenticating means 31 is means for performing authentication between AV apparatuses connected through the digital I/F means 1, and for, if authentication succeeds, when an AV data is to be output the side of to the digital I/F means 1, transferring a key which is used in encryption by oneself, to the counter apparatus, and for, when an AV data is to be input from side of the digital I/F means 1, receiving a key which is to be used in decoding by oneself, from the counter apparatus. The encrypting means 33 is means for encrypting an AV data which is read out from the disk medium 6 via the data block accessing means 27, by using the key produced by the key producing means 31, and for outputting the encrypted data to the digital I/F means 1. The key producing means 32 is means for producing a key which is to be used for encryption, and for transferring the key to the encrypting means 33 and the authenticating means 31. The decoding means 30 is means for decoding an encrypted AV data which is input from the digital I/F means 1, by using the key obtained in the authenticating means 31, and for outputting the decoded data to the data block accessing means 27. The switches 34 and 35 are means for, when the judgement result of the EMI judging means 24 shows that EMI is 00, performing switching so that an input/output data does not pass through the encrypting means 33 and the decoding means 30, and for, when EMI is other than 00, performing switching so that an input/output data passes through the encrypting means 33 and the decoding means 30.

Figure 5:
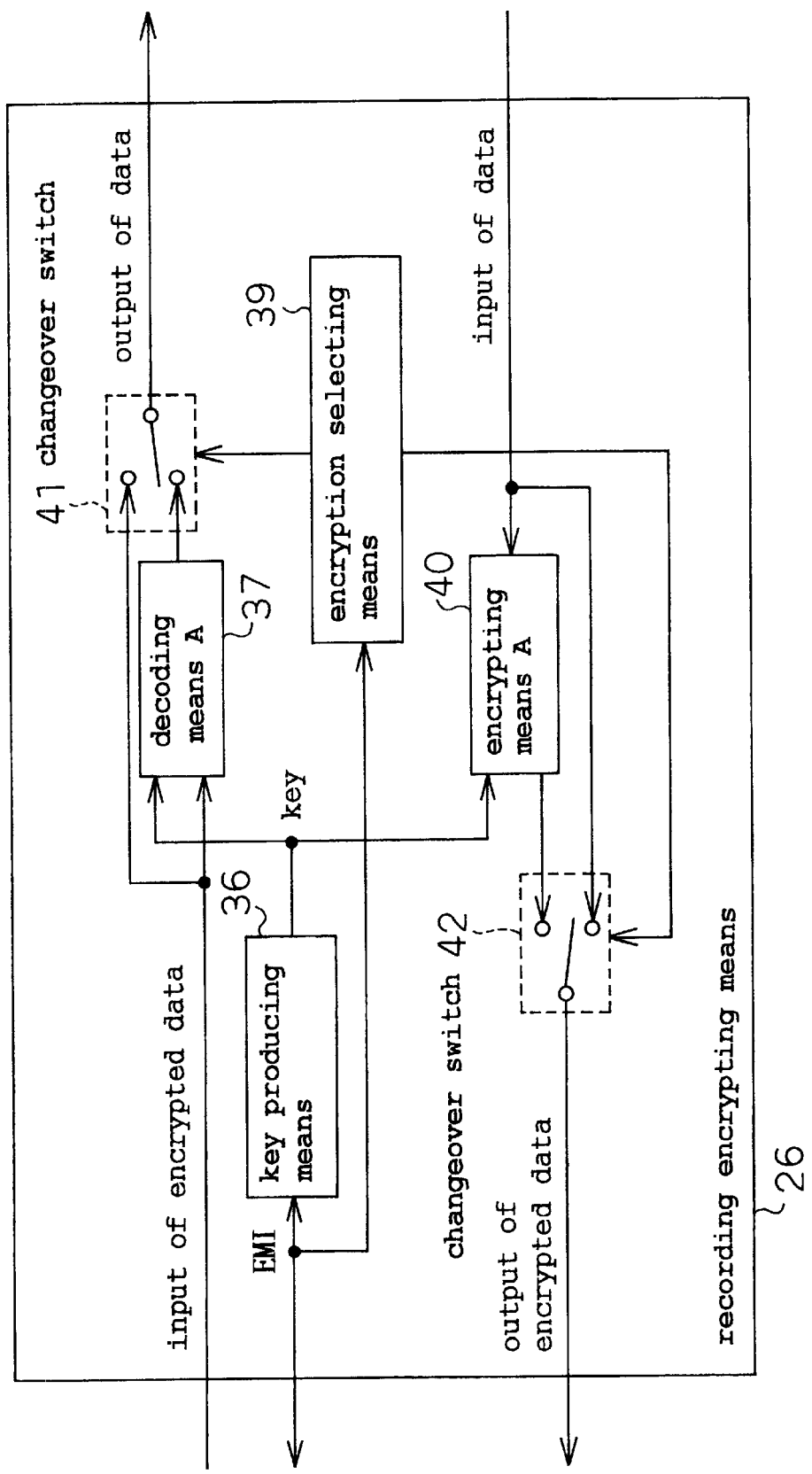
FIG. 5 is a block diagram of recording encrypting means in the first, second, and fourth to eighth embodiments of the invention.

The recording encrypting means 26 is configured as shown in FIG. 5. Namely, the recording encrypting means 26 is configured by key producing means 36, decoding means A 37, encryption selecting means 39, encrypting means A 40, a changeover switch 41, and a changeover switch 42.

The encryption selecting means 39 is means for switching over techniques of encryption and decoding in accordance with the value of EMI corresponding to a portion of an AV data which is to be recorded or reproduced. When EMI is "copy one generation," for example, the encrypting means A 40 is used in recording, and the decoding means A 37 is used in reproduction. When EMI is "no more copy," the decoding means 37 is used in reproduction. When EMI is "copy free," an AV data is caused so as not to pass through the encrypting means 40 and the decoding means A 37. The changeover switches 41 and 42 are means for switching to encrypting and decoding methods which are determined by the encryption selecting means 39. The key producing means 36 is means for producing a key which is to be used for encryption/decoding, in accordance with the value of EMI corresponding to a portion of a data which is to be recorded or reproduced, and for transferring the key to the decoding means A 37 and the encrypting means A 40. The encrypting means A 40 is means for, when EMI is "copy one generation," encrypting an AV data which is sent from the authenticating and encrypting means 25, and for transferring the encrypted data to the data block accessing means 27. The decoding means A 37 is means for, when EMI is "no more copy" or "copy one generation," receiving an AV data from the data block accessing means 27, for decoding the AV data, and for transferring the decoded data to the authenticating and encrypting means 25.

Next, the operation of the embodiment will be described.

The case where a source apparatus sending an AV data is an STB will be described. There is a controller which sends a program reception command, a record start command, a record stop command, and the like to an apparatus coupled via an IEEE 1394 bus. The description of exchange of commands among the controller, the hard disk apparatus, and the STB departs from the spirit of the embodiment. In the embodiment, therefore, the description is omitted.

First, it is assumed that the controller sends to the STB a reception start command for starting reception of a program which is sent from a broadcasting station, and the record start command to the hard disk apparatus. The case where an AV data which is sent from an apparatus other than the STB, for example, a recording and reproducing apparatus such as a DVHS or a hard disk apparatus is to be received will be described later. Then, the program which is sent from a broadcasting station is received by the STB, and EMI is given to the program. Thereafter, the program is sent as an isochronous packet data to the IEEE 1394 bus. When the hard disk apparatus receives the record start command in the form of a command of the access system 2 or the access system 3 from the digital I/F means 1, the digital I/F means 1 confirms the number of a channel which is intended to be acquired by oneself, and fetches the corresponding isochronous packet data. It is assumed that the record start command in the form of a command of the access system 2 is received. Then, the authenticating means 31 sends an authentication command to the STB. The EMI detecting means 21 detects EMI information held in the header portion of the fetched isochronous packet data. The EMI judging means 24 judges the presence or absence and the kind of a copy right from the detected EMI information. The result is input to the authenticating and encrypting means 25. The authenticating means 31 determines the authentication method in accordance with the presence or absence and the kind of a copy right. When EMI is 11 or "copy never," the significance of the AV data is high, and hence authentication based on a public key is performed. A hard disk apparatus is a recording apparatus which is not provided with a function of authentication based on a public key for "copy never." In the case where recording from the STB to a hard disk is to be performed, therefore, the authenticating means 31 receives the result of the EMI judging means 24, and the authentication fails. The selection of the method of authentication depending on EMI will be described later. When EMI is 10 or "copy one generation," the significance of the AV data is not higher than that in the case where EMI is 11, and hence authentication based on a common key is performed. When EMI is 00 or "copy free," the AV data is not significant. Therefore, it is deemed that authentication succeeds, without performing authentication. Upon receiving the authentication command, the STB performs authentication based on a common key between the STB and the hard disk apparatus. When the authentication succeeds, the key is transferred to the hard disk apparatus. The authenticating means 31 receives the key sent from the STB, via the digital I/F means 1, and then transfers the key to the decoding means 30. When EMI is 00, however, the authenticating means 31 does not receive the key sent from the STB. In this case, the AV data itself is not encrypted. In the case where EMI is 10, the decoding means 30 receives the key from the authenticating means 31.

It is assumed that the record command is received in the form of a command of the access system 2 via the digital I/F means 1. When EMI of the AV data sent via the digital I/F means 1 is not 00, the changeover switch 34 is switched so that the AV data passes through the decoding means 30. When EMI is 00, switching is performed so that the AV data does not pass through the decoding means 30. The decoding means 30 decodes the encrypted AV data by using the received key. The stream accessing means 29 instructs the data block accessing means 27 to record block x. The data block accessing means 27 notifies the number (=x) of the block which is currently accessed, to the EMI accessing/rewriting means 23. The EMI accessing/rewriting means 23 records the EMI information detected by the EMI detecting means 21, correspondingly with the notified block number. In the case where EMI is 10 or "copy one generation," when the EMI information is to be recorded onto the disk medium 6, recording is performed while rewriting EMI to 01 or "no more copy." The meaning of rewriting EMI of "copy one generation" to "no more copy" will be described later. The recording encrypting means 26 reencrypts the AV data which has passed through the authenticating and encrypting means 25. Namely, in response to the result of the EMI judging means 24, the encryption selecting means 39 decides presence or absence of encryption in accordance with the value of EMI. Specifically, when EMI is 00 or "copy free," the encryption selecting means 39 switches the changeover switch 42 so as not to pass through the encrypting means A 40. When EMI is not 00, the encryption selecting means 39 switches the changeover switch 42 so as to pass through the encrypting means A 40. In this way, when EMI of an AV data to be recorded is 00, the data is not encrypted, and, when EMI is not 00, the data is reencrypted. The AV data which has passed through the recording encrypting means 26 is transferred to the data block accessing means 27, and then recorded onto the disk medium 6 via the LBA accessing means 3. Next, the stream accessing means 29 increments the number of the block which is currently accessed, by one or sets x=x+1 in order to update the stream pointer management information. Next, the stream accessing means 29 judges whether another command from the digital I/F means 1 is received or not. If another command is received, the process is ended. If not, the process which has been performed after the reception of the record command is repeatedly performed until another command is received. The case where an AV data is to be recorded onto the disk medium 6 has been described.

Next, the case where the hard disk apparatus reproduces an AV data will be described. The case where an AV data is to be reproduced on a television monitor will be considered. It is assumed that an AV data recorded in the hard disk apparatus was recorded from the STB. There is a controller which sends a reproduction start command, a reproduction stop command, and the like to an apparatus coupled via an IEEE 1394 bus. The description of exchange of commands among the controller, the hard disk apparatus, and the television monitor departs from the spirit of the embodiment. In the embodiment, therefore, the description is omitted.

First, the controller sends the reproduction start command to the television monitor, and sends the reproduction start command also to the hard disk apparatus. In the hard disk apparatus, thereafter, the data block accessing means 27 notifies the accessing place to the EMI accessing/rewriting means 23. The EMI accessing/rewriting means 23 fetches EMI information of the notified accessing place, and transfers the EMI information to the EMI giving means 22. The data block accessing means 27 reproduces an AV data via the LBA accessing means 3, the reproduced data is decoded by the recording encrypting means 26, and the decoded data is transferred to the EMI giving means 22 via the authenticating and encrypting means 25. The EMI giving means 22 sends a pair of the AV data and EMI as an isochronous packet data to the IEEE 1394 bus via the digital I/F means 1. The television monitor sends an authentication command to the hard disk apparatus. The television monitor fetches the isochronous packet data sent from the hard disk apparatus, and determines the authentication method while referring the EMI information given to the data. When EMI is 01 or "no more copy," the authenticating means 31 performs authentication with respect to the television monitor based on a common key via the digital I/F means 1. When EMI is 00, authentication is not performed, and it is deemed that authentication succeeds. The embodiment handles the case where a data which is obtained by recording an AV data sent from the STB is reproduced. Therefore, all AV data in which EMI is 10 or "copy one generation" are recorded while rewriting EMI to 01. When the hard disk apparatus receives the authentication command via the digital I/F means 1, the authenticating means 31 determines the kind of authentication while referring the EMI information, and performs authentication with respect to the television monitor. When authentication succeeds, the authenticating means 31 transfers the key which is produced by the key producing means 32, to the encrypting means 33. When EMI is 00, the key is not transferred to the encrypting means 33, and the changeover switch 35 is switched to the side in which the data does not pass through the encrypting means 33. When EMI is not 00, the changeover switch 35 is switched to the side in which the data passes through the encrypting means 33.

It is assumed that the hard disk apparatus receives the reproduction command in the form of a command of the access system 2 from the digital I/F means 1. The stream accessing means 29 instructs the data block accessing means 27 to reproduce block x. The data block accessing means 27 notifies the number (=x) of the block which is currently accessed, to the EMI accessing/switching means 23 [Bic: the EMI accessing/rewriting means 23]. At the same time, the data block accessing means 27 reads out an AV data from the disk medium 6 via the LBA accessing means 3. The EMI accessing/switching means 23 [sic: the EMI accessing/rewriting means 23] reads out EMI information corresponding to the notified block number from the disk medium 6. The read out EMI information is subjected to judgement in the EMI judging means 24. The judgement result is sent to the recording encrypting means 26 and the authenticating and encrypting means 25. The AV data which is read by the data block accessing means 27 is transferred to the recording encrypting means 26.

When the EMI judgement result shows that EMI is 00, the changeover switch 35 of the authenticating and encrypting means 25 is switched to the side in which the data does not pass through the encrypting means 33, and the changeover switch 41 of the recording encrypting means 26 is switched to the side in which the data does not pass through the decoding means A 37. Therefore, the AV data is output without being encrypted. When EMI is not 00, the changeover switch 35 is switched to the side in which the data passes through the encrypting means 33.

When EMI is not 00, the changeover switch 41 is switched to the decoding means A 37 by instructions of the encryption selecting means 39 based on the value of EMI. The AV data which is formed as plaintext by the recording encrypting means 26 is encrypted by the encrypting means 33, and then output via the digital I/F means 1.

Next, the stream accessing means 29 updates the stream pointer management information to increment the number of the block which is currently accessed, by one, or sets x=x+1. Next, the stream accessing means 29 judges whether another command from the digital I/F means 1 is received or not. If another command is received, the process is ended. If not, the process which has been performed after the reception of the reproduction command is repeatedly performed until another command is-received.

In the embodiment, presence and absence of recording encryption are switched over in accordance with EMI information. Even when the user tampers with EMI information to set "copy free," therefore, recording encryption cannot be correctly decoded, and the tampering can be nullified.

The above-mentioned selection of the method of authentication depending on EMI will be described. Namely, two kinds of authentication methods are used. As the authentication method for "copy never" in the case where EMI is 11, authentication of method A is used. As the authentication method for "copy one generation" in the case where EMI is 10 and "no more copy" in the case where EMI is 01, authentication of method B is used. Specifically, authentication based on a public key can be used as authentication of method A, and authentication based on a common key can be used as authentication of method B. An apparatus which does not record an AV data, such as a television monitor or an STB supports both authentications of methods A and B, and an apparatus which records an AV data, such as a VTR supports only authentication of method B. An optical disk apparatus such as a DVD-RAM performs reproduction of a DVD-ROM medium onto which an AV data of CGMS=11 or EMI=11 is prerecorded, in addition to recording of an AV data from an STB, and hence supports both authentications of methods A and B. When the hard disk apparatus of the invention is to record an AV data sent from an STB, authentication in the case where EMI is 11 fails because the hard disk apparatus of the invention supports only authentication of method B. Therefore, an AV data in the case where EMI is 11 is not recorded. In the case where EMI is 10, authentication succeeds, and the AV data can be recorded into the hard disk apparatus of the invention. In the case where EMI is 01, authentication fails because the authenticating means 31 does not have a common key for 01, and, even if it is deemed that authentication succeeds, the AV data is not recorded judging from the value of EMI. During reproduction of the hard disk apparatus of the invention, in the case where an AV data is to be reproduced on a television monitor, when EMI is 01 or "no more copy," authentication succeeds and the AV data can be output to the television monitor because the television monitor supports authentication of method B and has a common key for "no more copy." Since a VTR supports authentication of method B, authentication succeeds. In the case where EMI is 10 or "copy one generation," an AV data can be recorded into a VTR. In the case where EMI is 01 or "no more copy," authentication succeeds, but, since a VTR is not provided with a common key for "no more copy," the VTR does not record the AV data judging from EMI information or it is deemed that authentication fails. In the case of an optical disk apparatus, when an AV data in which EMI is 11 or "copy never" is sent from the STB, authentication succeeds because authentications of methods A and B are supported. Since information of EMI indicates "copy never," however, the AV data is not recorded or it is deemed that authentication fails. In the case where an AV data in which EMI is 10 or "copy one generation" is sent from the STB, authentication succeeds and recording is enabled. In the case where an AV data in which EMI is 01 or "no more copy" is sent from the STB, the AV data is not recorded or it is deemed that authentication fails. In the case where a data is to be reproduced on a television monitor, a data of "no more copy" in which EMI is 01 can be authenticated by method B and then output. In reproduction of a DVD-ROM medium in which the CGMS is 11 or EMI is 11 of "copy never", a data is authenticated by method A and then output. In the case where an AV data which is prerecorded onto a DVD-ROM medium, and in which the CGMS is 10 or EMI is 10 of "copy one generation" is to be recorded in a VCR, the data is authenticated by method B and then output while EMI is kept to be 10.

As described above, the method of authentication is selected in accordance with the value of EMI. As a result, there are advantages that safety is improved by using a safer authentication method for an AV data of higher significance, and that simpler authentication is used for an AV data of lower significance, thereby preventing a burden in excess of that need from being applied to an apparatus.

Figure 21:
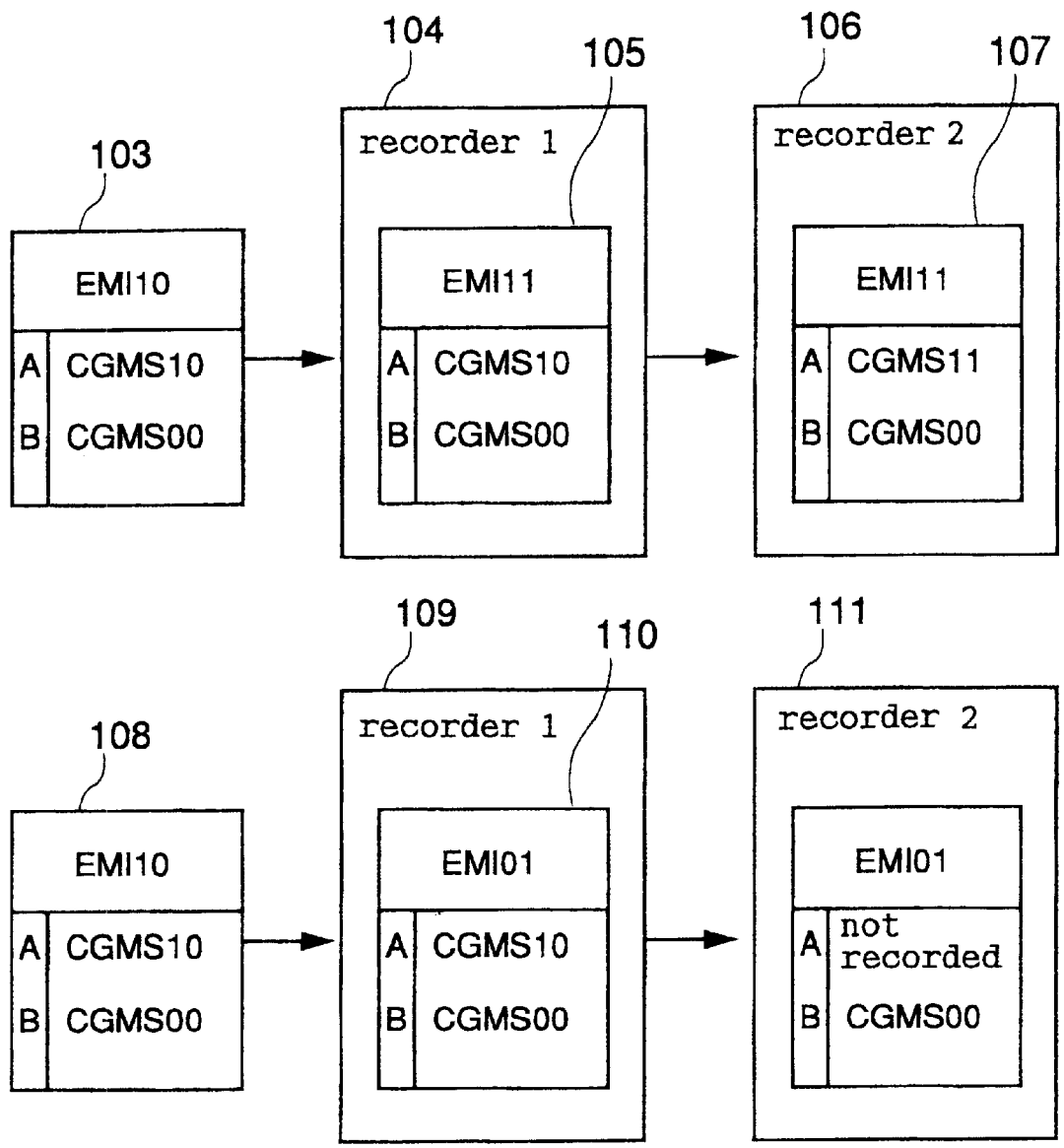
FIG. 21 is a view showing meaning of introduction of a concept of "no more copy" into EMI, in the first embodiment of the invention.

Next, as described above, during recording, EMI of "copy one generation" is rewritten to "no more copy." The meaning of this will be described. Referring to FIG. 21, it is assumed that an AV data 103 includes an AV data having EMI of 10 and a CGMS of 10 and 00. It is assumed that recorder 1 (104) is a recorder which accesses only EMI in recording and reproduction. Furthermore, it is assumed that recorder 2 is a recorder which accesses both EMI and a CGMS. For the sake of convenience in description, it is assumed that EMI has no concept of "no more copy." Namely, in the same manner as a CGMS, when a data of "copy one generation" is recorded, its EMI is rewritten to "copy never." When the AV data 103 is recorded by the recorder 1 (105), therefore, the EMI is rewritten to 11 as an AV data 105. Next, it is assumed that an AV data recorded in the recorder 1 (104) is reproduced to recorder 2 (106). The recorder 2 (106) accesses the EMI of the AV data 105. Since EMI is 11, copy inhibit is known from the information of EMI. In order to obtain further detail information, therefore, the recorder accesses the CGMS of the AV data 105. With respect to the CGMS of the AV data 105, the data of A is 10 and that of B is 00. Therefore, both can be copied. The recorder 2 (106) judges in this way, records both the data of A and that of B, and rewrites the CGMS of A from 10 to 11, with the result that the EMI and the CGMS become as those of an AV data 107. Although the CGMS is 10, therefore, the data of A of the AV data 103 is recorded by the recorder 1 (104) and the recorder 2 (106). Namely, recording of two or more generations is performed, and the copy right is not protected.

By contrast, it is assumed that, when an AV data in which EMI is 10 is to be recorded, the EMI is rewritten to 01. It is assumed that an AV data 108 in FIG. 21 includes an AV data having EMI of 10 and a CGMS of 10 and 00. It is assumed that a recorder 1 (109) is a recorder which accesses only EMI in recording and reproduction. Furthermore, it is assumed that a recorder 2 (111) is a recorder which accesses both EMI and a CGMS. When the AV data 108 is recorded by the recorder 1 (109), therefore, the EMI is rewritten to 01 as an AV data 110. Next, it is assumed that an AV data 110 recorded in the recorder 1 (109) is reproduced to the recorder 2 (111). The recorder 2 (111) accesses the EMI of the AV data 110. Since EMI is 01, it is known that the AV data was copied one time in the past. In order to obtain further detail information, the recorder 2 (111) accesses the CGMS of the AV data 110. Then, it is seen that the data of A has a CGMS of 10 and that of B has a CGMS of 00. The data of A can be copied one time, but the EMI is 01 or its history shows that the data was copied one time in the past. Therefore, the recorder 2 (111) does not record the data of A. The data of B is recorded, and the EMI is set to 00. In this way, the data of A is not recorded into the recorder 2 (111). As described above, when "no more copy" is introduced by EMI, a history indicating whether recording was performed in the past or not can be known, and hence also a data in which the CGMS is 10 is prevented from being recorded two times.

In the embodiment, the case where a command is executed in the access system 2 by the stream accessing means 29 has been described. Alternatively, a command may be executed in the access system 3 by the file accessing means 28.

The case where an AV data which is sent from an apparatus other than the STB is to be recorded into the hard disk apparatus of the invention as described above will be described. In AV data sent from the STB, there is no data in which EMI is 01 or "no more copy." In the case where a data is sent from an apparatus other than the STB, also an AV data in which EMI is "no more copy" exists. In the case where EMI is 01 or "no more copy," it is judged that the authenticating means 31 fails authentication, or the AV data and the EMI information are prevented from being recorded onto the disk medium 6. The others are identical with those of the case where an AV data sent from the STB is to be recorded.

In the recording encrypting means in the invention, any kind of encryption method may be applied on an AV data. Encryption which is based on change of the format in recording an AV data, or modulation of an AV data may be employed.

A configuration in which the recording encrypting means in the invention is not disposed may be employed. Namely, a configuration in which, in recording onto a disk medium, an AV data is recorded in plaintext may be employed.

In the above, it is assumed that authentication is performed after the apparatus receives the record start command. The invention is not restricted to this. A method such as that in which, when connection is made by means of IEEE 1394 or a former program is received, authentication is previously performed may be employed.

In the above, the description has been made while assuming that the meaning of bits of EMI to be recorded is identical with that of EMI to be transmitted. The invention is not restricted to this. In a recording apparatus, unique bit allocation may be performed.

The format in the case where EMI is recorded onto the disk medium 6 will be described.

Figure 13:
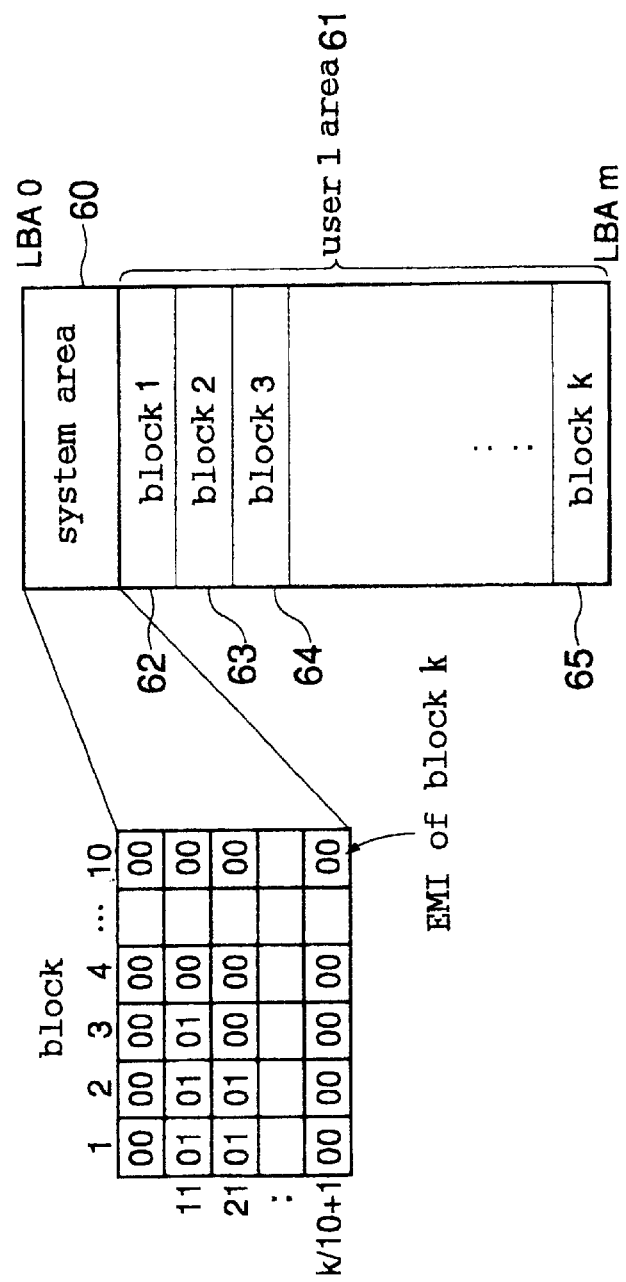
FIG. 13 is a view showing a recording method in the first embodiment of the invention in the case where EMI is recorded in the unit of block.

FIG. 13 shows the case where EMI is recorded into a system area 60 in the unit of block. Referring to FIG. 13, the disk medium 6 is divided into the system area 60 and a user area 61. The system area 61 is an area which is used by the system and cannot be accessed by the user. By contrast, the user area 61 is an area which the user uses. It is assumed that the user area 61 consists of a k number of blocks. An area into which EMI is to be recorded is disposed in a part of the system area 60. EMI of each block is recorded in this area. Referring to a table which is stored in the form of a bit map, all EMI of block 1 (62), block 2 (63), block 3 (64), and block k (65) is 00. Namely, this shows that the areas are "copy free." However, areas such as the block k (65) are areas which have not yet been used. It is assumed that, with respect to an unused area also, EMI information is set to 00. Since EMI of block 11, block 12, and block 13 is 01, they are areas of "no more copy." Such EMI information is produced and updated by the EMI accessing/rewriting means 23. Since EMI information is stored in the system area 60, the user cannot easily tamper with contents of the EMI information, so that an AV data cannot be unauthorizedly viewed or listened. Therefore, the hard disk apparatus having the function of the embodiment has high reliability.

Figure 14:
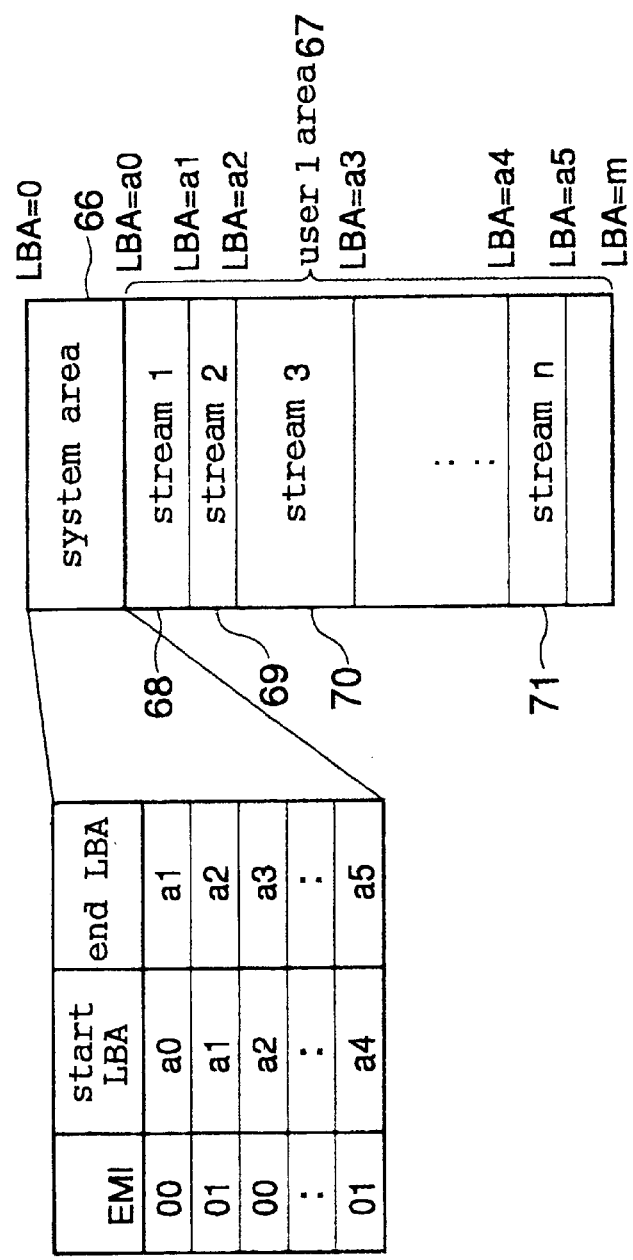
FIG. 14 is a view showing a recording method in the first embodiment of the invention in the case where recording is performed at each turning point of EMI.

Next, the case where EMI information is managed by means of an address will be described. Referring to FIG. 14, the disk medium 6 is divided into a system area 66 and a user area 67. The system area 66 is an area which is used by the system and cannot be accessed by the user. By contrast, the user area 67 is an area which the user uses. A stream is defined while dividing data each time when EMI information is changed. With respect to EMI information, EMI information is expressed by EMI of the stream, and the start LBA and the end LBA of the stream. In stream 1 (68), the start LBA is a0, the end LBA is a1, and all EMI in this stream is "copy free." In stream 2 (69), the start LBA is a1, the end LBA is a2, and all EMI in this stream is "no more copy." In stream 3 (70), the start LBA is a2, the end LBA is a3, and all EMI in this stream is "copy free." In stream n (71), the start LBA is a4, the end LBA is a5, and all EMI in this stream is "no more copy." Such EMI information is produced and updated by the EMI accessing/rewriting means 23. Since EMI information is stored in the system area 66, the user cannot easily tamper with contents of the EMI information, so that an AV data cannot be unauthorizedly viewed or listened. Therefore, the hard disk apparatus of the embodiment has high reliability.

Figure 15:
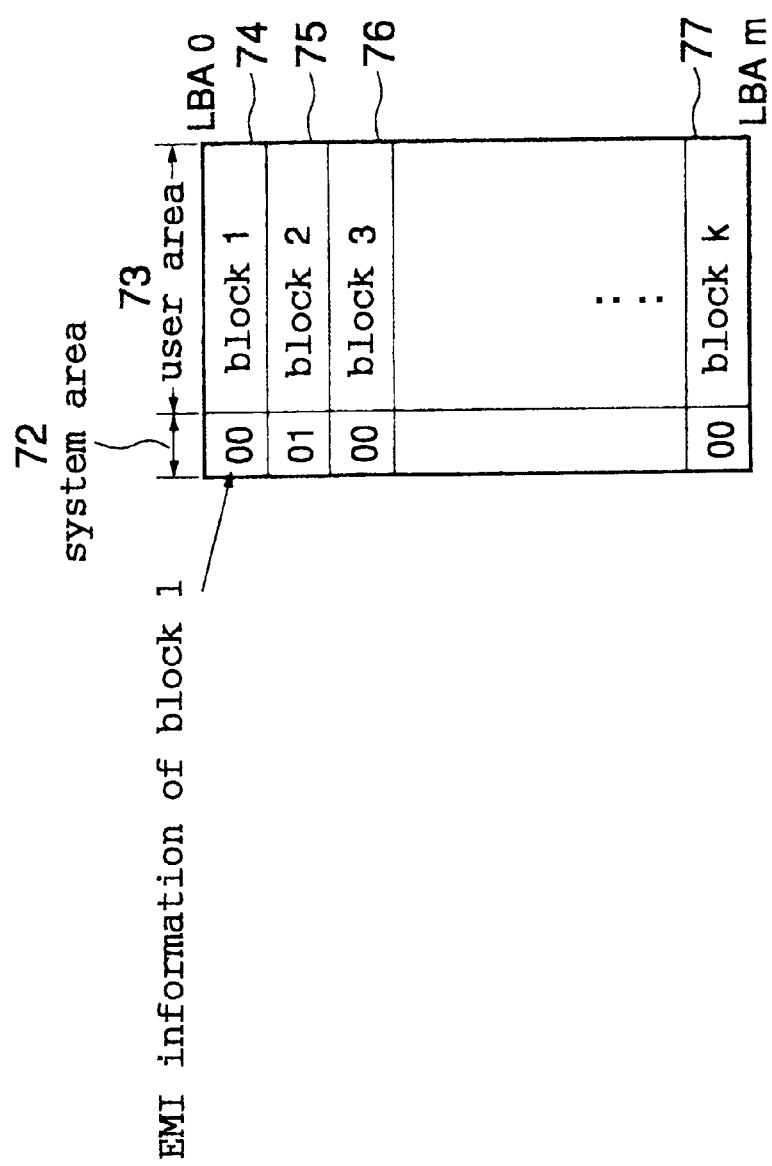
FIG. 15 is a view showing a recording method in the first embodiment of the invention in the case where EMI is recorded with being paired with a block.

Next, the case where EMI information is arranged with being paired with a data block will be described. Referring to FIG. 15, the disk medium 6 is divided into a system area 72 and a user area 73. The system area 72 is an area which is used by the system and cannot be accessed by the user. By contrast, the user area 73 is an area which the user uses. In FIG. 13, the system area is ensured as a bulk area. By contrast, in FIG. 15, the system area is ensured correspondingly with each block. EMI corresponding to block 1 (74), block 2 (75), block 3 (76), . . . , and block k (77) is stored in the system area with being respectively paired. EMI of block 1 (74) is 00 and indicates "copy free." EMI of block 2 (75) is 01 and indicates "no more copy." Such EMI information is produced and updated by the EMI accessing/rewriting means 23. Since EMI information is stored in the system area 72, the user cannot easily tamper with contents of the EMI information, so that an AV data cannot be unauthorizedly viewed or listened. Therefore, the hard disk apparatus of the embodiment has high reliability.

In the first embodiment described above, it is not always necessary to place EMI information in the system area 72, and EMI information may be placed in the user area 73. In this case, however, a measure for preventing EMI information from being directly changed by the user is required. This will be specifically described in fourth and fifth embodiments.

EMI information may be recorded into an area which cannot be accessed by the LBA accessing means 3. In the case of a hard disk apparatus, there is an alternate sector area for an alternate process, and EMI information may be recorded into the alternate sector area. In this case, the EMI accessing/rewriting means 23 directly designates a physical address such as a cylinder, a head, or a sector of the disk medium 6.

The digital I/F means of the embodiment is an example of the inputting means in the invention, and the EMI accessing/rewriting means and the data block accessing means in the embodiment are examples of the recording and reproducing means in the invention.

In place of the LBA accessing means in the embodiment, accessing means for designating a cylinder, a head, or a sector may be used. In this case, EMI information may be recorded in any area which cannot be changed by the user.

Embodiment 2

Next, a second embodiment will be described.

In the embodiment, taking a VCR (Video Cassette Recorder) as an example of a recording and reproducing apparatus, the case will be described where EMI is recorded in an area which the user cannot access; when EMI is not 00 during recording, an AV data is reencrypted for recording and then recorded; when EMI is not 00 during reproduction, an AV data is encrypted and then output; when EMI is 10 during recording, it is rewritten to 01 and then recording is performed; and, when EMI is 11 during recording, recording is not performed, and EMI and an AV data are stored into different areas.

Figure 2:
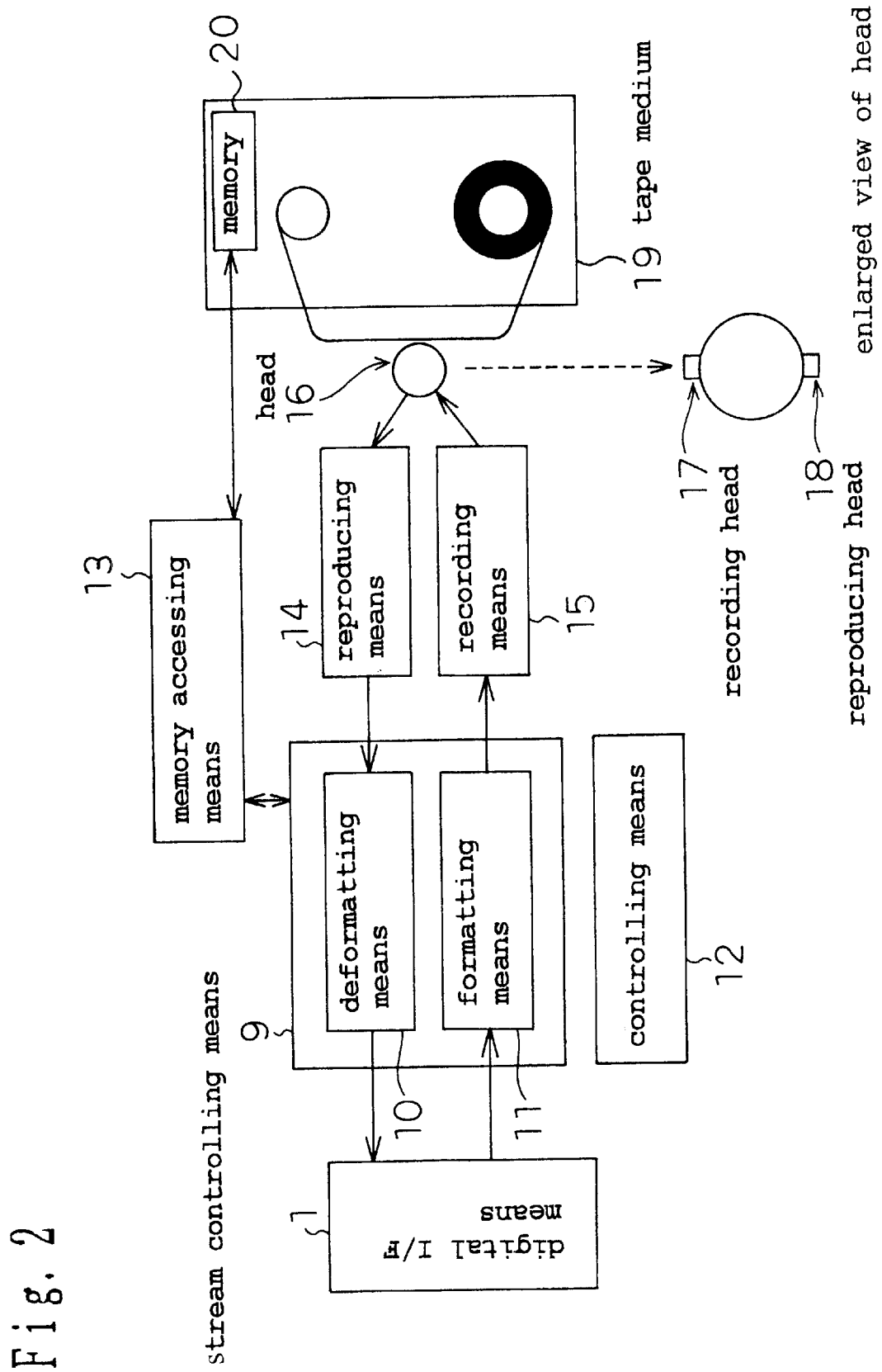
FIG. 2 is a basic configuration view of a tape apparatus in a second embodiment of the invention.

FIG. 2 shows the basic configuration of a VCR. Namely, the VCR is configured by digital I/F means 1, stream controlling means 9, deformatting means 10, formatting means 11, controlling means 12, memory accessing means 13, reproducing means 14, recording means 15, a head 16, a recording head 17, a reproducing head 18, a tape medium 19, and a memory 20.

The digital I/F means 1 is means for interconnecting external AV apparatuses such as an STB, a television monitor, a DVHS, and a hard disk apparatus, for controlling the AV apparatuses, and for transferring an AV data. The stream controlling means 9 is means for performing accessing of a stream and an authenticating process. The deformatting means 10 is means for converting the format of a signal which is reproduced by the reproducing means 14. The formatting means 11 is means for converting a format to a signal which is to be recorded onto the tape medium 19, and for transferring it to the recording means 15. The controlling means 12 is means for controlling running of a tape, tracking of the head 16, the reproducing means 14, and the recording means 15. The memory accessing means 13 is means for accessing the memory 20 added to the tape medium 19. The reproducing means 14 is means for signal processing a reproduction signal from the reproducing head 18 of the head 16, and for outputting a digital AV data. The recording means 15 is means for signal processing an AV data from the stream controlling means 9, and for sending a record signal to the recording head 17 of the head 16. The head 16 is means for recording a signal onto the tape medium 19, and for reproducing a signal on the tape medium 19. The recording head 17 is disposed in the head 16, and is means for recording a signal onto the tape medium 19. The reproducing head 18 is disposed in the head 16, and is means for reproducing a signal on the tape medium 19. The tape medium 19 is means for recording a signal for the purpose of recording and reproduction. The memory 20 is means for recording and reproducing EMI information.

Figure 6:
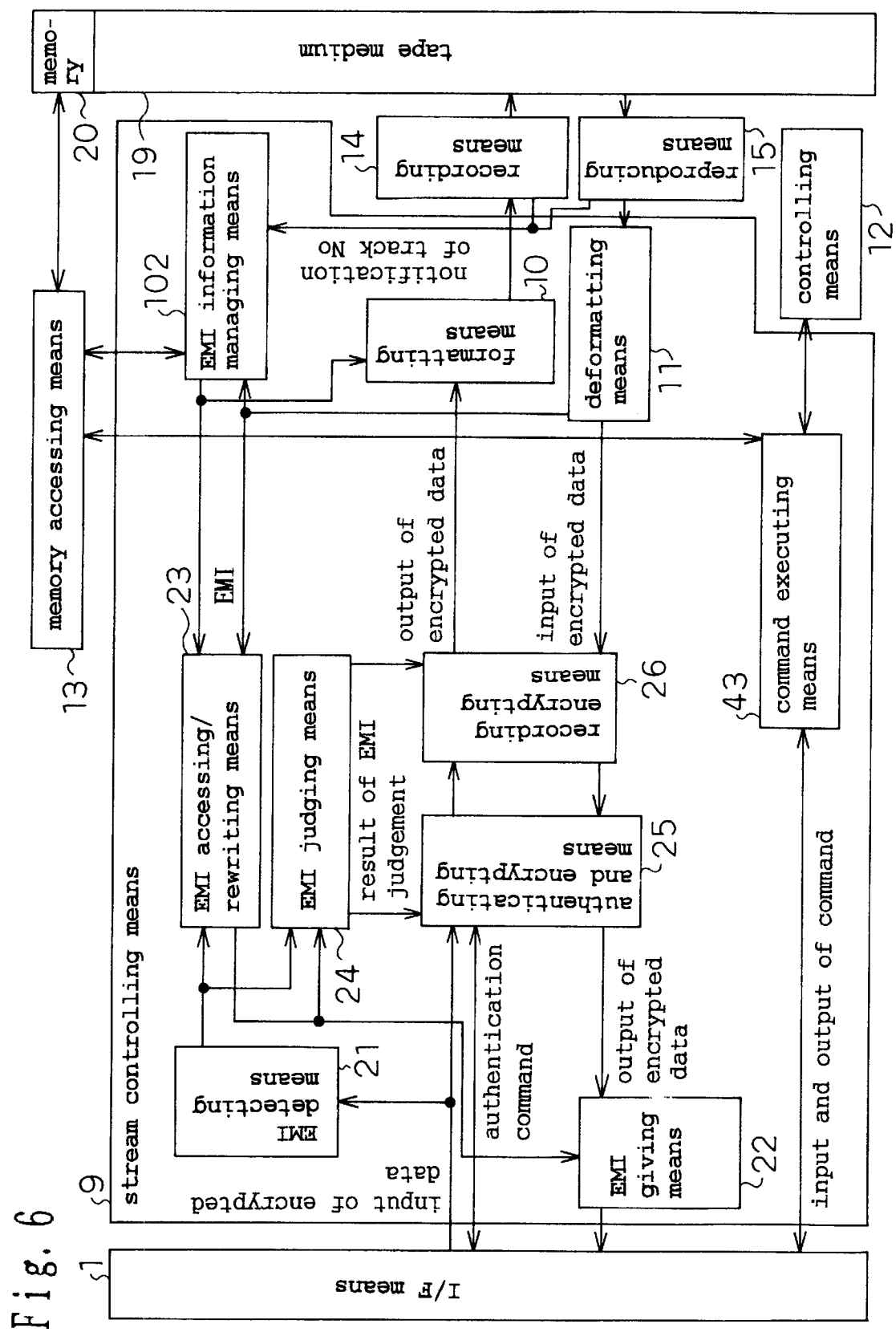
FIG. 6 is a block diagram of stream controlling means constituting a VCR in the second embodiment of the invention.

Returning to FIG. 2, the stream controlling means 9 of the VCR is configured as shown in FIG. 6. Namely, the stream controlling means is configured by EMI detecting means 21, EMI giving means 22, EMI accessing/rewriting means 23, EMI judging means 24, authenticating and encrypting means 25, recording encrypting means 26, the formatting means 10, the deformatting means 11, command executing means 43, and EMI information managing means 102.

In the embodiment, only portions which are different from the first embodiment will be described. The formatting means 10 and the deformatting means 11 have been described above. The command executing means 43 is means for executing a command received from the digital I/F means 1, for interpreting the processing contents of the command, and for instructing the controlling means 12 to perform reproduction, recording, stop, and the like. For example, such a command is a system conforming to AV/C Digital Interface Command Set VCR subunit Specification version 2.0.1. The EMI information managing means 102 is means for, in recording, recording EMI information detected by the EMI detecting means 21, correspondingly with the track number which is notified from the recording means 14, and for, in reproduction, reading out EMI information corresponding to the track number which is notified from the reproducing means 15.

Next, the operation of the embodiment will be described.

The case where a source apparatus sending an AV data is an STB will be described. There is a controller which sends a program reception command, a record start command, a record stop command, and the like to an apparatus coupled via an IEEE 1394 bus. The description of exchange of commands among the controller, the VCR, and the STB departs from the spirit of the embodiment. In the embodiment, therefore, the description is omitted. Authentication of the STB and the VCR is identical with that of the first embodiment, and hence its description is omitted.

It is assumed that the command executing means 43 receives a record command via the digital I/F means 1. The controlling means 12 controls the tape medium 19 to run, and instructs the recording means 14 to perform recording. The recording means 14 notifies the number (=x) of the track which is currently accessed, to the EMI accessing/rewriting means 23 and the EMI information managing means 102. The EMI accessing/rewriting means 23 rewrites the EMI information detected by the EMI detecting means 21, correspondingly with the value of the information. In the case where EMI is 10 or "copy one generation," EMI information is rewritten to 01 or "no more copy." The EMI information managing means 102 records the EMI information and the notified track number correspondingly with each other. When EMI of an AV data sent via the digital I/F means 1 is not 00, the changeover switch 34 is switched so that the AV data passes through the decoding means 30. When EMI is 00, the changeover switch 34 is switched so that the AV data does not pass through the decoding means 30. The decoding means 30 decodes the encrypted AV data by using the received key. The recording encrypting means 26 reencrypts the AV data which has passed through the authenticating and encrypting means 25. Namely, in response to the result of the EMI judging means 24, the encryption selecting means 39 decides the method of encryption in accordance with the value of EMI. Specifically, when EMI is 00 or "copy free," the encryption selecting means 39 switches the changeover switch 42 so as not to pass through the encrypting means A 40. When EMI is not 00, the encryption selecting means 39 switches the changeover switch 42 so as to pass through the encrypting means A 40. In this way, when EMI of an AV data to be recorded is 00, the data is not encrypted, and, when EMI is not 00, the data is reencrypted. The AV data which has passed through the recording encrypting means 26 is transferred to the formatting means 10 to be format-converted, and then recorded onto the tape medium 19 via the recording means 14. Next, the track number is incremented by one, or x=x+1 is set. Next, it is judged whether another command from the digital I/F means 1 is received or not. If another command is received, the process is ended. If not, the process which has been performed after the reception of the record command is repeatedly performed until another command is received. The case where an AV data is to be recorded into the VCR has been described.

Next, the case where the VCR reproduces an AV data will be described. The case where an AV data is to be reproduced on a television monitor will be considered. It is assumed that an AV data recorded in the VCR was recorded from the STB. There is a controller which sends a reproduction start command, a reproduction stop command, and the like to an apparatus coupled via an IEEE 1394 bus. The description of exchange of commands among the controller, the VCR, and the television monitor departs from the spirit of the embodiment. In the embodiment, therefore, the description is omitted. Authentication is identical with that of the first embodiment, and hence its description is omitted.

It is assumed that the command executing means 43 receives the reproduction command from the digital I/F means 1. The controlling means 12 controls the tape medium 19 to run, and instructs the reproducing means 15 to perform reproduction from the tape medium 19. The reproducing means 15 notifies the current track number (=x) to the EMI accessing/rewriting means 23 and the EMI information managing means 102. The EMI accessing/rewriting means 23 and the EMI information managing means 102 read out EMI information corresponding to the notified track number (=x). The read-out EMI information is subjected to judgement in the EMI judging means 24, and then sent to the EMI giving means 22, the authenticating and encrypting means 25, and the recording encrypting means 26. The AV data which is reproduced by the reproducing means 15 and format-converted by the deformatting means 11 is sent to the recording encrypting means 26.

When the EMI judgement result shows that EMI is 00, the changeover switch 35 of the authenticating and encrypting means 25 is switched to the side in which the data does not pass through the encrypting means 33, and the changeover switch 41 of the recording encrypting means 26 is switched to the side in which the data does not pass through the decoding means A 37. Therefore, the AV data is output without being encrypted. When EMI is not 00, the changeover switch 35 is switched to the side in which the data passes through the encrypting means 33.

When EMI is not 00, the changeover switch 41 is switched to the decoding means A 37 by instructions of the encryption selecting means 39 based on the value of EMI. The AV data which is formed as plaintext by the recording encrypting means 26 is encrypted by the encrypting means 33, paired with EMI information by the EMI giving means 22, and then output via the digital I/F means 1. It is assumed that an apparatus serving as a reproduction destination is previously selected in the step of authentication. This has been described in the first embodiment.

Next, the block number is incremented by one, or x=x+1 is set. Next, it is judged whether another command from the digital I/F means 1 is received or not. If another command is received, the process is ended. If not, the process which has been performed after the reception of the reproduction command is repeatedly performed until another command is received.

In the embodiment, the kind of recording encryption, and that of the key are switched over in accordance with EMI information in the same manner as the first embodiment. Even when the user tampers with EMI information, therefore, correspondence with recording encryption is not established, and correct decoding cannot be performed. Therefore, the tampering can be nullified.

Next, the method of recording EMI information will be described.

Figure 17:
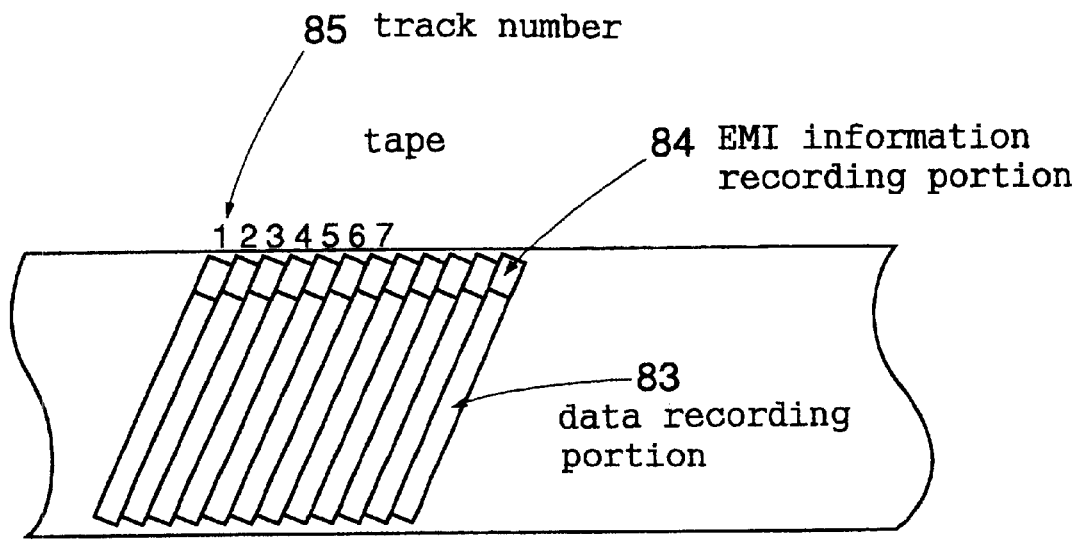
FIG. 17 is a view showing a recording method in the second embodiment of the invention in the case where EMI is recorded onto a tape.

FIG. 17 shows an AV data and EMI information which are to be recorded onto a tape. An AV data is recorded in a data recording portion 83, and EMI information is recorded in an EMI information recording portion 84. The EMI information recording portion 84 is an area which the user cannot access. Therefore, the user cannot tamper with the EMI information to modify the terms of the copy right.

Figure 18:
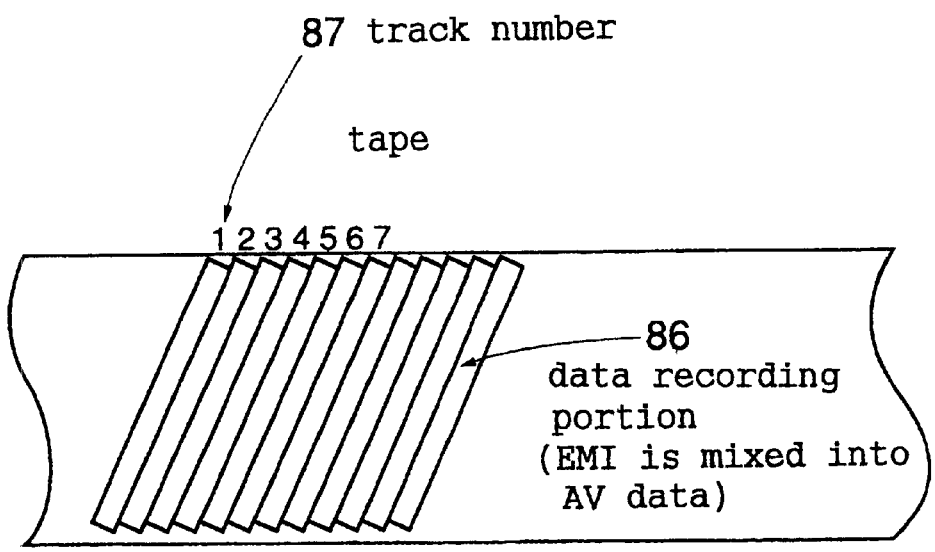
FIG. 18 is a view showing a recording method in the second embodiment of the invention in the case where EMI is recorded onto a tape with being embedded into an AV data.

FIG. 18 shows another method of recording an AV data and EMI information which are to be recorded onto a tape. An AV data is recorded into a data recording portion 86. EMI is recorded while being mixed with the AV data.

Figure 19:
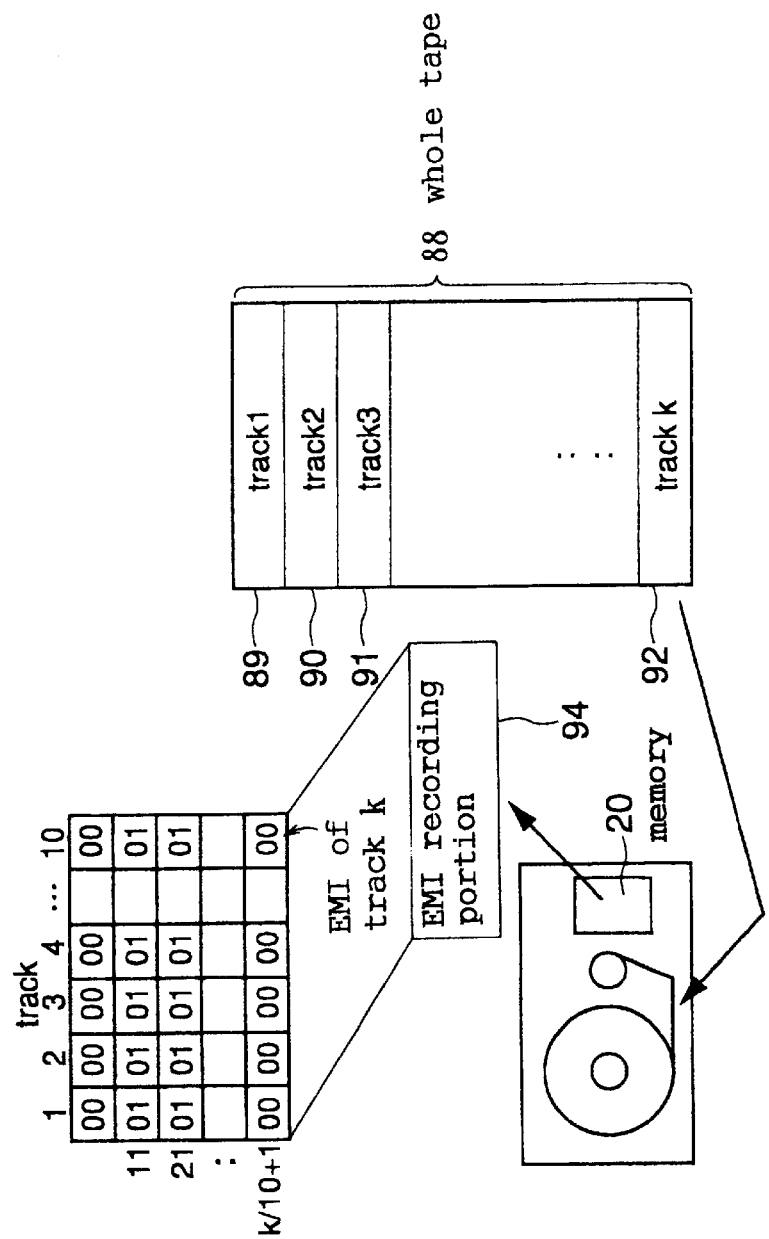
FIG. 19 is a view showing a recording method in the second embodiment of the invention in the case where EMI is recorded into a memory given to a tape medium, every unit of track.
Figure 20:
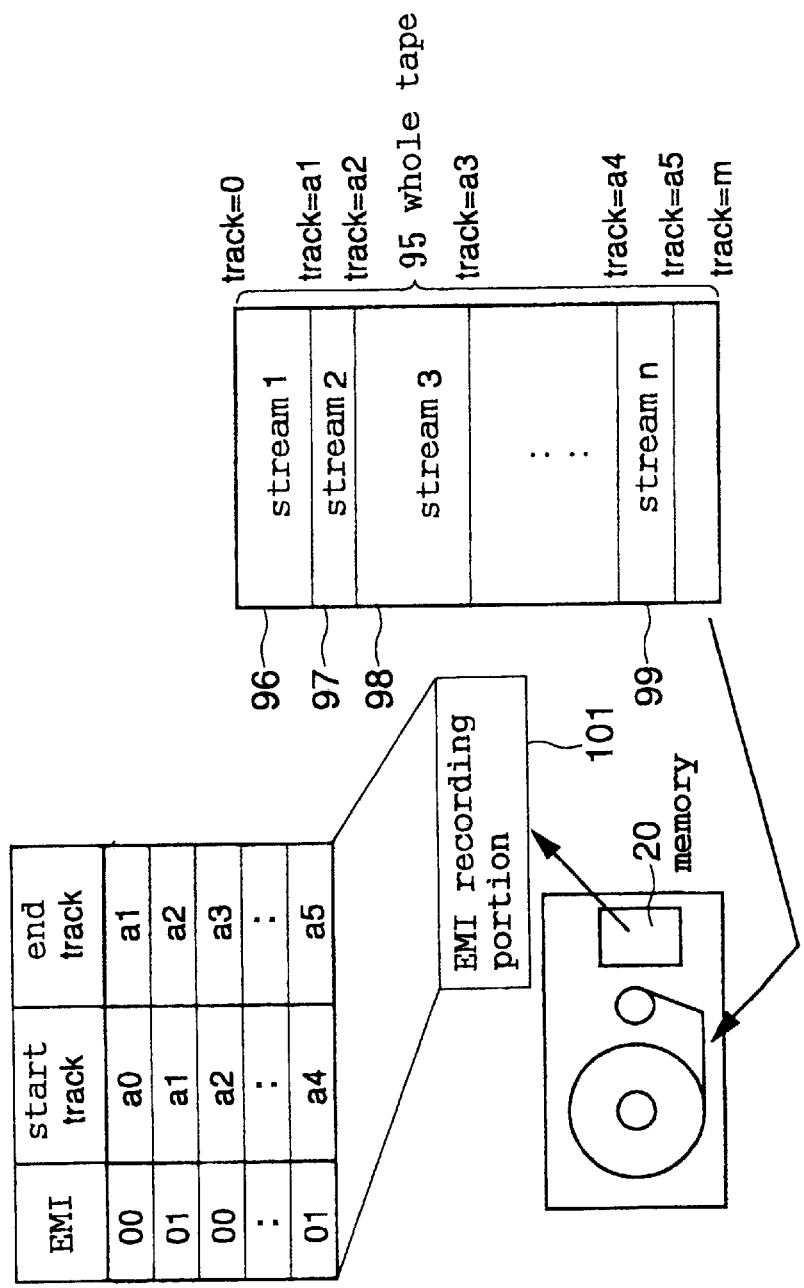
FIG. 20 is a view showing a recording method in the second embodiment of the invention in the case where EMI is recorded into a memory given to a tape medium, at each turning point of EMI.

FIGS. 19 and 20 respectively show the cases where EMI information is recorded into the memory 20 added to the tape medium 19.

In FIG. 19, an EMI recording portion 94 is disposed in a part of the memory 20. EMI information of each track is recorded in the EMI recording portion 94. The whole tape 88 is configured by a k number of tracks. The EMI recording portion 94 in which EMI is to be recorded is disposed in a part of the memory 20. EMI of each block is recorded in this area. Referring to a table which is stored in the form of a bit map, all EMI of block 1 (89), block 2 (90), block 3 (91), and block k (92) is 00. Namely, this shows that the area is "copy free." However, areas such as the block k (65) are areas which have not yet been used. It is assumed that, with respect to an unused area also, EMI information is set to 00. Since EMI of block 11, block 12, and block 13 is 01, they are areas of "no more copy. " Such EMI information is produced and updated by the EMI accessing/rewriting means 23. Since EMI information is stored in the memory 20, the user cannot easily tamper with contents of the EMI information, so that an AV data cannot be unauthorizedly viewed or listened. Therefore, the VCR having the function of the embodiment has high reliability.

FIG. 20 shows the case where EMI information is managed by means of an address. A stream is defined while dividing data each time when EMI information is changed. With respect to EMI information, EMI information is expressed by EMI of the stream, and the start track and the end track of the stream. In stream 1 (96), the start track is a0, the end track is a1, and all EMI is "copy free." In stream 2 (97), the start track is a1, the end track is a2, and all EMI is "no more copy." In stream 3 (98), the start track is a2, the end track is a3, and all EMI is "copy free." In stream n (99), the start track is a4, the end track is a5, and all EMI is "no more copy." Such EMI information is produced and updated by the EMI accessing/rewriting means 23. Since EMI information is stored in the memory 20, the user cannot easily tamper with contents of the EMI information, so that an AV data cannot be unauthorizedly viewed or listened. Therefore, the VCR of the embodiment has high reliability.

It is assumed that authentication is performed after the apparatus receives the record start command. The invention is not restricted to this. A method such as that in which, when connection is made by means of IEEE 1394 or a former program is received, authentication is previously performed may be employed.

In the above, the description has been made while assuming that the meaning of bits of EMI to be recorded is identical with that of EMI to be transmitted. The invention is not restricted to this. In a recording apparatus, unique bit allocation may be performed.

The digital I/F means of the embodiment is an example of the inputting means in the invention, and the EMI accessing/rewriting means, the EMI information managing means, the formatting means, and the deformatting means of the embodiment are examples of the recording and reproducing means in the invention.

Embodiment 3

Next, a third embodiment will be described.

In the embodiment, taking an optical disk apparatus (for example, a DVD-R, or a DVD-RAM) as an example of a recording and reproducing apparatus, the case will be described where EMI is recorded in an area which the user cannot access; when EMI is not 00 during recording, an AV data is reencrypted for recording and then recorded; when EMI is not 00 during reproduction, an AV data is encrypted and then output; when EMI is 10 during recording, it is rewritten to 01 and then recording is performed; when EMI is 11 during recording, recording is not performed; and, when a disk medium on which an AV data in which CGMS is 11 or 10 is previously encrypted for recording and then recorded is to be reproduced, an encrypted data for recording is decoded and then output after being encrypted, and EMI and an AV data are stored into different areas.

Figure 22:
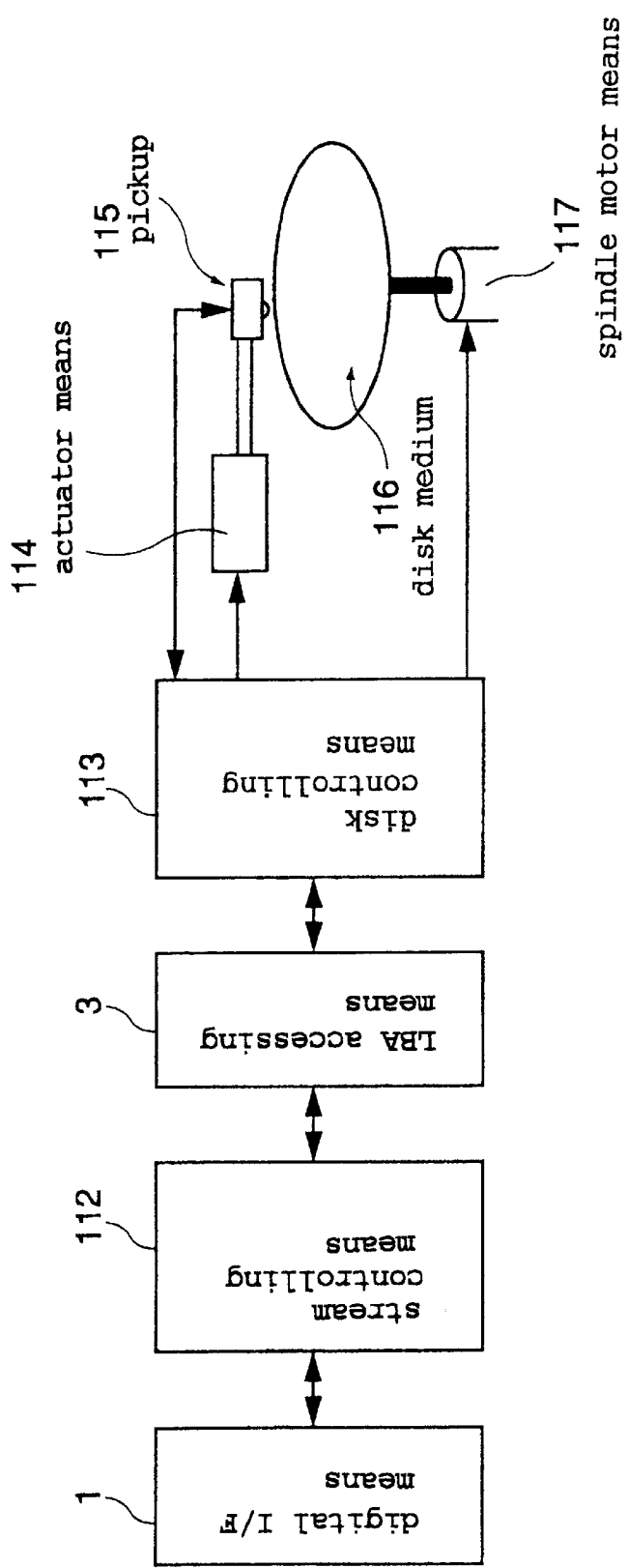
FIG. 22 is a view showing a basic configuration view of an optical disk in the third embodiment of the invention.
Figure 23:
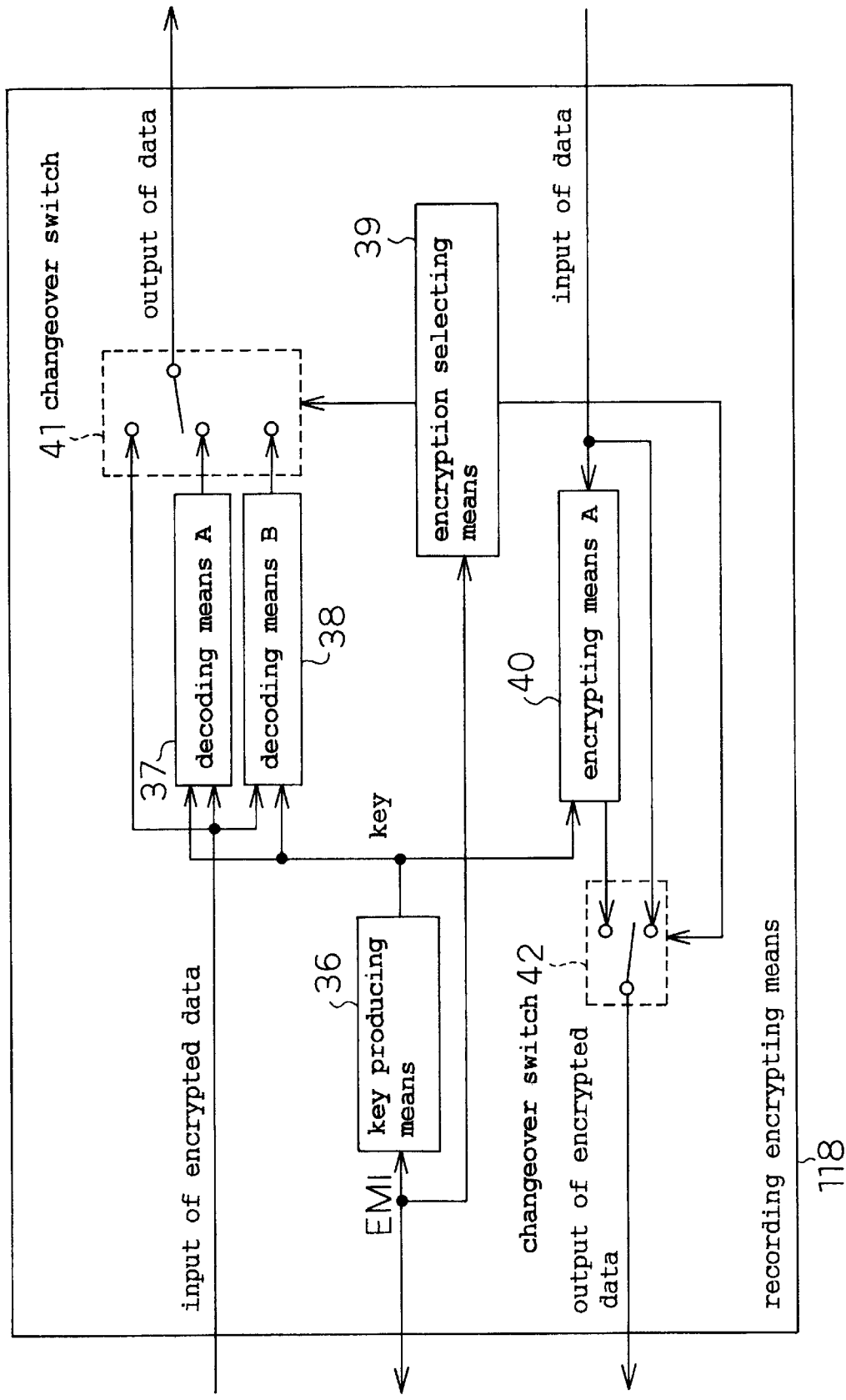
FIG. 23 is a block diagram showing the configuration of recording encrypting means in the third embodiment of the invention.

FIG. 22 is a view showing the basic configuration of the optical disk apparatus of the embodiment. The optical disk apparatus is configured by the digital I/F means 1, stream controlling means 112, LBA accessing means 3, disk controlling means 113, actuator means 114, a disk medium 116, a pickup 115, and spindle motor means 117. The digital I/F means 1 and the LBA accessing means 3 are identical with those of the basic configuration of the hard disk apparatus which has been described in the first embodiment, and hence their description is omitted. The configuration of the stream controlling means is fundamentally identical with the basic configuration of the hard disk apparatus which has been described in the first embodiment, but is different in that recording encrypting means 118 of FIG. 23 is used in place of the recording encrypting means 26. The recording encrypting means 118 will be described later.

The disk controlling means 113 is means for controlling the actuator means 114, the spindle motor means 117, and the pickup 115, and for performing signal processing for performing recording and reproduction on the disk medium 116 via the pickup 115. The spindle motor means 117 is means for rotating the disk medium 116 at a constant linear velocity, rotating each zone at a constant rotational velocity, or rotating each zone at a constant linear velocity, thereby controlling to the number of revolutions appropriate for performing recording or reproduction on the disk medium. The actuator means 114 is means for positioning the pickup to an objective recording and reproducing position of the disk medium. The pickup 115 is means for controlling the focal length and tracking with respect to the disk medium 116, and signaling or reproducing with respect to the disk medium.

The recording encrypting means 118 is configured as shown in FIG. 23. Namely, the recording encrypting means 118 is configured by key producing means 36, decoding means A 37, decoding means B 38, encryption selecting means 39, encrypting means A 40, a changeover switch 41, and a changeover switch 42.

The encryption selecting means 39 is means for switching over techniques of encryption and decoding in accordance with the value of EMI corresponding to a portion of an AV data which is to be recorded or reproduced. When EMI is "copy one generation," for example, the encrypting means A 40 is used in recording, and the decoding means A 37 is used in reproduction. When EMI is "no more copy," the decoding means A 37 is used in reproduction. When EMI is "copy never," the decoding means B 38 is used in reproduction. When EMI is "copy free," an AV data is caused so as not to pass through the encrypting means 40, the decoding means A 37, and the decoding means B 38. The changeover switches 41 and 42 are means for switching to encrypting and decoding methods which are determined by the encryption selecting means 39. The key producing means 36 is means for producing a key which is to be used for encryption/decoding, in accordance with the value of EMI corresponding to a portion of a data which is to be recorded or reproduced, and for transferring the key to the decoding means A 37, the decoding means B 38, and the encrypting means A 40. The encrypting means A 40 is means for, when EMI is "copy one generation," encrypting an AV data which is sent from the authenticating and encrypting means 25, and for transferring the encrypted data to the data block accessing means 27. The decoding means A 37 is means for, when EMI is "no more copy" or "copy one generation," receiving an AV data from the data block accessing means 27, for decoding the AV data, and for transferring the decoded data to the authenticating and encrypting means 25. The decoding means B 38 is means for, when EMI is "copy never," receiving an AV data from the data block accessing means 27, for decoding the AV data, and for transferring the decoded data to the authenticating and encrypting means 25.

Next, the operation of the embodiment will be described.

The case where a source apparatus sending an AV data is an STB will be described. There is a controller which sends a program reception command, a record start command, a record stop command, and the like to an apparatus coupled via an IEEE 1394 bus. The description of exchange of commands among the controller, the optical disk apparatus, and the STB departs from the spirit of the embodiment. In the embodiment, therefore, the description is omitted.

First, it is assumed that the controller sends to the STB a reception start command for starting reception of a program which is sent from a broadcasting station, and the record start command to the optical disk apparatus. Then, the program which is sent from a broadcasting station is received by the STB, and EMI is given to the program. Thereafter, the program is sent as an isochronous packet data to the IEEE 1394 bus. When the optical disk apparatus receives the record start command in the form of a command of the access system 2 or the access system 3 from the digital I/F means 1, the digital I/F means 1 confirms the number of a channel which is intended to be acquired by oneself, and fetches the corresponding isochronous packet data. It is assumed that the record start command in the form of a command of the access system 2 is received. Then, the authenticating means 31 sends an authentication command to the STB. The EMI detecting means 21 detects EMI information held in the-header portion of the fetched isochronous packet data. The EMI judging means 24 judges the presence or absence and the kind of a copy right from the detected EMI information. The result is input to the authenticating and encrypting means 25. The authenticating means 31 determines the authentication method in accordance with the presence or absence and the kind of a copy right. When EMI is 11 or "copy never, the significance of the AV data is high, and hence authentication based on a public key is performed. In the case where recording from the STB to the optical disk is to be performed, however, the optical disk does not record a data, and the optical disk does not perform authentication because "copy never" means copy inhibit, or the authenticating means 31 receives the result of the EMI judging means 24, and the authentication fails. When EMI is 10 or "copy one generation," the significance of the AV data is not higher than that in the case where EMI is 11, and hence authentication based on a common key is performed. When EMI is 00 or "copy free," the AV data is not significant. Therefore, it is deemed that authentication succeeds, without performing authentication. Upon receiving the authentication command, the STB performs authentication based on a common key between the STB and the optical disk apparatus. When the authentication succeeds, the key is transferred to the optical disk apparatus. The authenticating means 31 receives the key sent from the STB, via the digital I/F means 1, and then transfers the key to the decoding means 30. When EMI is 00, however, the authenticating means 31 does not receive the key sent from the STB. In this case, the AV data itself is not encrypted. In the case where EMI is 10, the decoding means 30 receives the key from the authenticating means 31.

It is assumed that the record command is received in the form of a command of the access system 2 via the digital I/F means 1. When EMI of the AV data sent via the digital I/F means 1 is not 00, the changeover switch 34 is switched so that the AV data passes through the decoding means 30. When EMI is 00, the changeover switch 34 is switched so that the AV data does not pass through the decoding means 30. The decoding means 30 decodes the encrypted AV data by using the received key. The stream accessing means 29 instructs the data block accessing means 27 to record block x. The data block accessing means 27 notifies the number (=x) of the block which is currently accessed, to the EMI accessing/rewriting means 23. The EMI accessing/rewriting means 23 records the EMI information detected by the EMI detecting means 21, correspondingly with the notified block number. In the case where EMI is 10 or "copy one generation," when the EMI information is to be recorded onto the disk medium 6, recording is performed while rewriting EMI to 01 or "no more copy." The recording encrypting means 118 reencrypts the AV data which has passed through the authenticating and encrypting means 25. Namely, in response to the result of the EMI judging means 24, the encryption selecting means 39 decides presence or absence of encryption in accordance with the value of EMI. Specifically, when EMI is 00 or "copy free," the encryption selecting means 39 switches the changeover switch 42 so as not to pass through the encrypting means A 40. When EMI is not 00, the encryption selecting means 39 switches the changeover switch 42 so as to pass through the encrypting means A 40. In this way, when EMI of an AV data to be recorded is 00, the data is not encrypted, and, when EMI is not 00, the data is reencrypted. The AV data which has passed through the recording encrypting means 118 is transferred to the data block accessing means 27, and then recorded onto the disk medium 116 via the LBA accessing means 3. Next, the stream accessing means 29 increments the number of the block which is currently accessed, by one or sets x=x+1 in order to update the stream pointer management information. Next, the stream accessing means 29 judges whether another command from the digital I/F means 1 is received or not. If another command is received, the process is ended. If not, the process which has been performed after the reception of the record command is repeatedly performed until another command is received. The case where an AV data is to be recorded onto the disk medium 6 has been described.

Next, the case where the optical disk apparatus reproduces an AV data will be described. The case where an AV data is to be reproduced on a television monitor will be considered. It is assumed that an AV data recorded in the optical disk apparatus was recorded from the STB. There is a controller which sends a reproduction start command, a reproduction stop command, and the like to an apparatus coupled via an IEEE 1394 bus. The description of exchange of commands among the controller, the optical disk apparatus, and the television monitor departs from the spirit of the embodiment. In the embodiment, therefore, the description is omitted.

First, the controller sends the reproduction start command to the television monitor, and sends the reproduction start command to the optical disk apparatus also. In the optical disk apparatus, thereafter, the data block accessing means 27 notifies the accessing place to the EMI accessing/rewriting means 23. The EMI accessing/rewriting means 23 fetches EMI information of the notified accessing place, and transfers the EMI information to the EMI giving means 22. The data block accessing means 27 reproduces an AV data via the LBA accessing means 3, the reproduced data is decoded by the recording encrypting means 118, and the decoded data is transferred to the EMI giving means 22 via the authenticating and encrypting means 25. The EMI giving means 22 sends a pair of the AV data and EMI as an isochronous packet data to the IEEE 1394 bus via the digital I/F means 1. The television monitor sends an authentication command to the optical disk apparatus. The television monitor fetches the isochronous packet data sent from the optical disk apparatus, and determines the authentication method while referring the EMI information given to the data. When EMI is 01 or "no more copy," the authenticating means 31 performs authentication with respect to the television monitor based on a common key via the-digital I/F means 1. When EMI is 00, authentication is not performed, and it is deemed that authentication succeeds. The embodiment handles the case where a data which is obtained by recording an AV data sent from the STB is reproduced. Therefore, all AV data in which EMI is 10 or "copy one generation" are recorded while rewriting EMI to 01. When the optical disk apparatus receives the authentication command via the digital I/F means 1, the authenticating means 31 determines the kind of authentication while referring the EMI information, and performs authentication with respect to the television monitor. When authentication succeeds, the authenticating means 31 transfers the key which is produced by the key producing means 32, to the encrypting means 33. When EMI is 00, the key is not transferred to the encrypting means 33, and the changeover switch 35 is switched to the side in which the data does not pass through the encrypting means 33. When EMI is not 00, the changeover switch 35 is switched to the side in which the data passes through the encrypting means 33.

It is assumed that the optical disk apparatus receives the reproduction command in the form of a command of the access system 2 from the digital I/F means 1. The stream accessing means 29 instructs the data block accessing means 27 to reproduce block x. The data block accessing means 27 notifies the number (=x) of the block which is currently accessed, to the EMI accessing/rewriting means 23. At the same time, the data block accessing means 27 reads out an AV data from the disk medium 116 via the LBA accessing means 3. The EMI accessing/rewriting means 23 reads out EMI information corresponding to the notified block number from the disk medium 116. The read out EMI information is subjected to judgement in the EMI judging means 24. The judgement result is sent to the recording encrypting means 118 and the authenticating and encrypting means 25. The AV data which is read out by the data block accessing means 27 is transferred to the recording encrypting means 118.

When the EMI judgement result shows that EMI is 00, the changeover switch 35 of the authenticating and encrypting means 25 is switched to the side in which the data does not pass through the encrypting means 33, and the changeover switch 41 of the recording encrypting means 118 is switched to the side in which the data does not pass through both the decoding means A 37 and the decoding means B 38. Therefore, the AV data is output without being encrypted. When EMI is not 00, the changeover switch 35 is switched to the side in which the data passes through the encrypting means 33.

When EMI is not 00, the changeover switch 41 is switched to either of the decoding means A 37 and the decoding means B 38 by instructions of the encryption selecting means 39 based on the value of EMI. In the case where an AV data from the STB is to be recorded and reproduced, the decoding means A is selected because EMI=01. The AV data which is formed as plaintext by the recording encrypting means 118 is encrypted by the encrypting means 33, and then output via the digital I/F means 1.

Next, the stream accessing means 29 updates the stream pointer management information to increment the number of the block which is currently accessed, by one, or sets x=x+1. Next, the stream accessing means 29 judges whether another command from the digital I/F means 1 is received or not. If another command is received, the process is ended. If not, the process which has been performed after the reception of the reproduction command is repeatedly performed until another command is received.

Next, the case where a DVD-ROM medium in which prerecording is previously performed and CGMS=11 or CGMS=10 is to be reproduced on a television monitor will be considered. It is assumed that an AV data of CGMS=11 has been recorded by the recording encryption method B, and an AV data of CGMS=10 has been recorded by the recording encryption method A. Furthermore, it is assumed that the optical disk apparatus described in the embodiment can understand a CGMS in a recording medium.

First, the case where a prerecorded disk of CGMS=11 is to be reproduced will be described. A controller sends the reproduction start command to the television monitor, and sends the reproduction start command to the optical disk apparatus also. Then, the optical disk apparatus reads out a CGMS signal recorded in a specific area of the disk medium, and it is known that CGMS=11 (copy never). Therefore, the EMI giving means 22 sends the encrypted data to the IEEE 1394 bus with adding EMI=11. At this time, the process flows in the following manner. First, the result of the CGMS is notified to the EMI accessing/rewriting means 23, and a process is performed while assuming that an AV data of EMI=11 is recorded. As a result, the EMI judging means 24 judges that EMI=11. In accordance with the result of judgement on EMI, the data output of the recording encrypting means 118 is switched to the decoding means B 38 by the encryption selecting means 39. This causes the AV data which is recorded with being encrypted, to be once decoded. In accordance with the result of judgement on EMI, the changeover switch 33 of the authenticating and encrypting means 25 is switched to the side in which the data passes through the encrypting means 33. As a result, a reencrypted AV data is output onto the IEEE 1394 bus. On the other hand, the television monitor issues an authentication command to the optical disk apparatus. Because of the data of EMI 11, authentication based on a public key is performed. When the authentication succeeds, the optical disk apparatus transfers the key to the television monitor. The television monitor decodes the encrypted AV data by using the key, and reproduces the data on a screen.

Next, the case where a prerecorded disk of CGMS=10 is to be reproduced will be described. The controller sends the reproduction start command to the television monitor, and sends the reproduction start command to the optical disk apparatus also. Then, the optical disk apparatus reads out a CGMS signal recorded in a specific area of the disk medium 116, and it is known that CGMS=10 (copy one generation). Therefore, the EMI giving means 22 sends the encrypted data to the IEEE 1394 bus with adding EMI=10. At this time, the process flows in the following manner. First, the result of the CGMS is notified to the EMI accessing/rewriting means 23, and a process is performed while assuming that an AV data of EMI=10 is recorded. As a result, the EMI judging means 24 judges that EMI=10. In accordance with the result of judgement on EMI, the data output of the recording encrypting means 118 is switched to the decoding means A 37 by the encryption selecting means 39. This causes the AV data which is recorded with being encrypted, to be once decoded. In accordance with the result of judgement on EMI, the changeover switch 35 of the authenticating and encrypting means 25 is switched to the side in which the data passes through the encrypting means 33. As a result, a reencrypted AV data is output onto the IEEE 1394 bus. On the other hand, the television monitor issues an authentication command to the optical disk apparatus. Because of the data of EMI=10, authentication based on a common key is performed. When the authentication succeeds, the optical disk apparatus transfers the key to the television monitor. The television monitor decodes the encrypted AV data by using the key, and reproduces the data on the screen.

As described above, in the embodiment, the method of recording encryption is changed in accordance with EMI information. Even when EMI is tampered with during output, therefore, the method of recording encryption is different, and, when recording encryption is to be decoded, the decoding is performed by another method which fails to correspond. As a result, a correct data is not obtained, and hence the tampering can be nullified.

Figure 24:
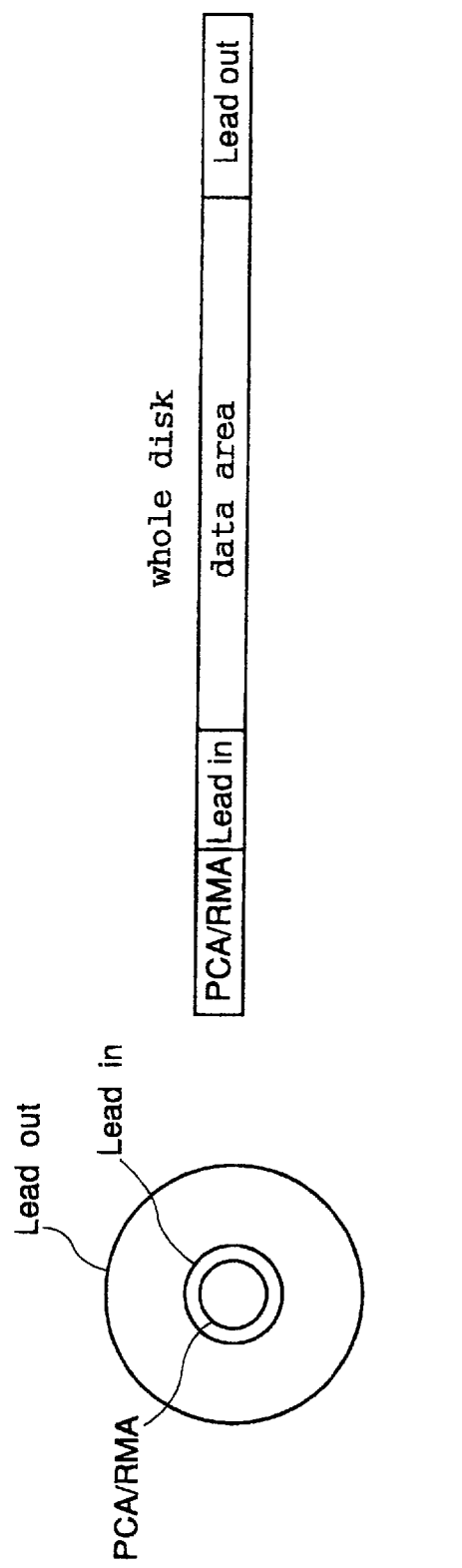
FIG. 24 is a view showing a recording format of a DVD-R in the third and ninth embodiments of the invention.
Figure 25:
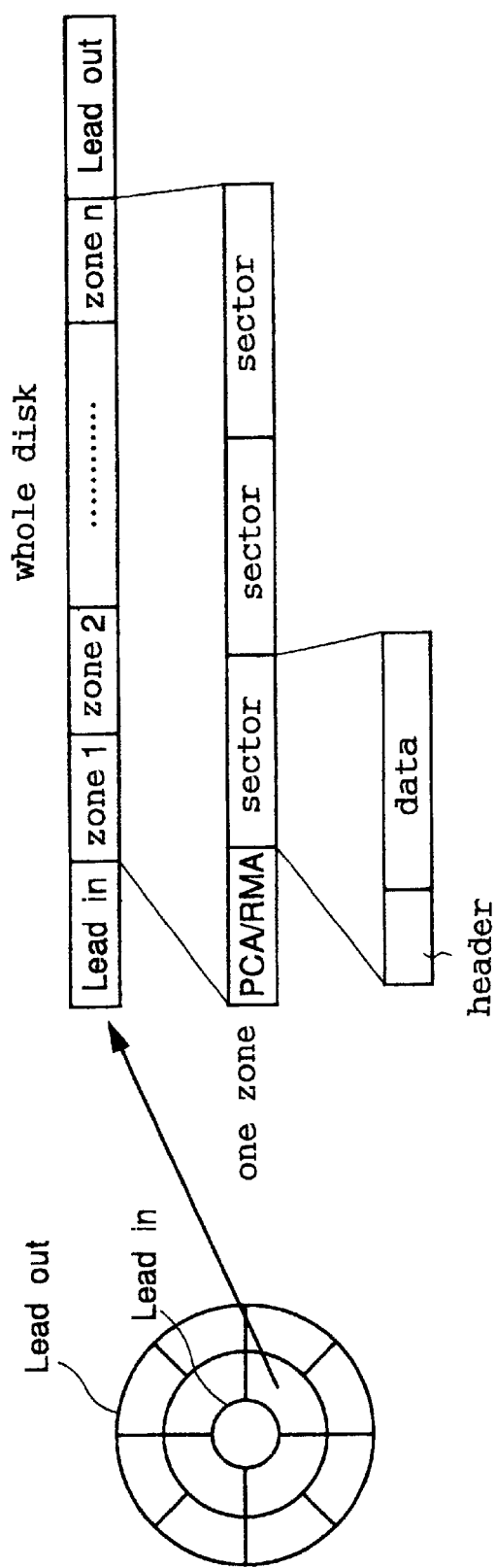
FIG. 25 is a view showing a recording format of a DVD-RAM in the third and ninth embodiments of the invention.

In the embodiment, EMI information may be recorded into an area which cannot be accessed by the LBA accessing means. As shown in FIG. 24, in the case of a DVD-R, the area may be an area which is called a power calibration area (PCA) and which is used in test writing for adjustment of the laser power or the like, or an area which is called a recording management area (RMA) where information of an after-writing position in the case where a data is after-written. Alternatively, a lead-in area where TOC information and the like are recorded, or a lead-out area indicating the end may be used. As shown in FIG. 25, in the case of a DVD-RAM, a header portion where ID information for each sector and the like are recorded may be used in addition to the above-mentioned areas. In a DVD-RAM also, EMI may be recorded in an alternate sector area. In summary, EMI is required to be recorded in an area which the user cannot directly access.

The EMI recording format may be implemented in the same manner as that shown in the first embodiment.

In place of the LBA accessing means in the embodiment, MSF accessing means may be used. MSF accessing means is used for designating a physical address on an optical disk by means of a minute, a second, and a frame (one frame equals to $1/75$ sec.).

Embodiment 4

Next, a fourth embodiment will be described.

In the embodiment, in addition to the first embodiment, the case where, when authentication has not yet been completed and EMI is not 00, an invalid data is output will be described.

Figure 7:
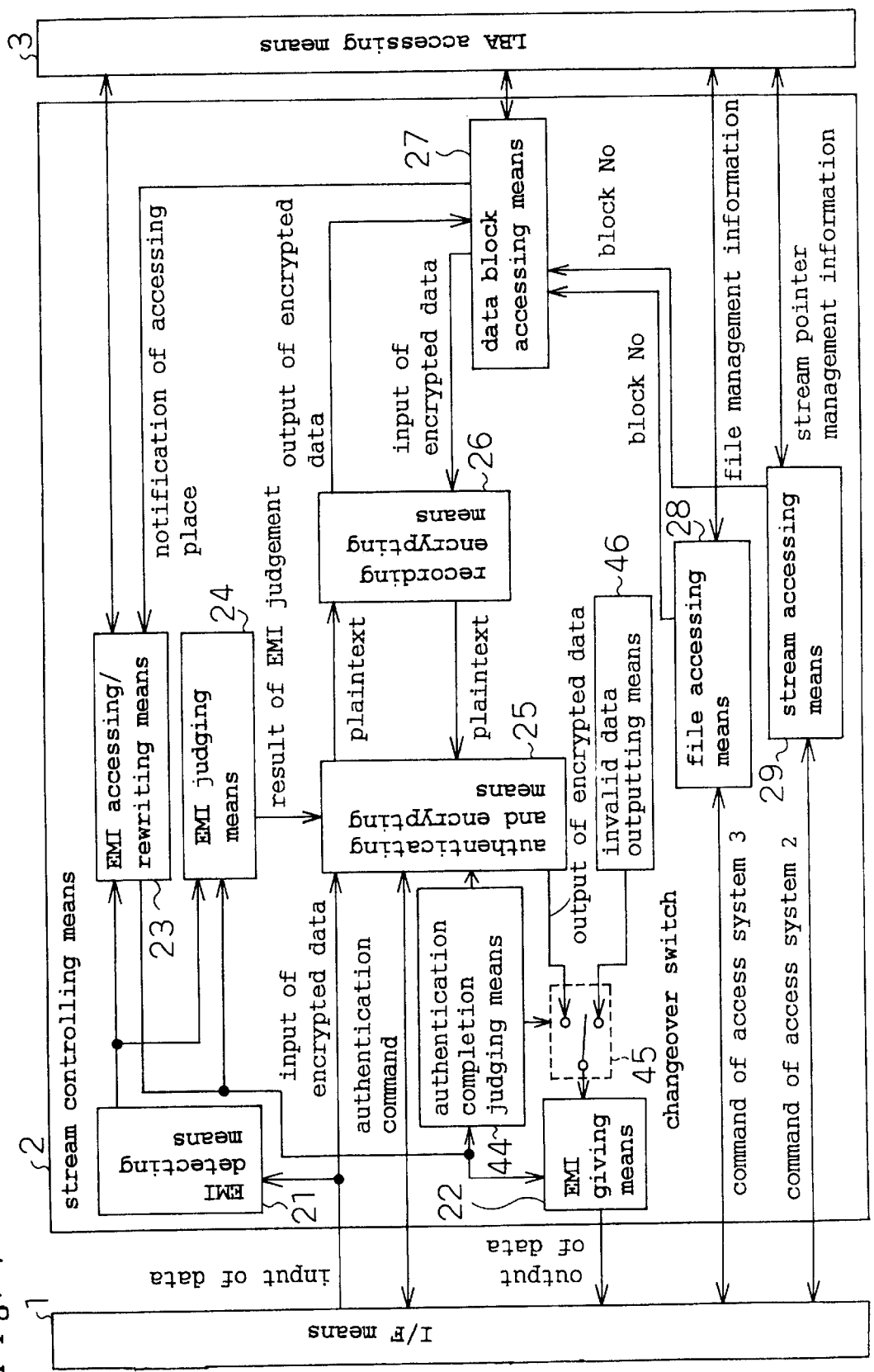
FIG. 7 is a block diagram of stream controlling means constituting the hard disk apparatus in the fourth embodiment of the invention.

In the configuration of the embodiment, only portions which are different from the first embodiment will be described. Referring to FIG. 7, in the stream controlling means 2, authentication completion judging means 44, a changeover switch 45, and invalid data outputting means 46 are portions which are different from the first embodiment. The authentication completion judging means is means for judging whether authentication has succeeded or not. The invalid data outputting means 46 is means for outputting an invalid data such as a blue back screen or a black screen. The changeover switch 45 is means for, when authentication has not yet been completed, switching to the side of the invalid data outputting means 46, and for, when authentication has succeeded, switching to the side of the authenticating and encrypting means 25.

Next, the operation of the embodiment will be described.

In the operation of the embodiment, only portions which are different from the operation of the first embodiment will be described. During reproduction, the authentication completion judging means 44 judges whether authentication has succeeded or not. In the case where EMI is not 00 and authentication has not yet succeeded, the changeover switch 45 is switched to the side of the invalid data outputting means 46. In this case, the invalid data outputting means 46 outputs an invalid data such as a blue back screen or a black screen. In the case where the authentication completion judging means 44 judges that authentication has succeeded or EMI is 00, the changeover switch 45 is switched to the side of the authenticating and encrypting means 25. In this case, when EMI is 00, the authenticating and encrypting means outputs an AV data of plaintext, and, when EMI is not 00, outputs an encrypted AV data.

As described above, when EMI is not 00, a valid data is not output. Therefore, data transfer between AV apparatuses can be performed more safely.

The digital I/F means of the embodiment is an example of the inputting means in the invention, and the EMI accessing/rewriting means and the data block accessing means of the embodiment are examples of the recording and reproducing means in the invention.

Embodiment 5

Next, a fifth embodiment will be described.

In the embodiment, the case where EMI is recorded while being mixed with an AV data unlike the first and third embodiments will be described.

Figure 8:
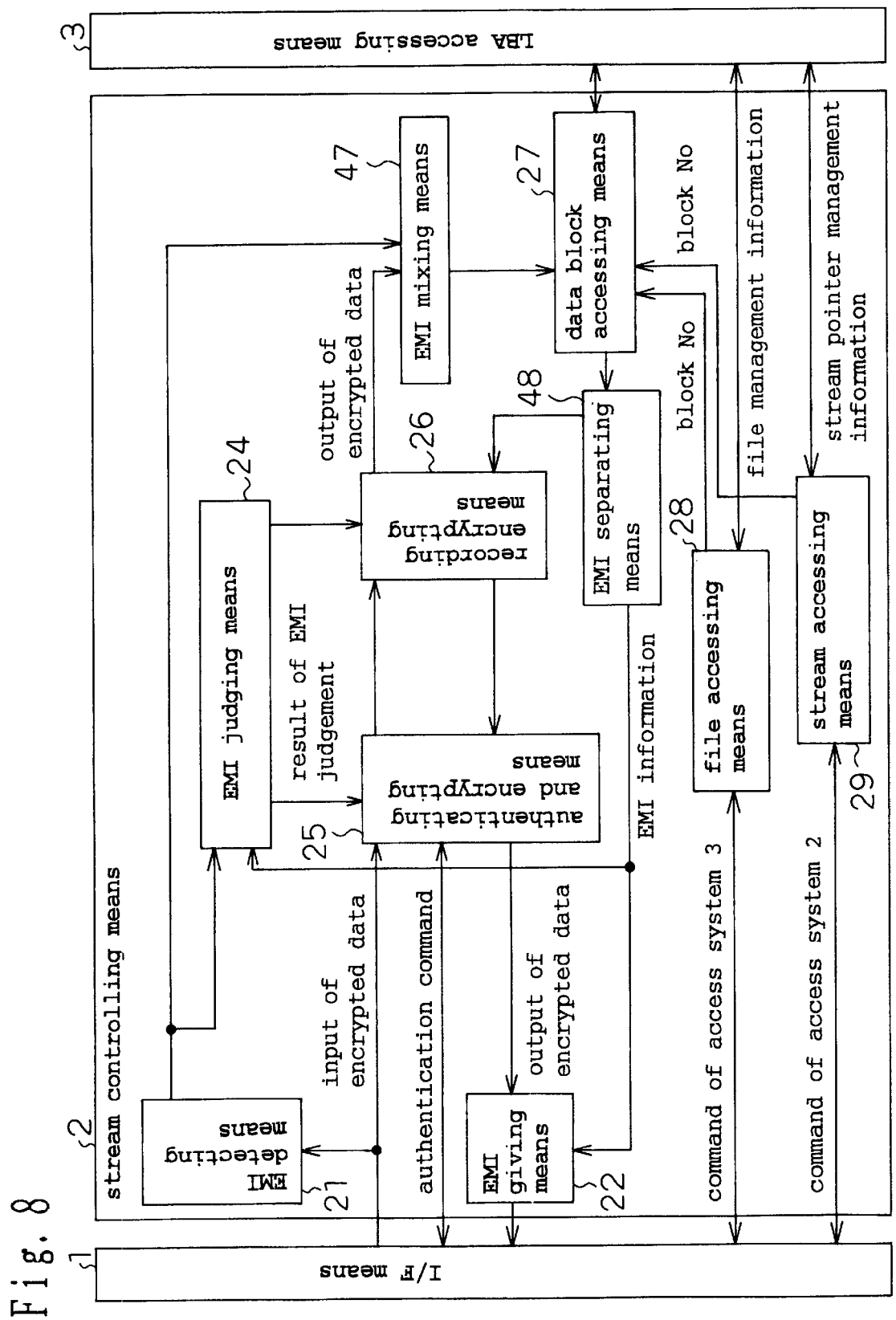
FIG. 8 is a block diagram of stream controlling means constituting the hard disk apparatus in the fifth embodiment of the invention.

In the embodiment, only portions which are different from the first embodiment will be described. In the stream controlling means 2 of FIG. 8, EMI mixing means 47 is means for mixing EMI and an AV data with each other during recording. EMI separating means 48 is means for separating EMI and an AV data from each other during reproduction.

Next, the operation of the embodiment will be described.

In the operation of the embodiment, only portions which are different from the operation of the first embodiment will be described. During recording, EMI which is detected by the EMI detecting means 21, and an AV date which is encrypted by the recording encrypting means 26 are mixed with each other by the EMI mixing means 47. For example, a process such as that of adding EMI to an empty field of an AV data is performed. During reproduction, EMI is separated from a reproduced AV data by the EMI separating means 48.

Figure 16:
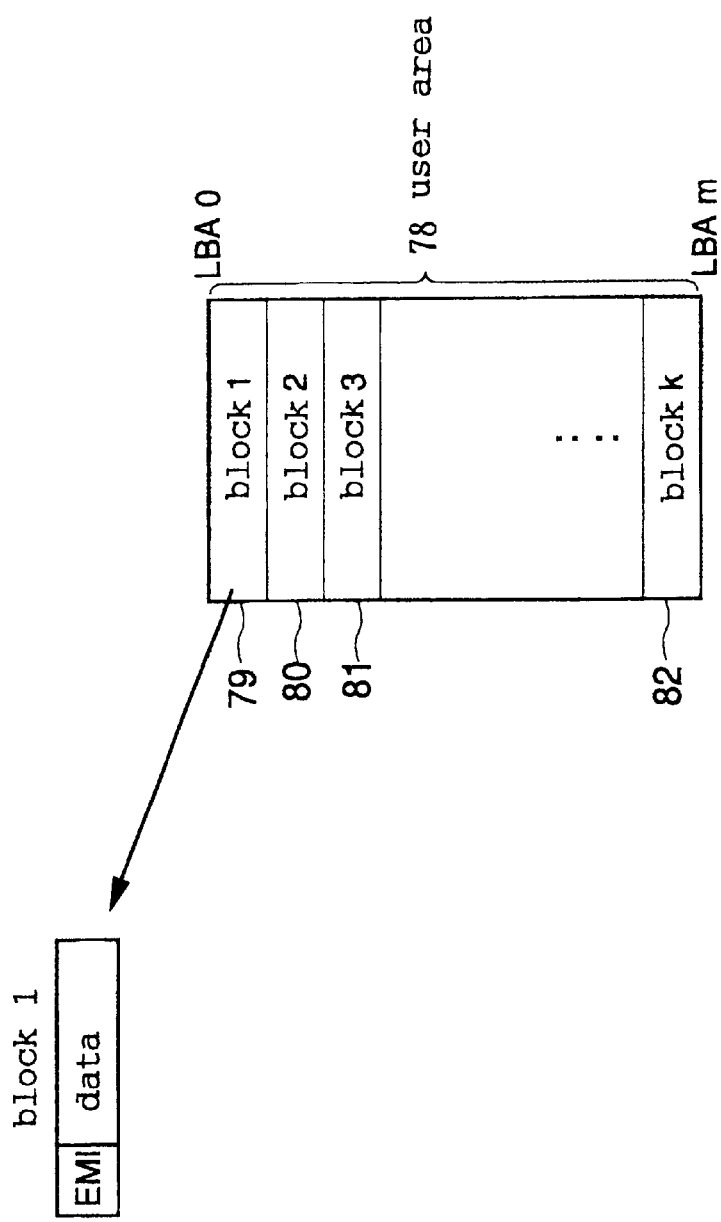
FIG. 16 is a view showing a recording method in the first embodiment of the invention in the case where EMI is recorded with being paired with a block.

A method of recording EMI is performed as shown in FIG. 16. EMI and an AV data are recorded with being paired with each other in a user area 78 of the disk medium 6. EMI and a part of an AV data are recorded with being paired with each other in block 1 (79), block 2 (80), block 3 (81), . . . , and block k (82), respectively.

When an AV data and EMI are mixedly recorded as described above, the frequency of accessing to a disk can be reduced as compared with the case where an AV data and EMI are separately recorded.

The digital I/F means of the embodiment is an example of the inputting means in the invention, and the EMI mixing means, the EMI separating means, and the data block accessing means of the embodiment are examples of the recording and reproducing means in the invention.

Embodiment 6

Next, a sixth embodiment will be described.

In the embodiment, the case will be described where the user area of the disk medium 6 is divided into two areas, EMI and an AV data are stored in one of the areas, the other area is used for executing a command handling a computer data or the like, and the former area cannot be accessed by executing a command handling a computer data or the like.

Figure 9:
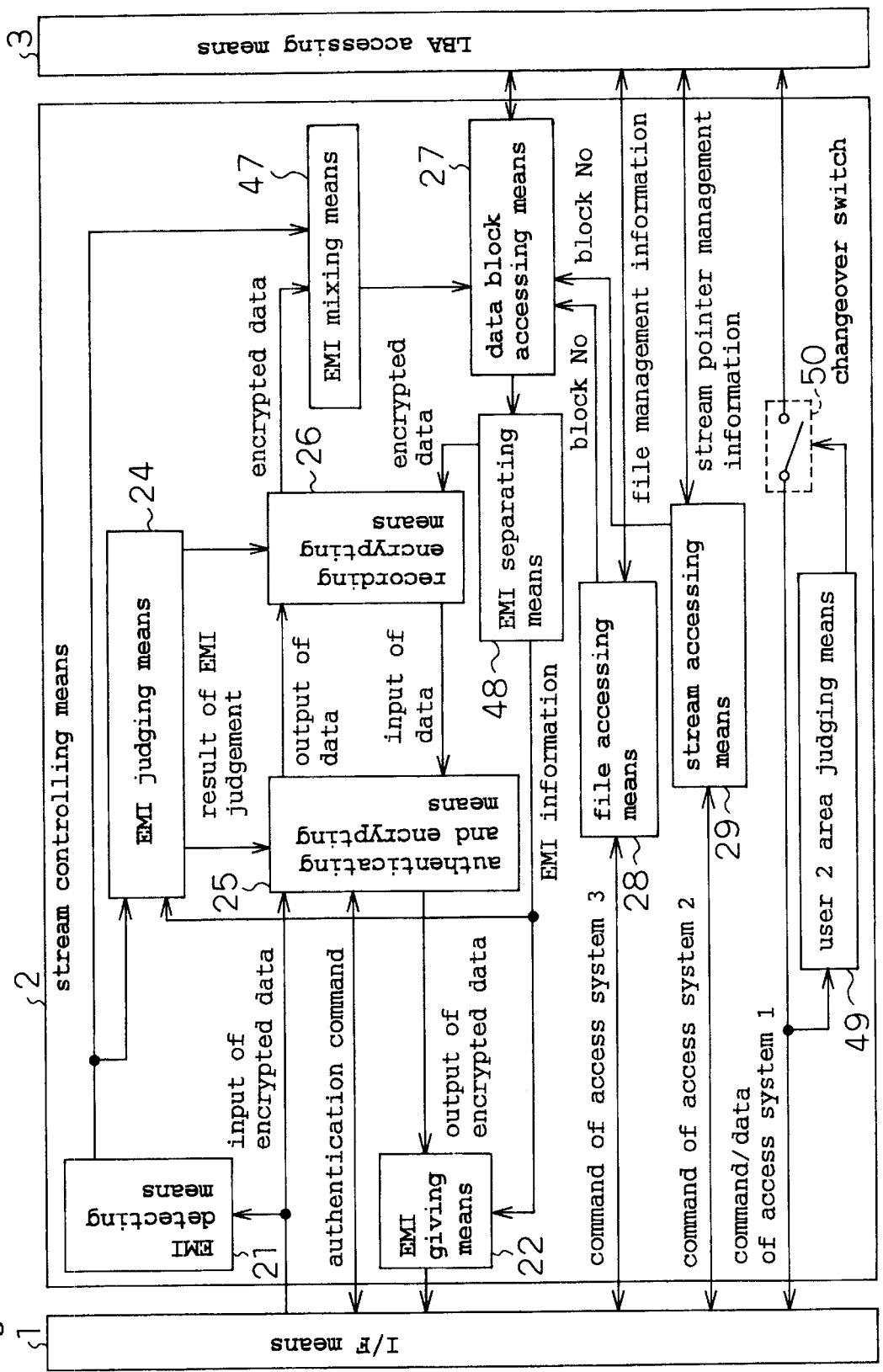
FIG. 9 is a block diagram of stream controlling means constituting the hard disk apparatus in the sixth embodiment of the invention.

In the configuration of the embodiment, only portions which are different from that of the first embodiment will be described. In the stream controlling means 2 of FIG. 9, EMI mixing means 47 is means for mixing EMI and an AV data with each other during recording. EMI separating means 48 is means for separating EMI and an AV data from each other during reproduction. User 2 area judging means 49 is means for dividing a user area into a user 1 area 51 and a user 2 area 52 as shown in FIG. 20, for judging whether an LBA which is designated by a command of the access system 1 is within the user 2 area or not, and for, if the LBA is outside the user 2 area, controlling so that the command of the access system 1 is not executed. A changeover switch 50 is means for, in the case where the judgement result of the user 2 area judging means 49 shows that the LBA is outside the user 2 area, stopping execution of the command. The access system 1 is an access system in which a record command or a reproduction command is instructed while designating the address of a disk where recording or reproduction is to be performed by using an LBA, and the reading size by using the number of sectors. Such an access system is described in, for example, Information technology Serial Bus Protocol 2 (SBP-2) Revision 2h Nov. 10, 1997.

Next, the operation of the embodiment will be described.

In the operation of the embodiment, only portions which are different from the operation of the first embodiment will be described.

Figure 10:
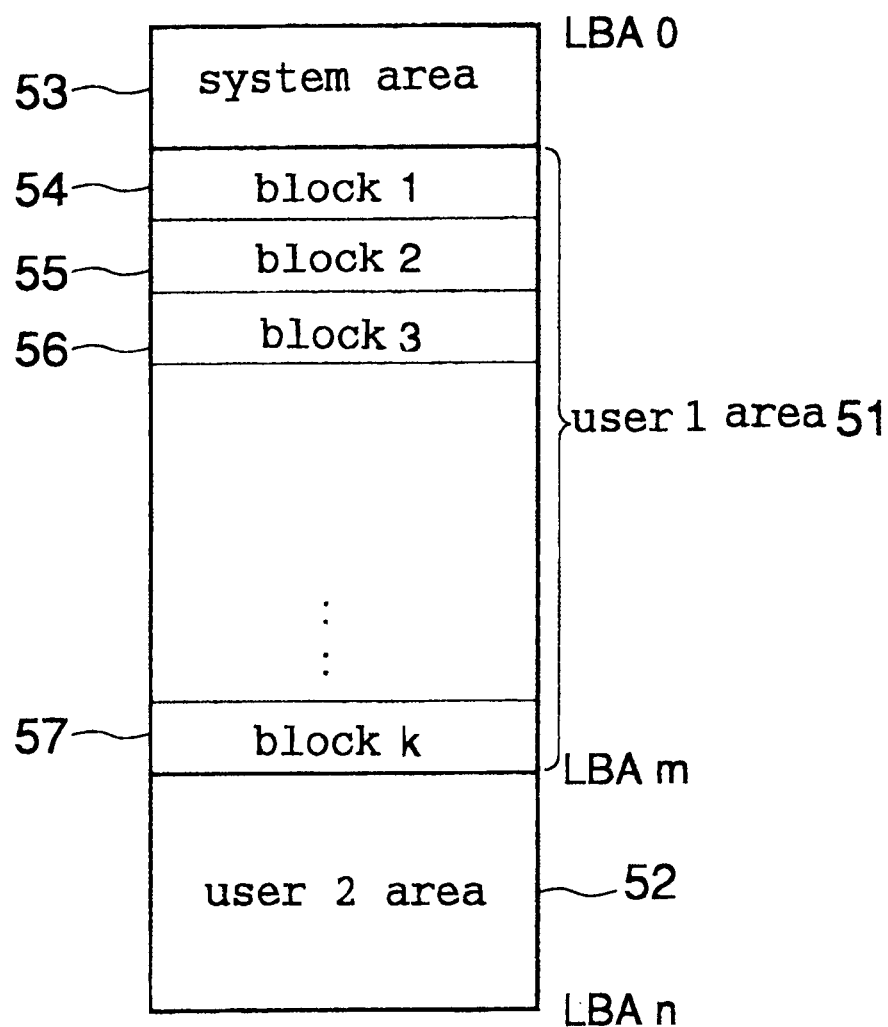
FIG. 10 is a view showing the configuration of a user 1 area and a user 2 area in the sixth embodiment of the invention.

During recording, EMI which is detected by the EMI detecting means 21, and an AV date which is encrypted by the recording encrypting means 26 are mixed with each other by the EMI mixing means 47. For example, a process such as that of adding EMI to an empty field of an AV data is performed. During reproduction, EMI is separated from a reproduced AV data by the EMI separating means 48. The AV data and EMI are recorded into or reproduced from the user 1 area 51 by execution of a command by the file accessing means 28 which performs a process by a command of the access system 3, or by execution of a command by the stream accessing means 29 which performs a process by a command of the access system 2. By contrast, in the case where a command of the access system 1 for handling a computer data is supported, there is a possibility that a user 1 area where an AV data is recorded is accessed and EMI information or the like is tampered with. As shown in FIG. 10, therefore, the user area is divided into the user 1 area 51 and the user 2 area 52. A command of the access system 1 uses the user 2 area 52. When a designated address reaches the user 1 area, the user 2 area judging means 49 judges that the address moves beyond the range, and a command is not executed. According to this configuration, EMI information and an AV data which are stored in the user 1 area are prevented from being tampered with. Therefore, access systems different from an AV data such as a computer can be simultaneously supported.

The digital I/F means of the embodiment is an example of the inputting means in the invention, and the EMI mixing means, the EMI separating means, and the data block accessing means of the embodiment are examples of the recording and reproducing means in the invention.

Embodiment 7

Next, a seventh embodiment will be described.

In the embodiment, an example will be described in which, in the case where a command of the access system 1 which has been described in the sixth embodiment is supported, a command of the access system 1 is not executed unless authentication with respect to an apparatus that performs a process in the access system 1 succeeds.

Figure 11:
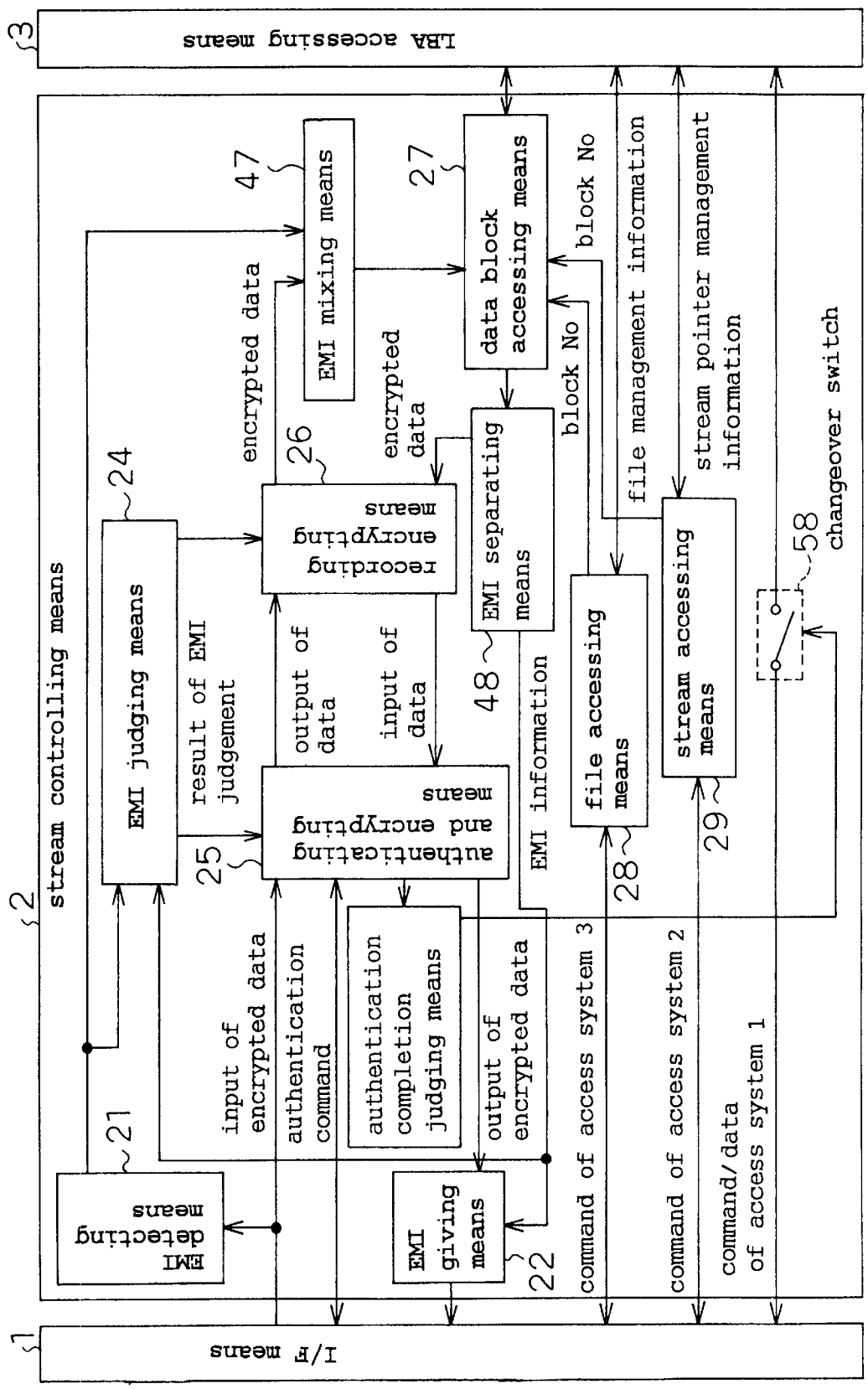
FIG. 11 is a block diagram of stream controlling means constituting the hard disk apparatus in the seventh embodiment of the invention.

In the configuration of the embodiment, only portions which are different from that of the sixth embodiment will be described. In the stream controlling means 2 of FIG. 11, the authentication completion judging means is means for judging whether authentication with respect to an apparatus that performs a process by a command of the access system 1 has succeeded or not. A changeover switch 58 is means for, in the case where authentication has not yet succeeded, not executing a command of the access system 1, and for, in the case where authentication has succeeded, executing a command of the access system 1.

Next, the operation of the embodiment will be described.

In the operation of the embodiment, only portions which are different from the operation of the sixth embodiment will be described.

An AV data and EMI are recorded or reproduced by execution of a command by the file accessing means 28 which performs a process by a command of the access system 3, or by execution of a command by the stream accessing means 29 which performs a process by a command of the access system 2. By contrast, in the case where a command of the access system 1 for handling a data different from an AV data, such as a computer data is supported, when a result of the authentication completion judging means 44 shows that authentication with respect to an apparatus that performs a process by a command of the access system 1 has not been completed, a command of the access system 1 is prevented from being executed, and, only when authentication has succeeded, a command of the access system 1 can be executed. Even when the user area is not divided into two kinds of areas unlike Embodiment 6, therefore, it is possible to support the access system 1. In a disk apparatus, particularly, the access system 1 is necessary for a test during production, and measurement of the performance of the disk apparatus, and, when configured in the same manner as the embodiment, it is possible to support the access system 1.

The digital I/F means of the embodiment is an example of the inputting means in the invention, and the EMI mixing means, the EMI separating means, and the data block accessing means of the embodiment are examples of the recording and reproducing means in the invention.

Embodiment 8

Next, an eighth embodiment will be described.

In the embodiment, the case where EMI and an AV data cannot be accessed unless authentication has succeeded will be described.

Figure 12:
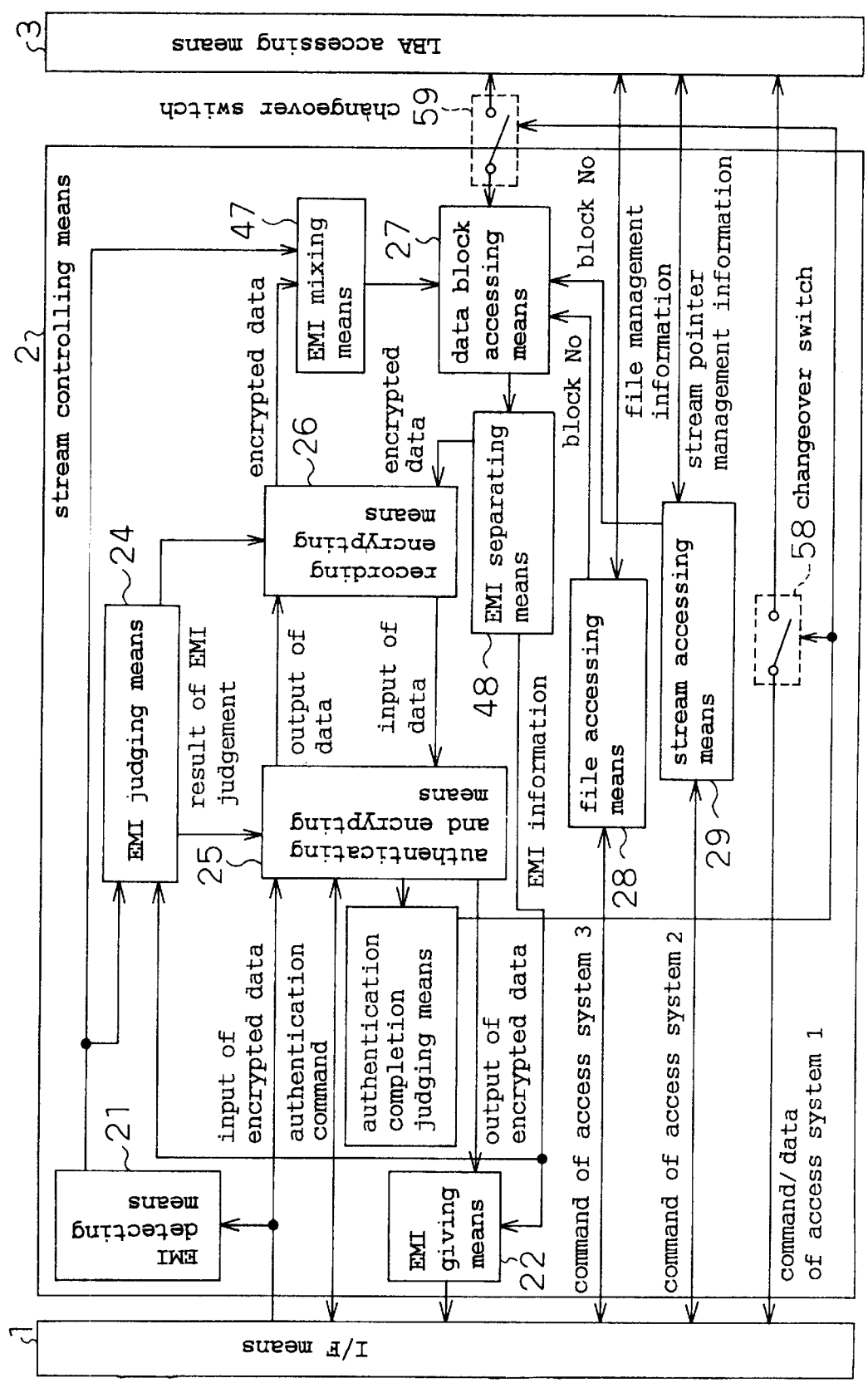
FIG. 12 is a block diagram of stream controlling means constituting the hard disk apparatus in the eighth embodiment of the invention.

In the embodiment, only portions which are different from the seventh embodiment will be described. In the stream controlling means 2 of FIG. 12, a changeover switch 59 is means for, in the case where the judgement result of the authentication completion judging means 44 shows that authentication has not yet succeeded, preventing the data block accessing means 27 from accessing the LBA accessing means 3, and for, in the case where authentication has succeeded, enabling the data block accessing means 27 to access the LBA accessing means 3.

Next, the operation of the embodiment will be described.

In the operation of the embodiment, only portions which are different from the operation of the seventh embodiment will be described.

In the case where the judgement result of the authentication completion judging means 44 shows that authentication has not yet succeeded, a changeover switch 59 prevents the data block accessing means 27 from exchanging data with the LBA accessing means 3. In the case where the authentication completion judging means 44 shows that authentication has succeeded, the changeover switch 59 enables the data block accessing means 27 to exchange data with the LBA accessing means 3. According to this configuration, further safety is ensured as compared with the case where, when authentication is not performed, a data is encrypted and then output.

The digital I/F means of the embodiment is an example of the inputting means in the invention, and the EMI mixing means, the EMI separating means, and the data block accessing means of the embodiment are examples of the recording and reproducing means in the invention. The components of the invention may be realized by dedicated hardware circuits, apparatuses, or the like for realizing their functions, or alternatively by means of software with using a computer.

Also a program recording medium which is characterized in that the medium stores a program for causing a computer to execute the whole or a part of the functions of the recording and reproducing apparatus of the invention belongs to the invention.

Furthermore, also a recording medium which is characterized in that EMI of the invention is recorded in the medium belongs to the invention.

Embodiment 9

Hereinafter, a ninth embodiment will be described.

In the embodiment, a hard disk apparatus will be described as an example of a recording and reproducing apparatus in which, in the case where copy right information of an AV data sent from a broadcasting station is "copy never" that means copy inhibit, a program can be viewed or listened only once at an arbitrary time after a time zone when the program is broadcast.

In the embodiment, such a hard disk apparatus is realized by setting an AV data which has copy right information of "copy never" to be recordable, and by, using reproduction information managing means, enabling the AV data to be reproduced only once. The case where reproduction information used in the embodiment is recorded in an area different from a data block on a disk medium will be described.

Figure 26:
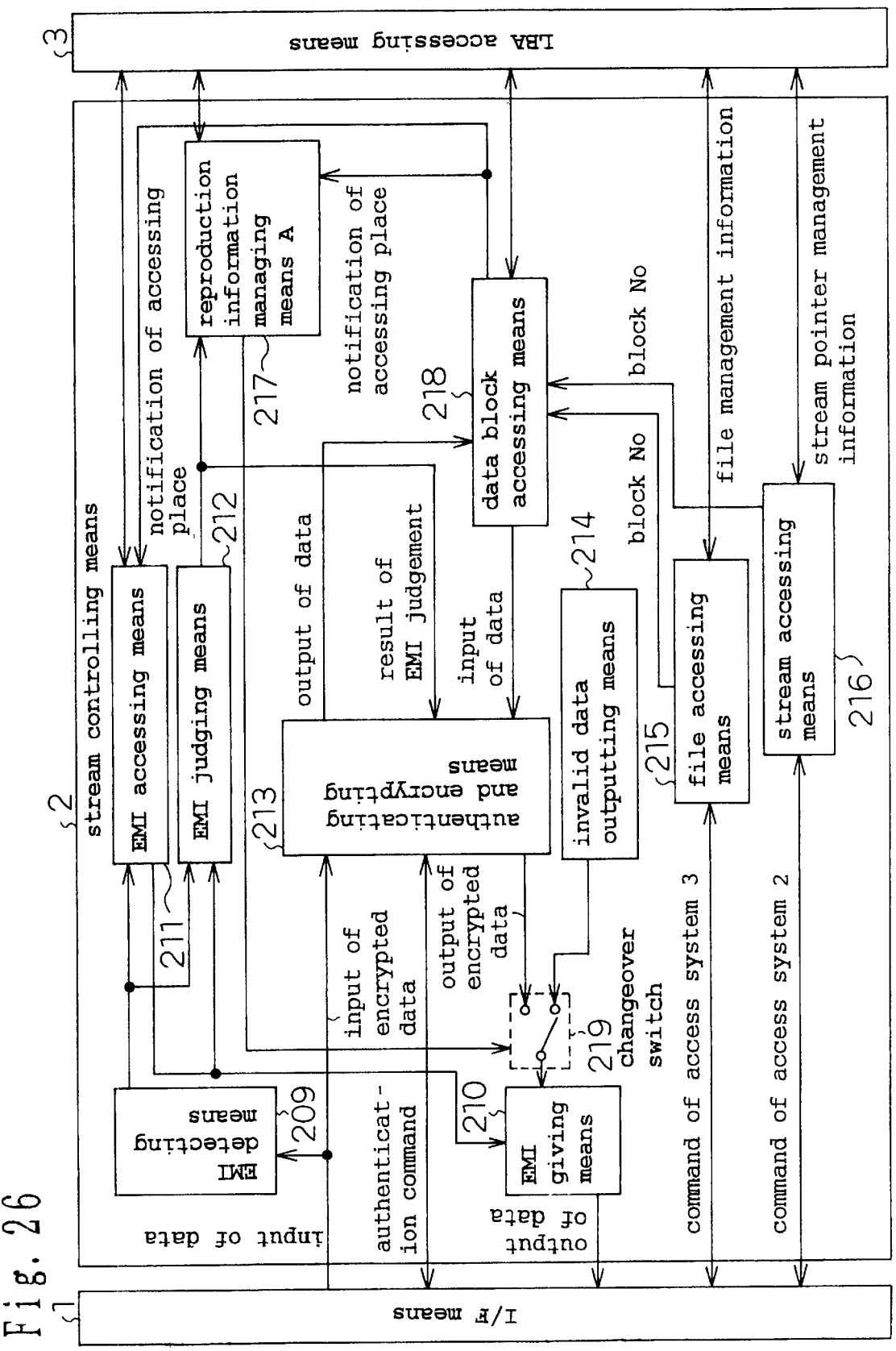
FIG. 26 is a block diagram showing the configuration of stream controlling means in the ninth embodiment of the invention in the case where reproduction information and a data block are recorded into different areas of a disk medium.

The stream controlling means 2 of the hard disk apparatus shown in FIG. 1 is configured as shown in FIG. 26. Namely, the stream controlling means 2 is configured by EMI detecting means 209, EMI giving means 210, EMI accessing means 211, EMI judging means 212, authenticating and encrypting means 213, invalid data outputting means 214, file accessing means 215, stream accessing means 216, reproduction information managing means A 217, data block accessing means 218, and a changeover switch 219.

The EMI detecting means 209 is means for detecting a field in which EMI is described, from a header portion in an isochronous packet data which is input from the digital I/F means 1. The EMI giving means 210 is means for giving instructed EMI to a header portion in an isochronous packet data which is to be output to the digital I/F means 1. The EMI accessing means 211 is means for reading out detected EMI information via the LBA accessing means 3, and for recording and reproducing detected EMI information correspondingly with a designated data block. The EMI judging means 212 is means for judging the presence or absence and the kind of a copy right from the EMI information. The authenticating and encrypting means 213 is means for performing authentication among the AV apparatuses via the digital I/F means 1, for decoding an AV data which is input from the digital I/F means 1, and for encrypting an AV data which is read out from the disk medium 6 via the data block accessing means 218. The data block accessing means 218 is means for recording or reproducing data of a designated block number via the LBA accessing means 3, and for notifying the number of a block which is currently accessed, to the EMI accessing means 211 and the reproduction information managing means A 217. The stream accessing means 216 is means for designating the number of a block which is to be recorded or reproduced, to the data block accessing means 218 in order to execute a command of the access system 2 which is received from the digital I/F means 1, for managing a stream pointer indicating the position of the block in which the stream currently exists, in accordance with instructions such as reproduction, recording, or stop while assuming the initial data block to the final data block of the user area of the disk medium 6 as one tape, and for performing recording or reading of stream pointer management information on the disk medium 6 via the LBA accessing means 3. The access system 2 is a system conforming to, for example, AV/C Digital Interface Command Set VCR subunit Specification-version 2.0.1. The file accessing means 215 is means for designating the number of a block which is to be recorded or reproduced, to the data block accessing means 218 in order to execute a command of the access system 3 which is received from the digital I/F means 1, for managing the order configuration of names of files and plural data blocks constituting the files, and having file management information, for managing also a file pointer indicating the position of the current block in a file, in accordance with instructions such as reproduction, recording, or stop according to the command of the access system 3, and for performing recording or reading of information of the order configuration of data blocks of these files, file pointer information, and the like on the disk medium 6 via the LBA accessing means 3. The access system 3 is an accessing system which conforms to, for example, AV/C Digital Interface Command Set General Specification, and which controls an AV apparatus by instructing the name of a file and the contents of the process on the file, such as reproduction, recording, or stop. The changeover switch 219 is means for, in outputting of an AV data to the digital I/F means 1 via the EMI giving means 210, when a result of the reproduction information managing means A 217 shows that reproduction has been performed, turning off the switch or changing the switch to the invalid data outputting means 214 to output an invalid data such as a blue back screen or a black screen, and for, when reproduction has not yet been performed, changing the switch to the authenticating and encrypting means 213 to output an encrypted AV data. The reproduction information managing means A 217 is means for recording and reading out reproduction information corresponding to a designated data block, and for judging from the reproduction information whether reproduction has been performed or not.

Figure 27:
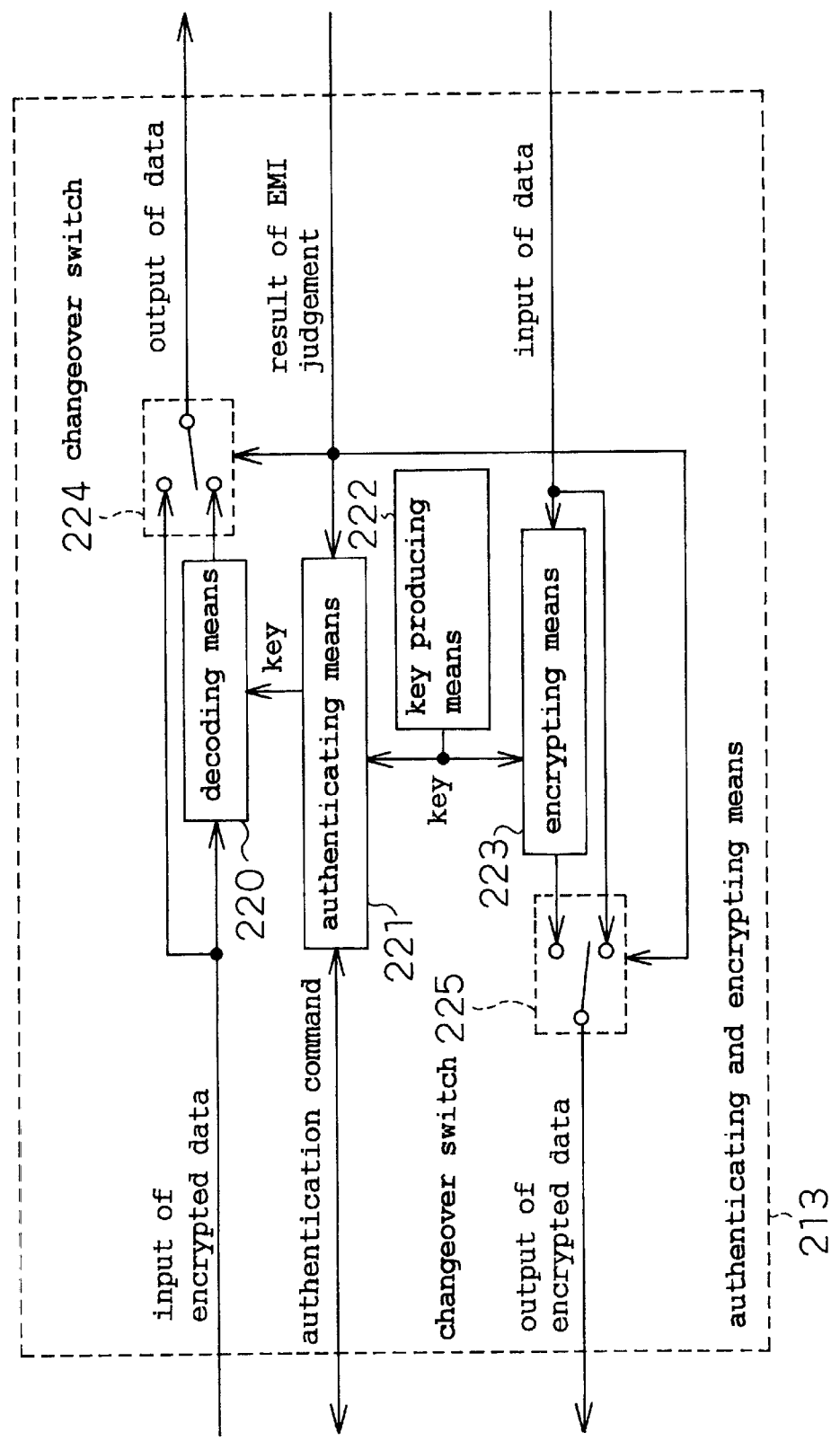
FIG. 27 is a block diagram showing the configuration of authenticating and encrypting means in the ninth to fourteenth embodiments of the invention.

The authenticating and encrypting means 213 of FIG. 26 is configured as shown in FIG. 27. Namely, the means is configured by decoding means 220, authenticating means 221, key producing means 222, encrypting means 223, a changeover switch 224, and a changeover switch 225.

The authenticating means 221 is means for performing authentication between AV apparatuses connected through the digital I/F means 1, and for, if authentication succeeds, when an AV data is to be output to the digital I/F means 1, transferring a key which is used in encryption by oneself, to the counter apparatus, and, when an AV data is to be input from the digital I/F means 1, receiving a key which is to be used in decoding by oneself, from the counter apparatus. The encrypting means 223 is means for encrypting an AV data which is read out from the disk medium 6 via the data block accessing means 218, by using the key produced by the key producing means 222, and for outputting the encrypted data to the digital I/F means 1. The key producing means 222 is means for producing a key which is to be used for encryption, and for transferring the key to the encrypting means 223 and the authenticating means 221. The decoding means 220 is means for decoding an encrypted AV data which is input from the digital I/F means 1, by using the key obtained in the authenticating means 221, and for outputting the decoded data to the data block accessing means 218. The switches 224 and 225 are means for, when the judgement result of the EMI judging means 212 shows that EMI is 00, performing switching so that an input/output data does not pass through the encrypting means 223 and the decoding means 220, and for, when EMI is other than 00, performing switching so that an input/output data passes through the encrypting means 223 and the decoding means 220.

Figure 28:
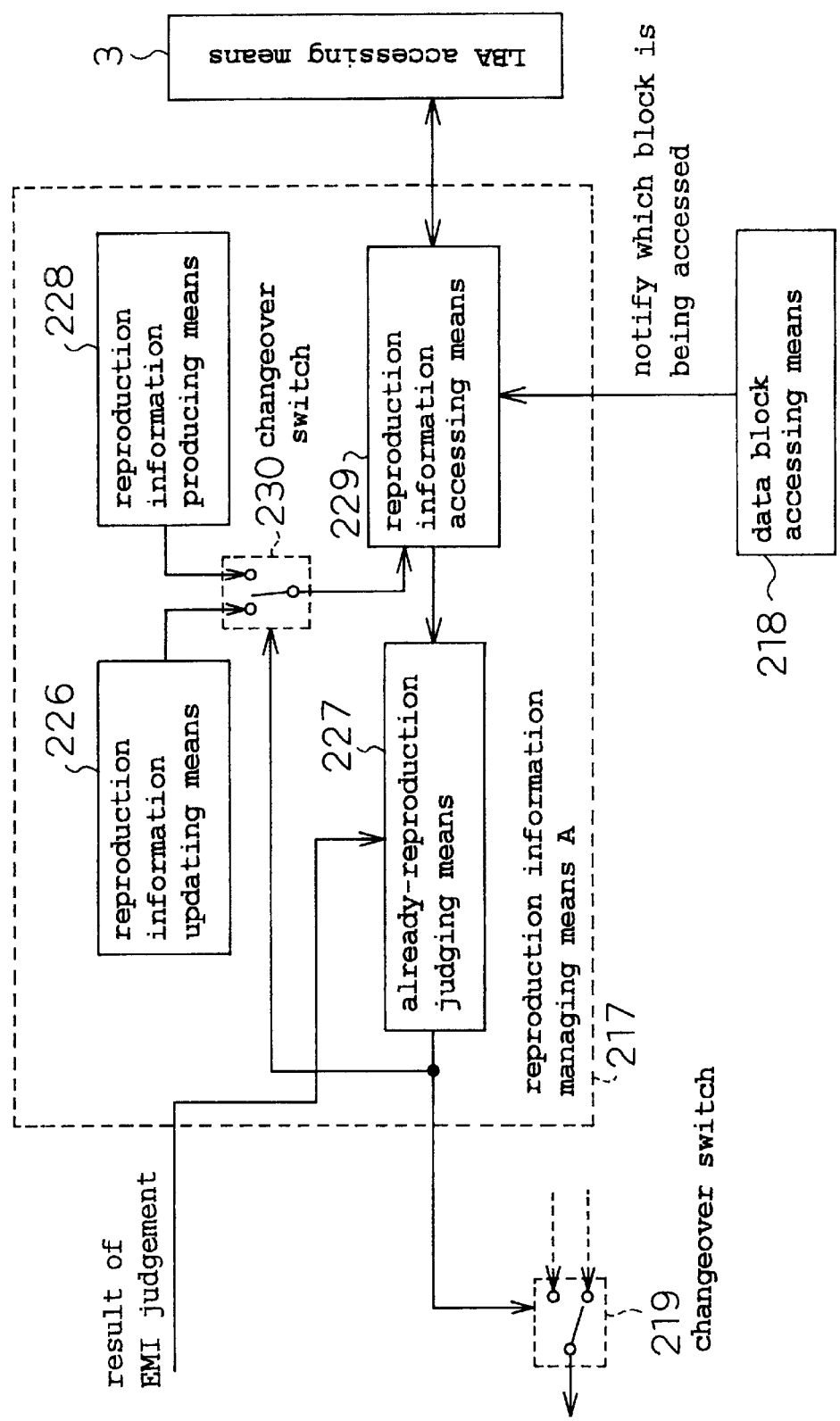
FIG. 28 is a block diagram showing the configuration of reproduction information managing means A in the ninth and twelfth embodiments of the invention.

The reproduction information managing means A 217 of FIG. 26 is configured as shown in FIG. 28. Namely, the means is configured by reproduction information updating means 226, already-reproduction judging means 227, reproduction information producing means 228, reproduction information accessing means 229, and a changeover switch 230.

The reproduction information producing means 228 is means for producing reproduction information, and means for, for example, initializing an already-reproduction flag play_flag with 0. It is assumed that, when play_flag is 0, it means that a corresponding AV data has not yet been reproduced. The reproduction information updating means 226 is means for updating reproduction information to information indicating that the data has already been reproduced, and means for, for example, initializing the already-reproduction flag play_flag with 1. It is assumed that, when play_flag is 1, it means that a corresponding AV data has already been reproduced. The reproduction information accessing means 229 is means for storing reproduction information corresponding to data blocks in the form of a table, and for recording or reading out reproduction information onto the disk medium 6 via the LBA accessing means 3. The already-reproduction judging means 227 is means for judging whether reproduction has already been performed or not, based on the reproduction information which is read out by the reproduction information accessing means 229, and means for, when the already-reproduction flag play_flag is 1, for example, judging that reproduction has been performed one time, and for, in the case where it is judged that reproduction has not yet been performed when EMI is 11 or "copy never" from the EMI judgement result, changing over the switch 230 to update reproduction information (already-reproduction flag). The switch 230 is means for, if the already-reproduction judging means 227 judges that an AV data is to be newly recorded, switching to the side of the reproduction information producing means 228, and for, if it is judged during reproduction or the like that an AV data has already been recorded, switching to the side of the reproduction information updating means 226.

Next, the operation of the embodiment will be described.

The case where a source apparatus sending an AV data is an STB will be described. There is a controller which sends a program reception command, a record start command, a record stop command, and the like to an apparatus coupled via an IEEE 1394 bus. The description of exchange of commands among the controller, the hard disk apparatus, and the STB departs from the spirit of the embodiment. In the embodiment, therefore, the description is omitted.

First, it is assumed that the controller sends to the STB a reception start command for starting reception of a program which is sent from a broadcasting station, and the record start command to the hard disk apparatus. The case where an AV data which is sent from an apparatus other than the STB, for example, a recording and reproducing apparatus such as a DVHS or a hard disk apparatus is to be received will be described later. Then, the program which is sent from a broadcasting station is received by the STB, and EMI is given to the program. Thereafter, the program is sent as an isochronous packet data to the IEEE 1394 bus. When the hard disk apparatus receives the record start command in the form of a command of the access system 2 or the access system 3 from the digital I/F means 1, the digital I/F means 1 confirms the number of a channel which is intended to be acquired by oneself, and fetches the corresponding isochronous packet data. It is assumed that the record start command in the form of a command of the access system 2 is received. Then, the authenticating means 221 sends an authentication command to the STB. The EMI detecting means 209 detects EMI information held in the header portion of the fetched isochronous packet data. The EMI judging means 212 judges the presence or absence and the kind of a copy right from the detected EMI information. The result is input to the authenticating and encrypting means 213. The authenticating means 221 determines the authentication method in accordance with the presence or absence and the kind of a copy right. When EMI is 11 or "copy never," the significance of the AV data is high, and hence authentication based on a public key is performed. When EMI is 10 or "copy one generation," the significance of the AV data is not higher than that in the case where EMI is 11, and hence authentication based on a common key is performed. When EMI is 00 or "copy free," the AV data is not significant. Therefore, it is deemed that authentication succeeds, without performing authentication. Upon receiving the authentication command, the STB performs authentication based on a public key or a common key between the STB and the hard disk apparatus. When the authentication succeeds, the key is transferred to the hard disk apparatus. The authenticating means 221 receives the key sent from the STB, via the digital I/F means 1, and then transfers the key to the decoding means 220. When EMI is 00, however, the authenticating means 221 does not receive the key sent from the STB. In this case, the AV data itself is not encrypted. In the cases where EMI is 11 and where EMI is 10, the decoding means 220 receives the key from the authenticating means 221.

It is assumed that the record command is received in the form of a command of the access system 2 via the digital I/F means 1. The subsequent process will be described with reference to the flowchart of FIG. 34. When EMI of the AV data sent via the digital I/F means 1 is not 00, the changeover switch 224 is switched so that the AV data passes through the decoding means 220. When EMI is 00, the changeover switch 224 is switched so that the AV data does not pass through the decoding means 220. The decoding means 220 decodes the encrypted AV data by using the received key. The stream accessing means 216 instructs the data block accessing means 218 to record block x. The data block accessing means 218 notifies the number (=x) of the block which is currently accessed, to the EMI accessing means 211. The EMI accessing means 211 records the EMI information detected by the EMI detecting means 209, correspondingly with the notified block number. In the case where EMI is 10 or "copy one generation," when the EMI information is to be recorded onto the disk medium 6, recording is performed while rewriting EMI to 01 or "no more copy." The data block accessing means 218 notifies the number (=x) of the block which is currently accessed, to the reproduction information managing means A 217. During recording, the changeover switch 230 is switched to the side of the reproduction information producing means 228. The reproduction information accessing means 229 stores reproduction information in the form of a table, correspondingly with the notified block number (=x). The reproduction information producing means 228 registers information that the data has not yet been reproduced, into reproduction information. Namely, reproduction information is updated with play_flag=0 (S1). Next, the reproduction information accessing means 229 records reproduction information onto the disk medium 6 via the LBA accessing means 3 (S2). Next, the block number is incremented by one, or x=x+1 is set (S3). Next, it is judged whether another command from the digital I/F means 1 is received or not (S4). If another command is received, the process is ended. If not, the process which has been performed after the reception of the record command is repeatedly performed until another command is received. The case where an AV data is to be recorded onto the disk medium 6 has been described.

Next, the case where the hard disk apparatus reproduces an AV data will be described. The case where an AV data is to be reproduced on a television monitor will be considered. It is assumed that an AV data recorded in the hard disk apparatus was recorded from the STB. There is a controller which sends a reproduction start command, a reproduction stop command, and the like to an apparatus coupled via an IEEE 1394 bus. The description of exchange of commands among the controller, the hard disk apparatus, and the television monitor departs from the spirit of the embodiment. In the embodiment, therefore, the description is omitted.

First, the controller sends the reproduction start command to the television monitor, and the reproduction start command to the hard disk apparatus also. In the hard disk apparatus, thereafter, the data block accessing means 218 notifies the accessing place to the reproduction information managing means A 217 and the EMI accessing means 211. The EMI accessing means 211 fetches EMI information of the notified accessing place, and transfers the EMI information to the EMI giving means 210. The changeover switch 219 is switched to the side of the invalid data outputting means 214 to transfer an invalid data such as a blue back screen or a black screen to the EMI giving means 210. The EMI giving means 210 sends the EMI information transferred from the EMI accessing means 211, and the AV data transferred from the invalid data outputting means 214, as an isochronous packet data to the IEEE 1394 bus via the digital I/F means 1. The television monitor sends an authentication command to the hard disk apparatus. The television monitor fetches the isochronous packet data sent from the hard disk apparatus, and determines the authentication method while referring the EMI information given to the data. When EMI is 11 or "copy never," the authenticating means 221 performs authentication with respect to the television monitor based on a public key via the digital I/F means 1. When EMI is 01 or "no more copy," the authenticating means 221 performs authentication based on a common key with respect to the television monitor via the digital I/F means 1. When EMI is 00, authentication is not performed, and it is deemed that authentication succeeds. The embodiment handles the case where a data which is obtained by recording an AV data sent from the STB is reproduced. Therefore, all AV data in which EMI is 10 or "copy one generation" are recorded while rewriting EMI to 01. When the hard disk apparatus receives the authentication command via the digital I/F means 1, the authenticating means 221 determines the kind of authentication while referring the EMI information, and performs authentication with respect to the television monitor. When authentication succeeds, the authenticating means 221 transfers the key which is produced by the key producing means 222, to the encrypting means 223. When EMI is 00, the key is not transferred to the encrypting means 223, and the changeover switch 225 is switched to the side in which the data does not pass through the encrypting means 223. Furthermore, the changeover switch 219 is switched to the side of the authenticating and encrypting means 213.

The subsequent operation is either of two kinds of operations depending on the timing when the reproduction information managing means A 217 updates reproduction information. In the first case, reproduction information is collectively updated after reproduction is ended, and, in the second case, reproduction information is updated during reproduction in the unit of block.

Figure 34:
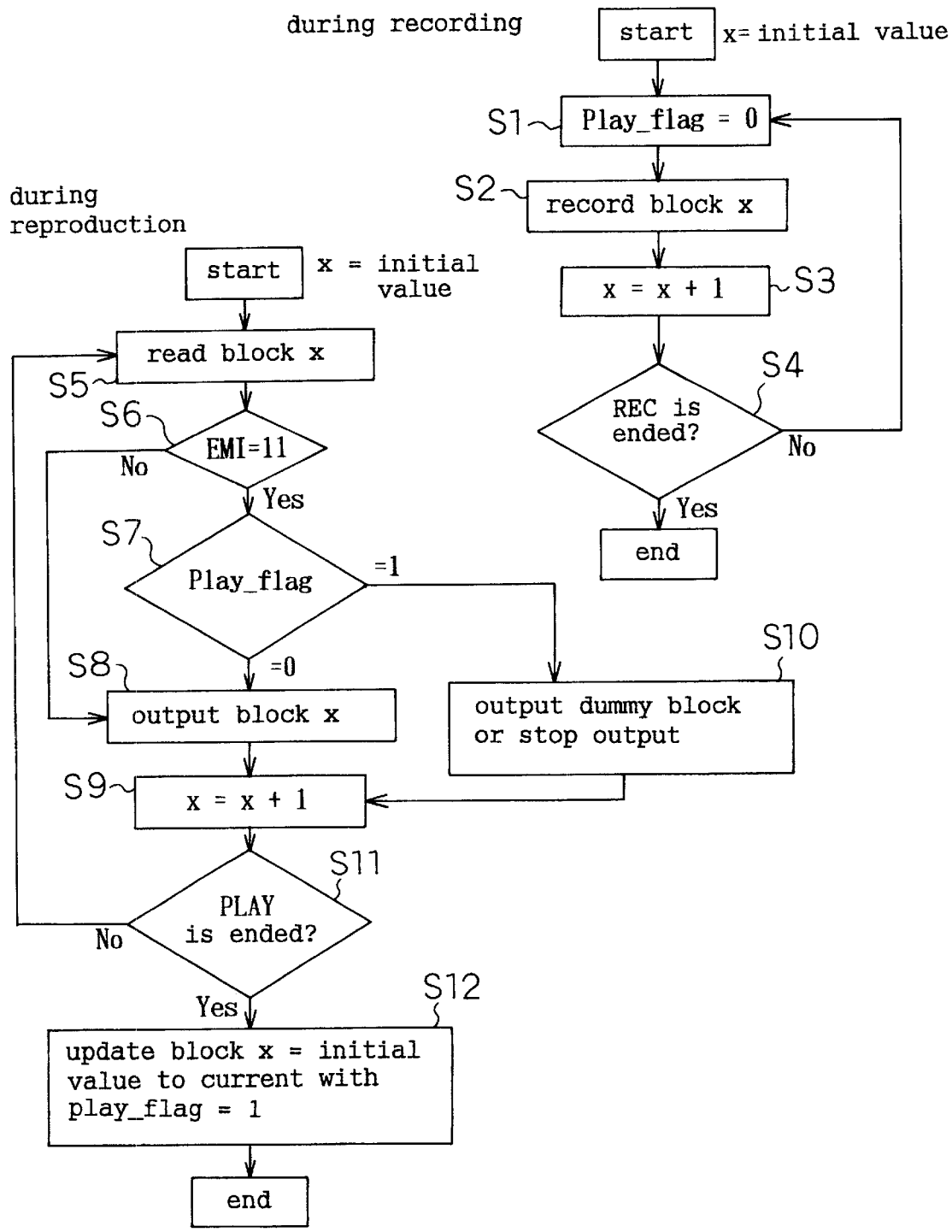
FIG. 34 is a flowchart showing the flow of processes in recording and reproducing an AV data in the ninth and tenth embodiments of the invention, and the flow of processes in the case where, in reproduction, reproduction information is updated after end of reproduction.

The first case will be described with reference to the flowchart of FIG. 34.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the EMI accessing means 211 and the reproduction information managing means A 217. At the same time, the data block accessing means 218 reads out an AV data from the disk medium 6 via the LBA accessing means 3 (S5). The EMI accessing means 211 reads out EMI information corresponding to the notified block number from the disk medium 6. The read out EMI information is subjected to judgement in the EMI judging means 212. The judgement result is sent to the authenticating and encrypting means 213 and the already-reproduction judging means 227.

When the EMI judgement result shows that EMI is 00 (S6), the changeover switch 225 is switched to the side in which the data does not pass through the encrypting means 223, and the AV data is output without being encrypted (S8). When EMI is not 00 (S6), the changeover switch 225 is switched to the side in which the data passes through the encrypting means 223. During reproduction, the changeover switch 230 is switched to the side of the reproduction information updating means 226. The already-reproduction judging means 227 checks the judgement result of the read out EMI information.

When EMI is 11, the already-reproduction judging means 227 judges whether the AV data has been reproduced or not (S7). In the case where EMI is 11 or "copy never" and reproduction has been performed, the changeover switch 219 is switched to the side of the invalid data outputting means 214 to output an invalid data such as a blue back screen or a black screen (S10). In the case where EMI is 211 or "copy never" and reproduction has not yet been performed or EMI is not 11, the changeover switch 219 is switched to the side of the authenticating and encrypting means 213, and the AV data is encrypted by the encrypting means 223 and then output via the digital I/F means 1 (S8).

Next, the block number is incremented by one, or x=x+1 is set (S9). Next, it is judged whether another command from the digital I/F means 1 is received or not (S11). If another command is received, the process is ended. When the reproduction process is ended, reproduction information from the initial number to the final number of reproduced blocks is accessed by the reproduction information accessing means 229, and updated by the reproduction information updating means 226 to already-reproduction or play_flag=1 (S12). If not, the process which has been performed after the reception of the reproduction command is repeatedly performed until another command is received. The case where an AV data is to be reproduced in the first case has been described.

Figure 35:
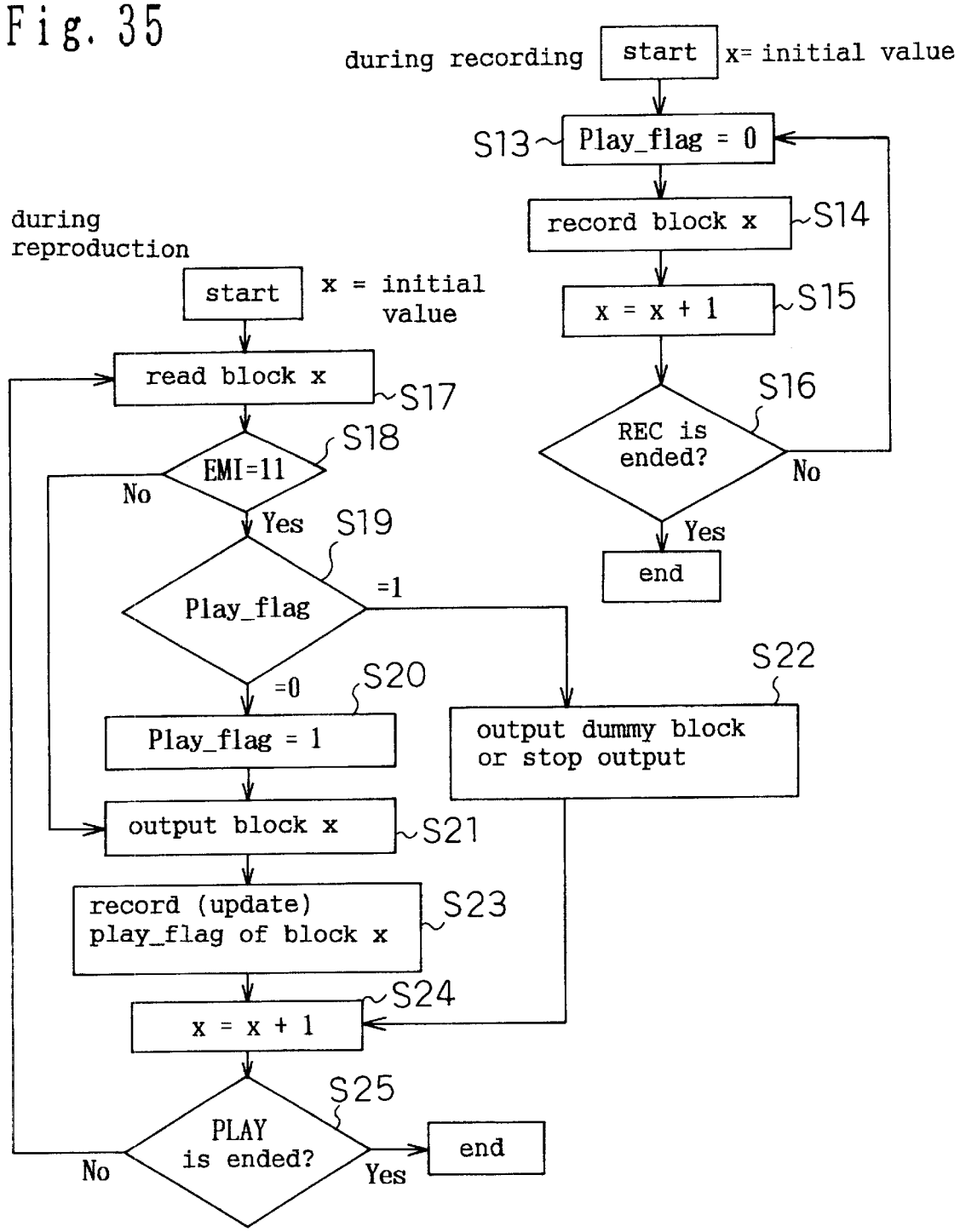
FIG. 35 is a flowchart showing the flow of processes in recording and reproducing an AV data in the ninth and tenth embodiments of the invention, and the flow of processes in the case where, in reproduction, reproduction information is updated during reproduction.

The second case will be described with reference to the flowchart of FIG. 35.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the EMI accessing means 211 and the reproduction information managing means A 217. At the same time, the data block accessing means 218 reads out an AV data from the disk medium 6 via the LBA accessing means 3 (S17). The EMI accessing means 211 reads out EMI information corresponding to the notified block number from the disk medium 6. The read out EMI information is subjected to judgement in the EMI judging means 212. The judgement result is sent to the authenticating and encrypting means 213 and the already-reproduction judging means 227.

When the EMI judgement result shows that EMI is 00 (S18), the changeover switch 225 is switched to the side in which the data does not pass through the encrypting means 223, and the AV data passes through the authenticating and encrypting means 213 and the digital I/F means 1 and is then output without being encrypted (S21). When EMI is not 00 (S18), the changeover switch 225 is switched to the side in which the data passes through the encrypting means 223. During reproduction, the changeover switch 230 is switched to the side of the reproduction information updating means 226. The already-reproduction judging means 227 checks the judgement result of the read out EMI information.

When EMI is not 00, it is judged whether the AV data has been reproduced or not (S19). In the case where EMI is 11 or "copy never" and reproduction has been performed or play_flag=1, the changeover switch 219 is switched to the side of the invalid data outputting means 214 to output an invalid data such as a blue back screen or a black screen (S22). In the case where the already-reproduction judging means 227 judges that EMI is 11 or "copy never" and reproduction has not yet been performed or play_flag=0, the reproduction information updating means 226 updates reproduction information so as to indicate that the data has been reproduced or play_flag=1 (S20). Next, the changeover switch 219 is switched to the side of the authenticating and encrypting means 213, so that the AV data which is read out by the data block accessing means 218 is encrypted by the encrypting means 223, and then output via the digital I/F means 1 (S21). Furthermore, reproduction information of block x is updated by the reproduction information accessing means 229 (S23). Then, block x is set to x+1 (S24), and, if a command other than the reproduction command is received (S25), the process is ended. If not, the process which has been performed after the reception of the reproduction command is repeatedly performed until another command is received.

The case where an AV data is to be reproduced in the second case has been described.

In the case where EMI of an AV data recorded on a hard disk is 11 or "copy never," the AV data of "copy never" is allowed to be reproduced only once, by switching over the changeover switch 219 in accordance with judgement by the reproduction information managing means A 217, and managing reproduction information by the reproduction information managing means A 217.

In the embodiment, the case where a command is executed in the access system 2 by the stream accessing means 216 has been described. Alternatively, a command may be executed in the access system 3 by the file accessing means 215. In this case, the order of recording and reproduction depends not on the order of block numbers, but on that of blocks which are managed by file management information. Namely, when a block which is to be recorded or reproduced in an x-th process is expressed by f(x), it is requested only to replace the description portion of block x in FIG. 34 or 35, with block f(x).

Implementation may be enabled while selecting the authentication method in accordance with EMI. Namely, two kinds of authentication methods are used. As the authentication method for "copy never" in the case where EMI is 11, authentication of method A is used. As the authentication method for "copy one generation" in the case where EMI is 10 and "no more copy" in the case where EMI is 01, authentication of method B is used. Specifically, authentication based on a public key can be used as authentication of method A, and authentication based on a common key can be used as authentication of method B. An apparatus which does not record an AV data, such as a television monitor or an STB supports both authentications of methods A and B, and an apparatus which records an AV data, such as a VTR supports only authentication of method B. The hard disk apparatus of the invention supports both authentications of methods A and B. It is assumed that the hard disk apparatus of the invention records an AV data sent from an STB. Since an STB and the hard disk apparatus of the invention support both authentications of methods A and B, authentication succeeds in the case where EMI is not 00, and the AV data can be recorded into the hard disk apparatus of the invention. During reproduction of the hard disk apparatus of the invention, in the case where an AV data is to be reproduced on a television monitor, when EMI is 11 or "copy never," authentication succeeds and the AV data can be output to the television monitor because the television monitor supports authentication of method A. Since a television monitor does not record an AV data, the copy right of "copy never" can be protected. Also in the case where EMI is 10 or "copy one generation" or EMI is 01 or "no more copy," authentication succeeds and the AV data can be output to the television monitor because the television monitor supports authentication of method B. By contrast, in the case where an AV data of EMI of 11 or "copy never" is to be output to a VTR, the hard disk apparatus of the invention tries to perform authentication of method A. However, the authentication fails because a VTR supports only authentication of method B. Therefore, an AV data of EMI of 11 cannot be recorded into a VTR. In the case where EMI is 10 or "copy one generation" or EMI is 01 or "no more copy," however, authentication of method B is performed. Since a VTR supports authentication of method B, the authentication succeeds. In the case where EMI is 10 or "copy one generation," an AV data can be recorded into a VTR. In the case where EMI is 01 or "no more copy," the authentication succeeds, but, judging from EMI information, the AV data is not recorded because a VTR is not allowed to record "no more copy." A case may be considered where there are two hard disk apparatuses of the invention, one of the hard disk apparatuses outputs an AV data of EMI of 11 or "copy never" (this hard disk device is called disk apparatus A), and the other hard disk apparatus records the above-mentioned AV data (this hard disk device is called disk apparatus B). In this case, the disk apparatuses mutually perform authentication of method A, and the AV data can be transferred from disk apparatus A to disk apparatus B. At this time, disk apparatus A outputs only once the AV data. Therefore, disk apparatus A cannot output the AV data no more time. As a result, the AV data is moved from disk apparatus A to disk apparatus B. However, the data movement destination is not a television monitor, and hence the user cannot view or listen the AV data during this period. Namely, AV data movement is enabled. In this way, the copy right can be easily protected.

The case where an AV data which is sent from an apparatus other than the STB is to be recorded into the hard disk apparatus of the invention as described above will be described. In AV data sent from the STB, there is no data in which EMI is 01 or "no more copy." In the case where a data is sent from an apparatus other than the STB, also an AV data in which EMI is "no more copy" exists. In the case where EMI is 01 or "no more copy," the AV data and the EMI information are prevented from being recorded onto the disk medium 6, by the data block accessing means 218 and the EMI accessing means 211. The Fin others are identical with those of the case where an AV data sent from the STB is to be recorded. In the case where reproduction and recording are to be performed between the hard disk apparatuses of the invention, an AV data of EMI of 11 or "copy never" can be moved from a reproducing apparatus to a recording apparatus.

When EMI is other than 11, the operation is identical with that in the case where the hard disk apparatus of the invention and a VTR are connected to each other. As described above, the method of authentication is selected in accordance with EMI, whereby an AV data of higher significance such as "copy never" can be authenticated by using a safer authentication method such as a public key.

As an example of storing reproduction information and an AV data onto a disk medium, the following two cases will be described.

Figure 29:
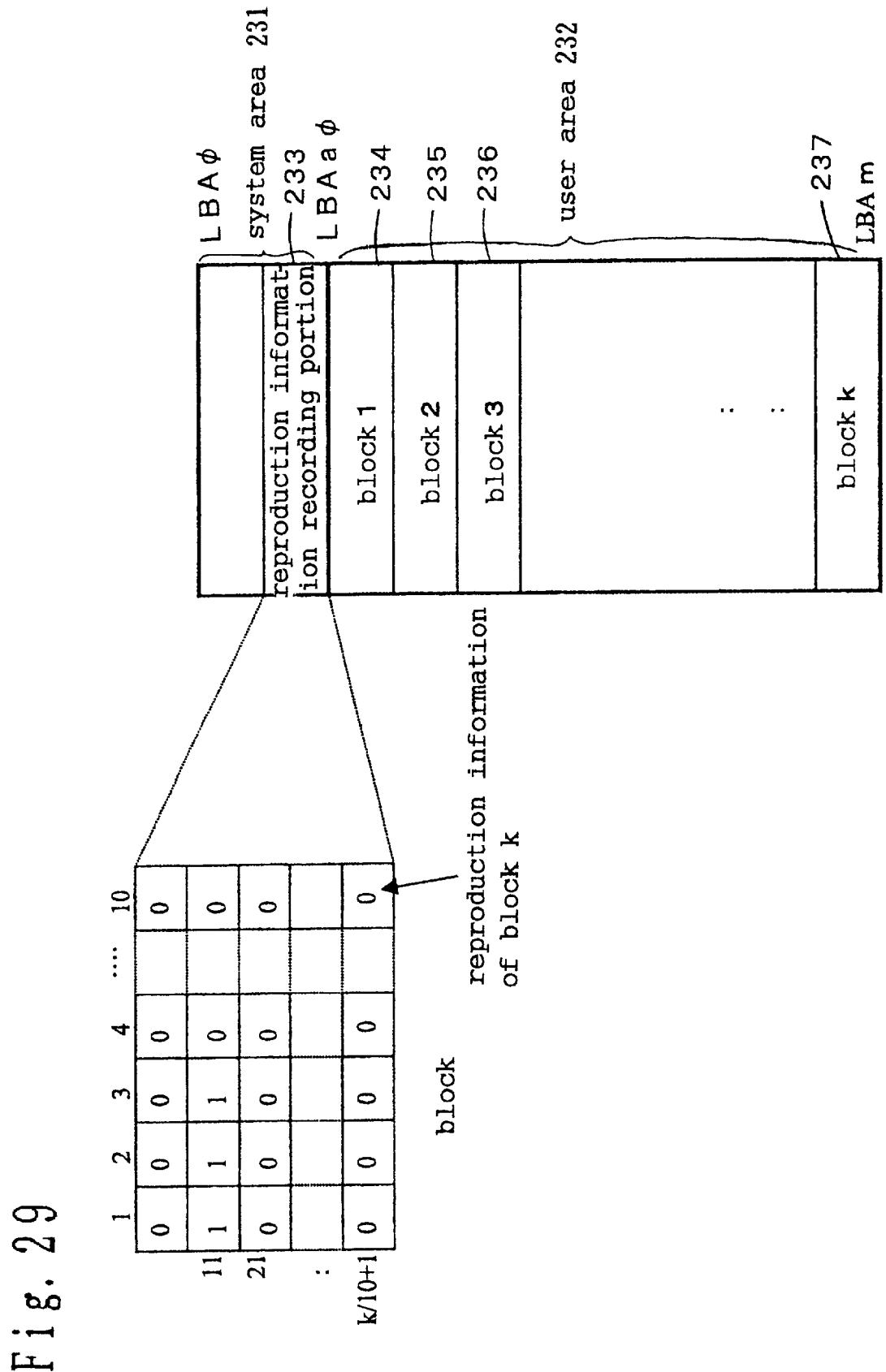
FIG. 29 is a view showing a recording method of recording reproduction information into a system area in the unit of data block in the ninth embodiment of the invention in the case where reproduction information and a data block are recorded into different areas of a disk medium.

First, the case where reproduction information is provided in the unit of block will be described. Referring to FIG. 29, the disk medium 6 is divided into a system area 231 and a user area 232. The system area 231 is an area which is used by the system and cannot be accessed by the user. By contrast, the user area 232 is an area which the user uses. It is assumed that the user area 232 consists of a k number of blocks. A reproduction information recording portion 233 is disposed in a part of the system area 231. Reproduction information of each block is recorded into the reproduction information recording portion 233. Referring to a table which is stored in the form of a bit map of the reproduction information recording portion (233), all reproduction information of block 1 (234), block 2 (235), block 3 (236), and block k (237) is 0. Namely, this shows that the area has not yet been reproduced. However, areas such as the block k (237) are areas which have not yet been used. It is assumed that, with respect to an unused area also, reproduction information is set to 0. Since reproduction information of block 211, block 212, and block 213 is 1, they are already-reproduced areas. The reproduction information recording portion 231 is produced and updated by the reproduction information managing means A 217. Since the reproduction information recording portion 233 is stored in the system area 231, the user cannot easily tamper with contents of the reproduction information recording portion 233, so that an AV data cannot be unauthorizedly viewed or listened. Therefore, the hard disk having the function of the embodiment has high reliability.

Figure 30:
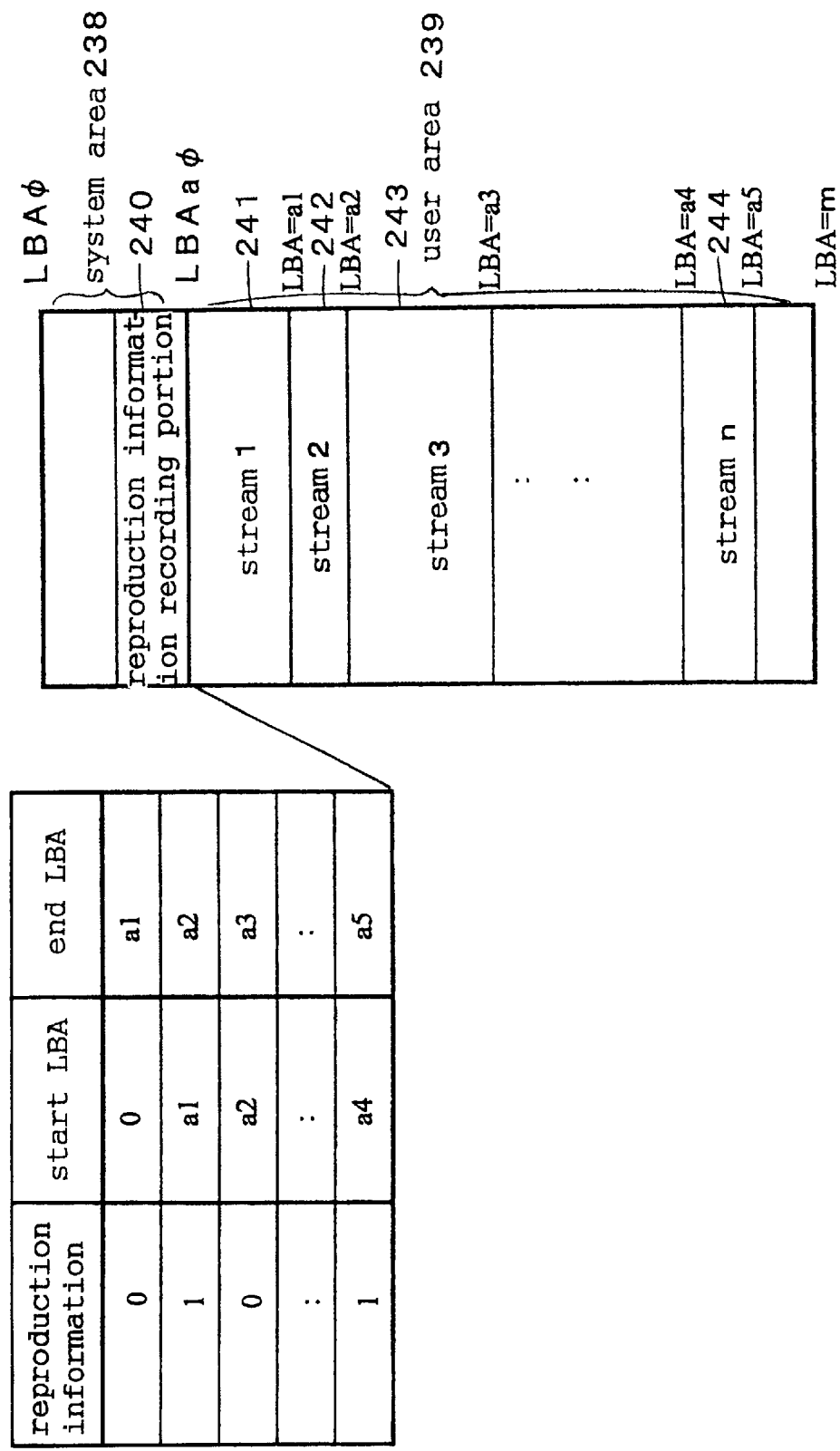
FIG. 30 is a view showing a recording method of recording reproduction information on the basis of a start LBA and an end LBA where reproduction information is varied in the ninth embodiment of the invention in the case where reproduction information and a data block are recorded into different areas of a disk medium.

Next, the case where reproduction information is managed by means of an address will be described. Referring to FIG. 30, the disk medium 6 is divided into a system area 238 and a user area 239. The system area 238 is an area which is used by the system and cannot be accessed by the user. By contrast, the user area 239 is an area which the user uses. A stream is defined while dividing data each time when reproduction information is changed from already-reproduced to not-yet-reproduced or from not-yet-reproduced to already-reproduced. A reproduction information recording portion 240 is configured so as to express reproduction information by reproduction information of the stream, and the start LBA and the end LBA of the stream. In stream 1 (241), the start LBA is 0[sic: a0], the end LBA is a1, and the entire stream is not-yet-reproduced. In stream 2 (242), the start LBA is a1, the end LBA is a2, and the entire stream is already-reproduced. In stream 3 (243), the start LBA is a2, the end LBA is a3, and the stream is not-yet-reproduced. In stream n (244), the start LBA is a4, the end LBA is a5, and reproduction information of the stream is already-reproduced. The reproduction information recording portion 240 is produced and updated by the reproduction information managing means A 217. Since the reproduction information recording portion 240 is stored in the system area 238, the user cannot easily tamper with contents of the portion, so that an AV data cannot be unauthorizedly viewed or listened. Therefore, the hard disk apparatus of the embodiment has high reliability.

The reproduction information recording portion 233 or 240 may be placed in, in the case of a hard disk apparatus, an alternate sector area in place of the system area 231 or 238.

The embodiment described above may be implemented also in an optical disk apparatus (such as a DVD-RAM), in place of using a hard disk apparatus. At this time, in the case where an optical disk apparatus is used, the reproduction information recording portion 233 or 240 may be an area which the user cannot unauthorizedly access, or, in the case of a DVD-R as shown in FIG. 24, may be an area which is called a power calibration area (PCA) and which is used in test writing for adjustment of the laser power or the like, or an area which is called a recording management area (RMA) where information of an after-writing position and the like are recorded in the case where a data is after-written. Alternatively, a lead-in area where TOC information and the like are recorded, or a lead-out area indicating the end may be used. As shown in FIG. 25, in the case of a DVD-RAM, a header portion where ID information for each sector and the like are recorded may be used in addition to the above-mentioned areas. In a DVD-RAM also, recording may be performed in an alternate sector area. In summary, reproduction information may be recorded in any area in which the user cannot directly change a data, irrespective of the type of the recording apparatus.

Furthermore, EMI information is recorded onto and reproduced from the disk medium 6 by the EMI accessing means 211 via the LBA accessing means. When, in the same manner as reproduction information, EMI information is recorded in an area such as the system area of the disk medium 6 in which the user cannot directly change a data, the user cannot easily tamper with EMI information, so that an AV data cannot be unauthorizedly viewed or listened. Therefore, the hard disk apparatus of the embodiment has high reliability.

Embodiment 10

Next, a tenth embodiment will be described.

In the embodiment, a hard disk apparatus will be described as an example of a recording and reproducing apparatus in which, in the case where copy right information of an AV data sent from a broadcasting station is "copy never" that means copy inhibit, a program can be viewed or listened only once at an arbitrary time after a time zone when the program is broadcast.

In the embodiment, such a hard disk apparatus is realized by setting an AV data which has copy right information of "copy never" to be recordable, and by, using reproduction information managing means, enabling the AV data to be reproduced only once.

In the ninth embodiment, reproduction information is recorded in an area different from a data block. In the embodiment, reproduction information is recorded in the same area as a data block.

Hereinafter, the configuration will be described with respect to portions which are different from the ninth embodiment.

Figure 31:
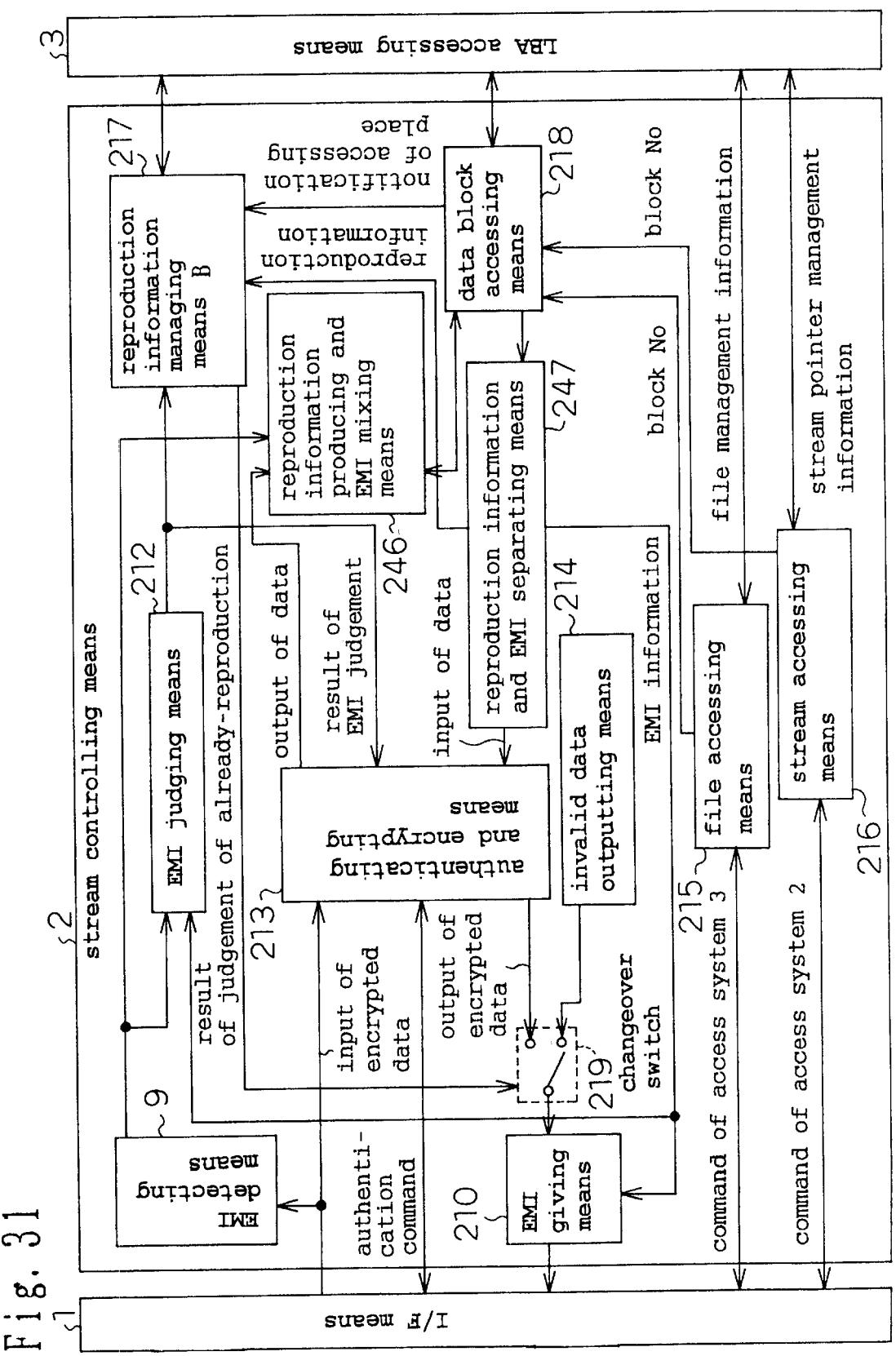
FIG. 31 is a block diagram showing the configuration of stream controlling means in the tenth embodiment of the invention in the case where reproduction information and a data block are recorded into the same area of a disk medium.
Figure 32:
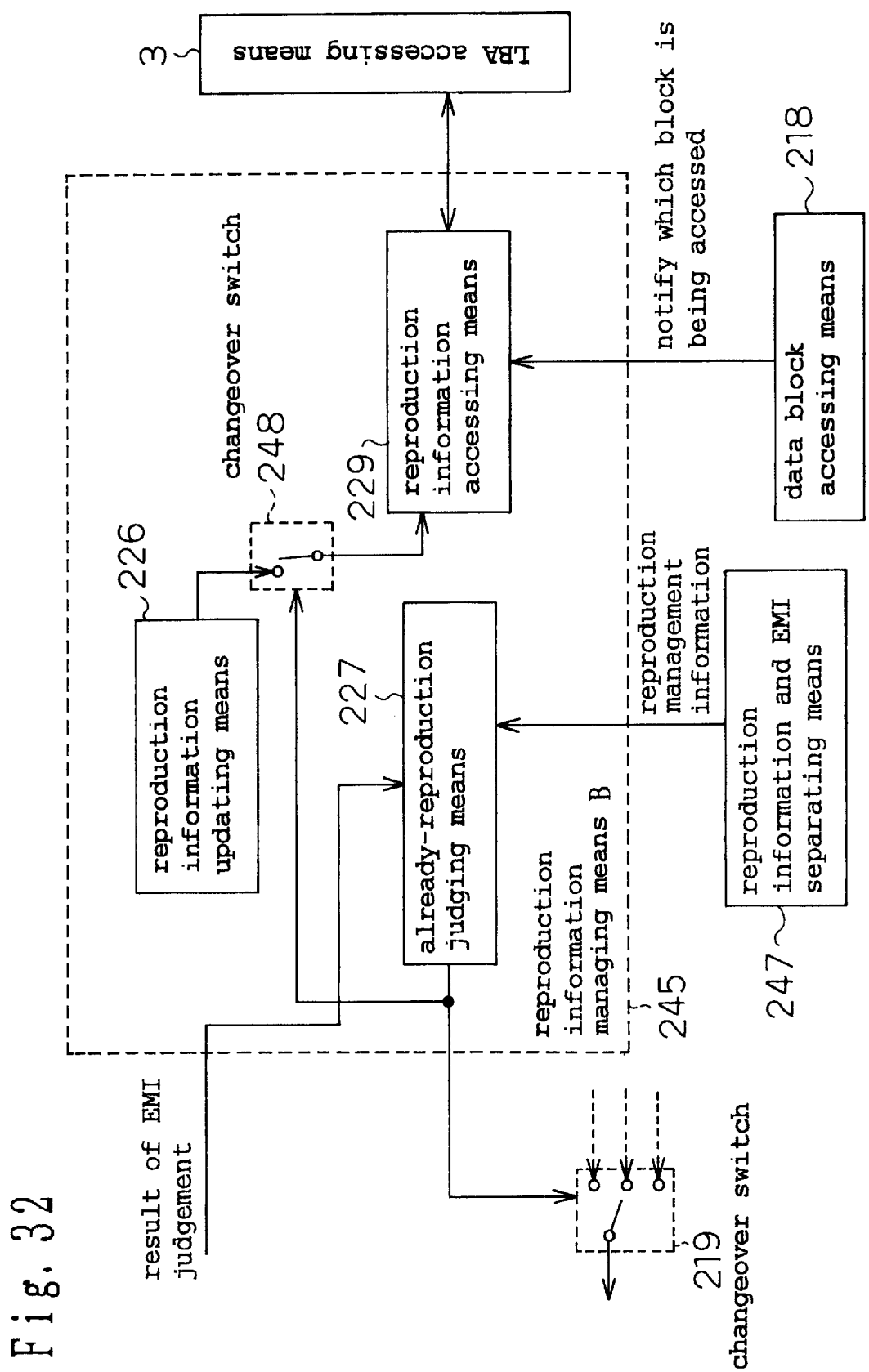
FIG. 32 is a block diagram showing the configuration of reproduction information managing means B in the tenth embodiment of the invention in the case where reproduction information and a data block are recorded into the same area of a disk medium.

Referring to FIG. 31, reproduction information managing means B 245 is means for reading out and updating reproduction information corresponding to a designated data block, and for judging from the reproduction information whether reproduction has been performed or not. Reproduction information producing and EMI mixing means 246 is means for pairing EMI information and reproduction information with a data block, and for initializing reproduction information so as to indicate a not-yet-reproduced state. Reproduction information and EMI separating means 247 is means for separating and extracting EMI information and reproduction information, and a data block which are paired.

The reproduction information managing means B 245 is configured in the following manner. Namely, the reproduction information managing means B 45 is configured by reproduction information updating means 226, already-reproduction judging means 227, reproduction information accessing means 229, and a changeover switch 248.

The reproduction information updating means 226 is means for updating reproduction information to information indicating that the data has already been reproduced, and means for, for example, updating the information with already-reproduction flag play_flag=1. The reproduction information accessing means 229 is means for updating reproduction information corresponding to data blocks, for performing recording on the disk medium 6 via the LBA accessing means 3, and for storing reproduction information corresponding to data blocks in the form of a table, and having a caching function. The already-reproduction judging means 227 is means for judging whether reproduction has already been performed or not, based on the reproduction information which is read out by the reproduction information accessing means 229, and means for, when the already-reproduction flag play_flag=1, for example, judging that reproduction has been performed one time, and for, in the case where EMI=11 and it is judged that reproduction has not yet been performed from the EMI judgement result, changing over the changeover switch 248 to the side of the reproduction information updating means 226 to update reproduction information. The already-reproduction judging means 227 is means for, in the case where EMI=11 and it is judged that reproduction has already been performed, turning off the changeover switch 219, or changing to the invalid data outputting means 214.

Next, the operation of the embodiment will be described.

In the embodiment, it is assumed that, in the same manner as the ninth embodiment, a hard disk apparatus records and reproduces an AV data sent from an STB. Authentication and key exchange between an STB and the hard disk apparatus of the embodiment are identical with those of the ninth embodiment, and hence their description is omitted.

It is assumed that the record command is received in the form of a command of the access system 2 via the digital I/F means 1. The subsequent process will be described with reference to the flowchart of FIG. 34. When EMI of the sent AV data is not 00, the changeover switch 224 is switched so that the AV data passes through the decoding means 220. When EMI is 00, the changeover switch 224 is switched so that the AV data does not pass through the decoding means 220. The decoding means 220 decodes the encrypted AV data by using the received key. The stream accessing means 216 instructs the data block accessing means 218 to record block x. The data block accessing means 218 notifies the number (=x) of the block which is currently accessed, to the reproduction information managing means B 245. The EMI information detected by the EMI detecting means 209 is subjected in the EMI judging means 212 to judgement on the presence or absence and the kind of a copy right. Thereafter, the judgement result is transferred to the reproduction information producing and EMI mixing means 246. The reproduction information producing and EMI mixing means 246 pairs EMI information and reproduction information with a data block, and initializes reproduction information so as to indicate a not-yet-reproduced state. Namely, the already-reproduction flag of reproduction information is set to play_flag=0 (S1). When EMI is 210 or "copy one generation," EMI is rewritten to 01 or "no more copy." The reproduction information producing and EMI mixing means 246 transfers a data in which an AV data, reproduction information, and EMI information are paired, to the data block accessing means 218. The data block accessing means 218 stores the paired data into block x of the disk medium 6 via the LBA accessing means 8 (S2). The format of the recording in block x will be described later. Next, the block number is incremented by one, or x=x+1 is set (S3). Next, it is judged whether another command from the digital I/F means 1 is received or not (S4). If another command is received, the process is ended. If not, the process which has been performed after the reception of the record command is repeatedly performed until another command is received. The case where an AV data is to be recorded onto the disk medium 6 has been described.

Next, the case where the hard disk apparatus reproduces an AV data will be described. The case where an AV data is to be reproduced on a television monitor will be considered. It is assumed that an AV data recorded on the hard disk was recorded from the STB. The authentication and key exchange between the television monitor and the hard disk apparatus of the embodiment are identical with those of the ninth embodiment, and hence their description is omitted.

The subsequent operation is either of two kinds of operations depending on the timing when the reproduction information managing means B 245 updates reproduction information. In the first case, reproduction information is collectively updated after reproduction is ended, and, in the second case, reproduction information is updated during reproduction in the unit of block. Initially, the first case will be described with reference to the flowchart of FIG. 34.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the reproduction information managing means B 245. At the same time, the data block accessing means 218 reads out an AV data in which EMI information and reproduction information are paired, from the disk medium 6 via the LBA accessing means 3 (S5). The reproduction information and EMI separating means 247 separates EMI information and reproduction information from the paired data. The EMI information is transferred to the EMI giving means 210 and the EMI judging means 212, and the reproduction information is transferred to the already-reproduction judging means 227. The EMI judging means 212 judges the EMI information. The judgement result is sent to the authenticating and encrypting means 213 and the already-reproduction judging means 227.

When the EMI judgement result shows that EMI is 00 (S6), the changeover switch 225 is switched to the side in which the data does not pass through the encrypting means 223, and the AV data is output without being encrypted (S8). When EMI is not 00, the changeover switch 225 is switched to the side in which the data passes through the encrypting means 223. Only when EMI=11, the changeover switch 248 is switched during reproduction to the side of the reproduction information updating means 226. The already-reproduction judging means 227 checks the judgement result of the read out EMI information.

In the case where EMI is 211 or "copy never," the already-reproduction judging means 227 judges whether the AV data has been reproduced or not (S7). In the case where EMI is 211 or "copy never" and reproduction has been performed, the changeover switch 219 is switched to the side of the invalid data outputting means 214 to output an invalid data such as a blue back screen or a black screen (S10). In the case where EMI is 211 or "copy never" and reproduction has not yet been performed, or the case where EMI is not 211, the changeover switch 219 is switched to the side of the authenticating and encrypting means 213, and the AV data is encrypted by the encrypting means 223, and then output via the digital I/F means 1 (S8).

Next, the block number is incremented by one, or x =x+1 is Bet (S9). Next, it is judged whether another command from the digital I/F means 1 is received or not (S11). If another command is received, the process is ended. When the reproduction process is ended, reproduction information from the initial number to the final number of reproduced blocks is accessed by the reproduction information accessing means 229, and updated by the reproduction information updating means 226 to already-reproduction or play_flag=1 (S12). If not, the process which has been performed after the reception of the reproduction command is repeatedly performed until another command is received. The case where an AV data is to be reproduced in the first case has been described.

The second case will be described with reference to the flowchart of FIG. 35.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the reproduction information accessing means 229. At the same time, the data block accessing means 218 reads out an AV data which is paired with EMI information and reproduction information, from the disk medium 6 via the LBA accessing means 3 (S17). The reproduction information and EMI separating means 247 separates EMI information and reproduction information from the paired AV data. The EMI information is transferred to the EMI giving means 210 and the EMI judging means 212, and the reproduction information is transferred to the already-reproduction judging means 227. The EMI judging means 212 judges the EMI information. The judgement result is sent to the authenticating and encrypting means 213 and the already-reproduction judging means 227.

When the EMI judgement result shows that EMI is 00 (S18), the changeover switch 225 is switched to the side in which the data does not pass through the encrypting means 223, and the AV data is provided with EMI information by the EMI giving means 210 without passing through the authenticating and encrypting means 213, and then output via the digital I/F means 1 without being encrypted (S21). When EMI is not 00 (S18), the changeover switch 225 is switched to the side in which the data passes through the encrypting means 223. During reproduction, the changeover switch 230 is switched to the side of the reproduction information updating means 226. The already-reproduction judging means 227 checks the judgement result of the read out EMI information.

When EMI is 11 or "copy never," it is judged whether the AV data has been reproduced or not (S19). In the case where EMI is 11 or "copy never" and reproduction has been performed or play_flag=1, the changeover switch 219 is switched to the side of the invalid data outputting means 214 to output an invalid data such as a blue back screen or a black screen (S22). In the case where the already-reproduction judging means 227 judges that EMI is 11 or "copy never" and the data has not yet been reproduced or play_flag=0, the reproduction information updating means 226 updates reproduction information so as to indicate that the data has been reproduced or play_flag=1 (S20). Next, the changeover switch 219 is switched to the side of the authenticating and encrypting means 213, so that the AV data which is read out by the data block accessing means 218 is encrypted by the encrypting means 223, provided with EMI by the EMI giving means 210, and then output via the digital I/F means 1 (S21). Furthermore, reproduction information of block x is updated by the reproduction information accessing means 229 (S23). Then, block x is set to x+1 (S24), and, if a command other than the reproduction command is received (S25), the process is ended. If not, the process which has been performed after the reception of the reproduction command is repeatedly performed until another command is received.

The case where an AV data is to be reproduced in the second case has been described.

Figure 33:
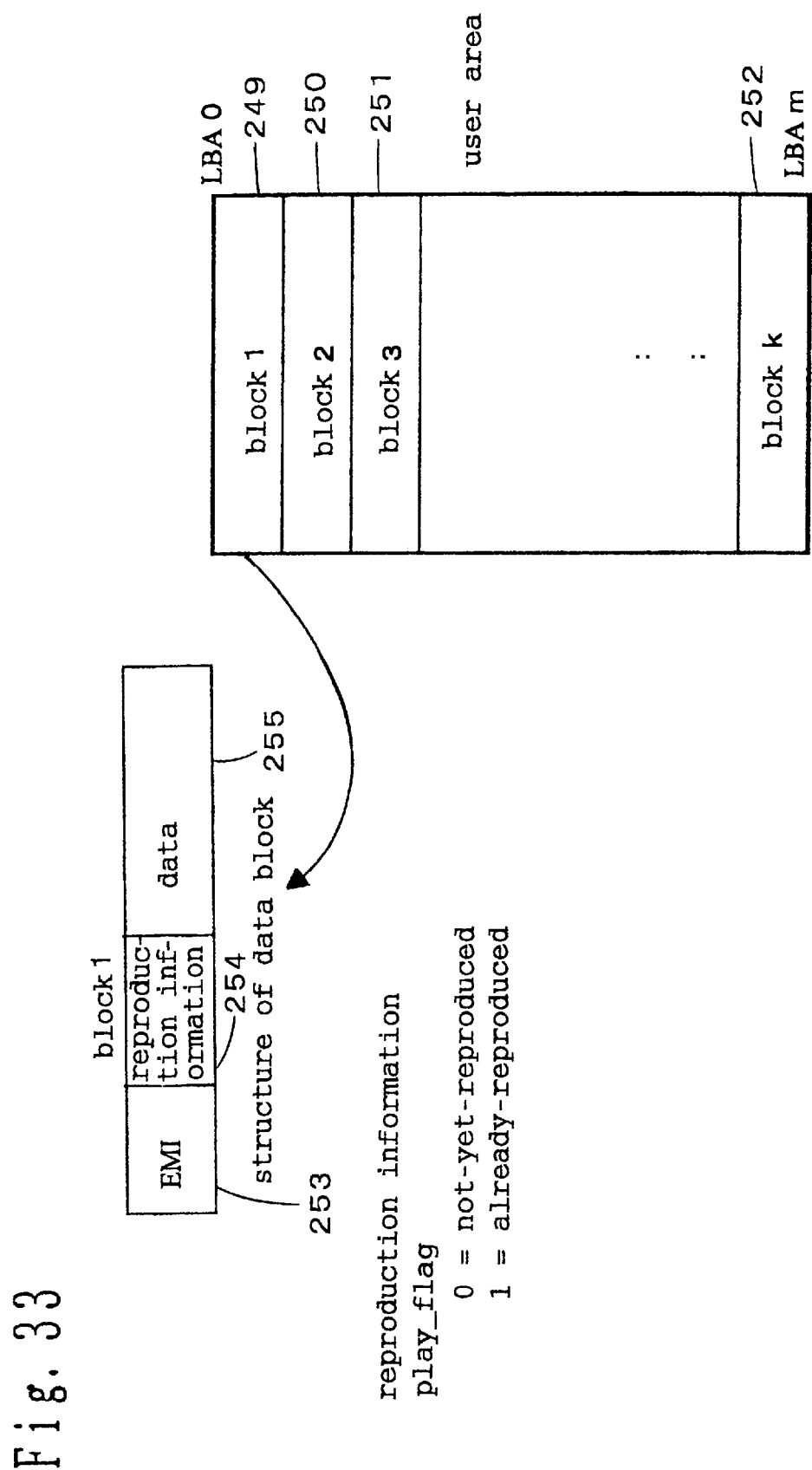
FIG. 33 is a view showing a recording method of recording reproduction information and a data block in the tenth embodiment of the invention in the case where reproduction information and a data block are recorded into the same area of a disk medium.

The format of a data which, as described above, is produced by the reproduction information producing and EMI mixing means 246 and updated by the reproduction information managing means B 245 will be described. FIG. 33 shows the user area of the disk medium 6. The user area is divided into a k number of blocks, or block 1 (249), block 2 (250), block 3 (251), . . . , and block k (252). In block 1, EMI 253 is stored, reproduction information 254 is subsequently stored, and an AV data 255 is finally stored. Reproduction information indicates that, when already-reproduction flag play_flag=0, reproduction has not yet been performed, and, when play_flag=1, reproduction has already been performed. When EMI information, reproduction information and AV data are stored in the same area with being paired with each other, three kinds of information can be processed by a single access to a disk medium, and hence overhead of access to a disk medium is reduced.

The tenth embodiment described above is configured so that an AV data and reproduction information are mixed with each other by the reproduction information producing and EMI mixing means 246, and the AV data and the reproduction information are separated from each other by the reproduction information and EMI separating means 247, thereby preventing the user from directly changing reproduction information via the digital I/F means 1 even when reproduction information is not recorded in a system area (is recorded in a user area) unlike the ninth embodiment. Therefore, reproduction information is prevented from being unauthorizedly tampered with, and the hard disk of the embodiment has high reliability.

The tenth embodiment may be implemented while EMI information is recorded in a system area separately from reproduction information. Conversely, the ninth embodiment may be implemented while, in the same manner as the tenth embodiment, only EMI information is recorded in a user area and reproduction information is recorded in a system area. Namely, reproduction information and EMI information may be recorded by an appropriate one of the methods which have been described in the ninth embodiment and the tenth embodiment.

Embodiment 11

Hereinafter, an eleventh embodiment will be described.

In the embodiment, a hard disk apparatus will be described as an example of a recording and reproducing apparatus in which, in the case where copy right information of an AV data sent from a broadcasting station is "copy never" that means copy inhibit, a program can be viewed or listened only once at an arbitrary time after a time zone when the program is broadcast.

In the embodiment, such a hard disk apparatus is realized by setting an AV data which has copy right information of "copy never" to be recordable, and, by erasing an AV data during or after reproduction, to enable the AV data to be reproduced only once.

Hereinafter, the configuration will be described with respect to portions which are different from the ninth embodiment.

Figure 48:
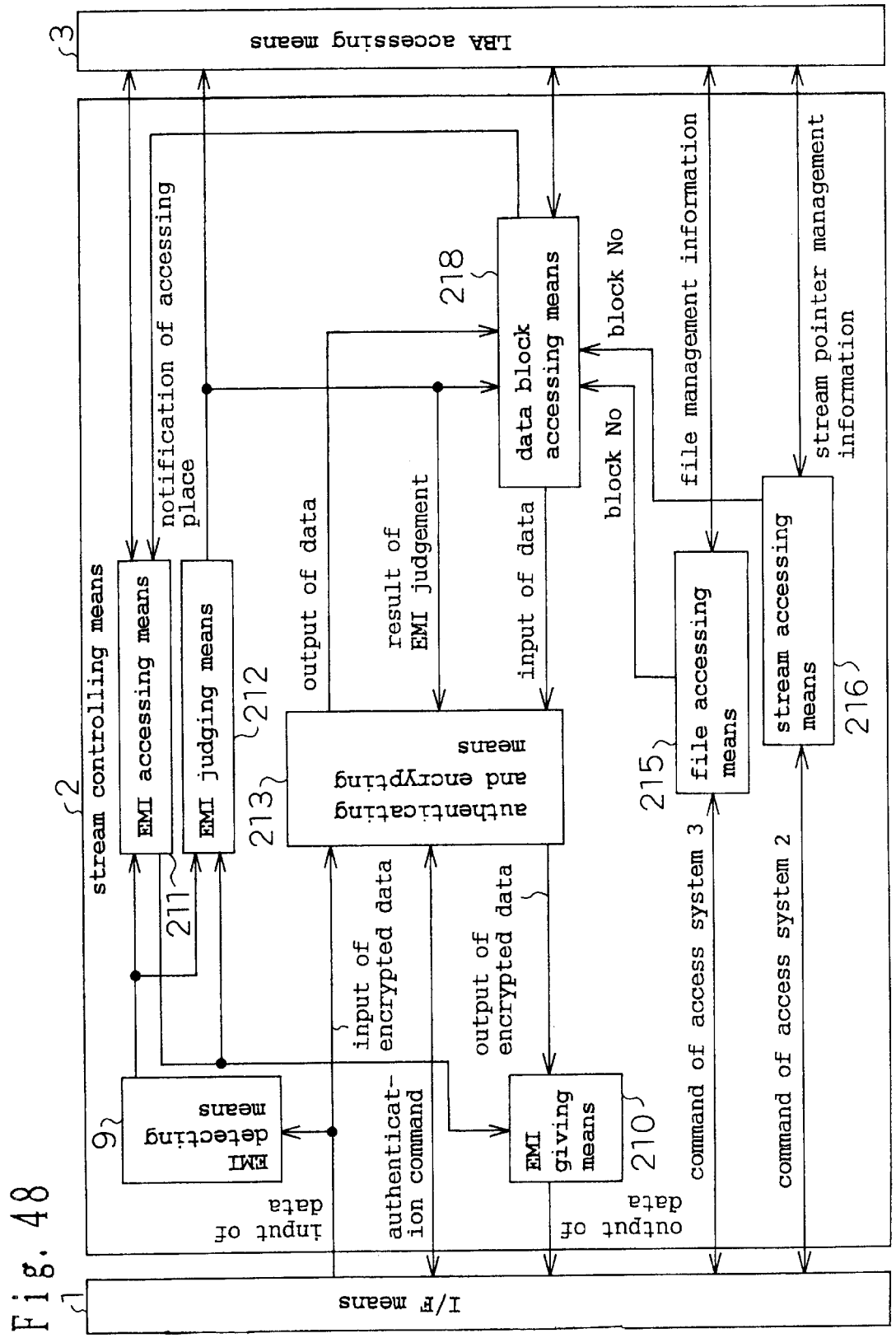
FIG. 48 is a block diagram showing the configuration of stream controlling means in the eleventh embodiment of the invention in the case where an AV data is erased during or after reproduction of the AV data.

The configuration of the embodiment is shown in FIG. 48. The configuration is different from that of FIG. 26 used in the ninth embodiment only in the following points. Namely, the configuration is not provided with the reproduction information managing means A and the invalid data outputting means. It is assumed that the changeover switch 219 is always connected to the side of the output of an encrypted data. It is assumed that the data block accessing means can input a judgement result of the EMI judging means and perform accessing according to the result.

Next, the operation of the embodiment will be described.

In the embodiment, it is assumed that, in the same manner as the ninth embodiment, a hard disk apparatus records and reproduces an AV data sent from an STB. Authentication and key exchange between an STB and the hard disk apparatus of the embodiment are identical with those of the ninth embodiment, and hence their description is omitted.

It is assumed that the record command is received in the form of a command of the access system 2 via the digital I/F means 1. The subsequent process will be described with reference to the flowchart of FIG. 46. When EMI of the sent AV data is not 00, the changeover switch 224 is switched so that the AV data passes through the decoding means 220. When EMI is 00, the changeover switch 224 is switched so that the AV data does not pass through the decoding means 220. The decoding means 220 decodes the encrypted AV data by using the received key. The stream accessing means 216 instructs the data block accessing means 218 to record block x. The data block accessing means 218 notifies the number (=x) of the block which is currently accessed, to the EMI accessing means 211. The EMI accessing means 211 records the EMI information detected by the EMI detecting means 209, correspondingly with the notified block number. In the case where EMI is 10 or "copy one generation," when the EMI information is to be recorded onto the disk medium 6, recording is performed while rewriting EMI to 01 or "no more copy" (S50).

Next, the block number is incremented by one, or x=x+1 is set (S51). Next, it is judged whether another command from the digital I/F means 1 is received or not (S52). If another command is received, the process is ended. If not, the process which has been performed after the reception of the record command is repeatedly performed until another command is received. The case where an AV data is to be recorded onto the disk medium 6 has been described.

Next, the case where the hard disk apparatus reproduces an AV data will be described. The case where an AV data is to be reproduced on a television monitor will be considered. It is assumed that an AV data recorded on the hard disk was recorded from the STB. Authentication and key exchange between the television monitor and the hard disk apparatus of the embodiment are identical with those of the ninth embodiment, and hence their description is omitted.

The subsequent operation is either of two kinds of operations depending on the timing when an AV data is erased. In the first case, AV data are collectively erased after reproduction is ended, and, in the second case, an AV data is erased during reproduction in the unit of block.

Figure 46:
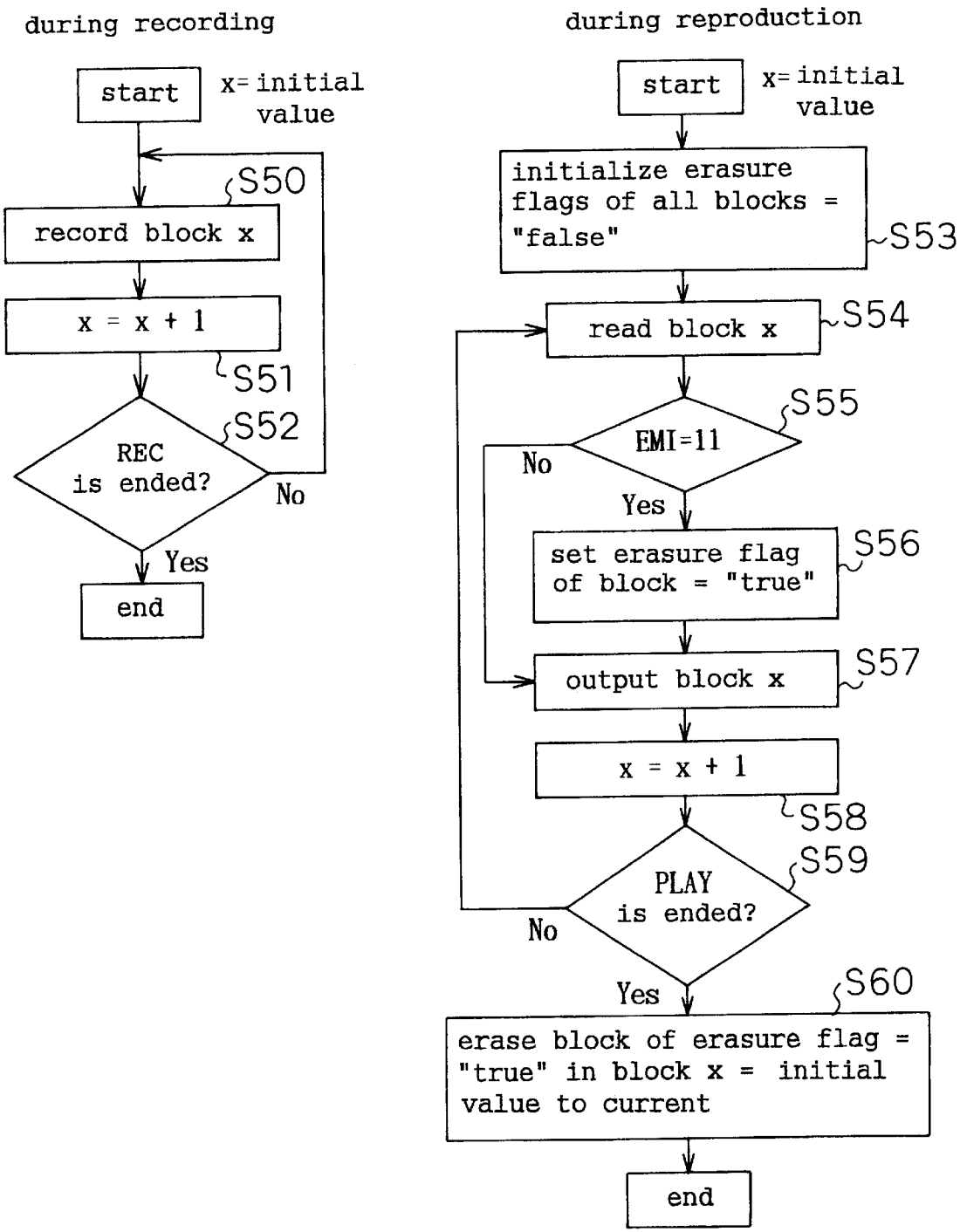
FIG. 46 is a flowchart showing the flow of processes in the eleventh embodiment of the invention in the case where an AV data is erased after the AV data is reproduced.

The first case will be described with reference to the flowchart of FIG. 46.

First, initialization is performed with an erasure flag= "false" of all blocks (S53). The erasure flag is a flag which corresponds to a block in a one to one relationship. The erasure flag="true" means that the corresponding block must be erased later.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the EMI accessing means 211. At the same time, the data block accessing means 218 reads out an AV data from the disk medium 6 via the LBA accessing means 3 (S54). The EMI accessing means 211 reads out EMI information corresponding to the notified block number from the disk medium 6. The read out EMI information is subjected to judgement in the EMI judging means 212. The judgement result is sent to the authenticating and encrypting means 213.

When the EMI judgement result shows that EMI is 00 (S55), the changeover switch 225 is switched to the side in which the data does not pass through the encrypting means 223, and the AV data is output without being encrypted (S57). When EMI is not 00 (S55), the changeover switch 225 is switched to the side in which the data passes through the encrypting means 223.

When EMI is 11, the erasure flag corresponding to the block number is rewritten to "true." When EMI is not 00, the changeover switch 219 is switched to the side of the authenticating and encrypting means 213, so that the AV data is encrypted by the encrypting means 223, and then output via the digital I/F means 1 (S57).

Next, the block number is incremented by one, or x=x+1 is Bet (S58). Next, it is judged whether another command from the digital I/F means 1 is received or not (S59). If another command is received, the process is ended. When the reproduction process is ended, with respect to a block of an erasure flag="true" among the reproduced blocks from the initial number to the final number, an AV data is erased or link information to the recording position of block x on the disk is erased (S60). If not, the process which has been performed after the reception of the reproduction command is repeatedly performed until another command is received. The case where an AV data is to be reproduced in the first case has been described.

Figure 47:
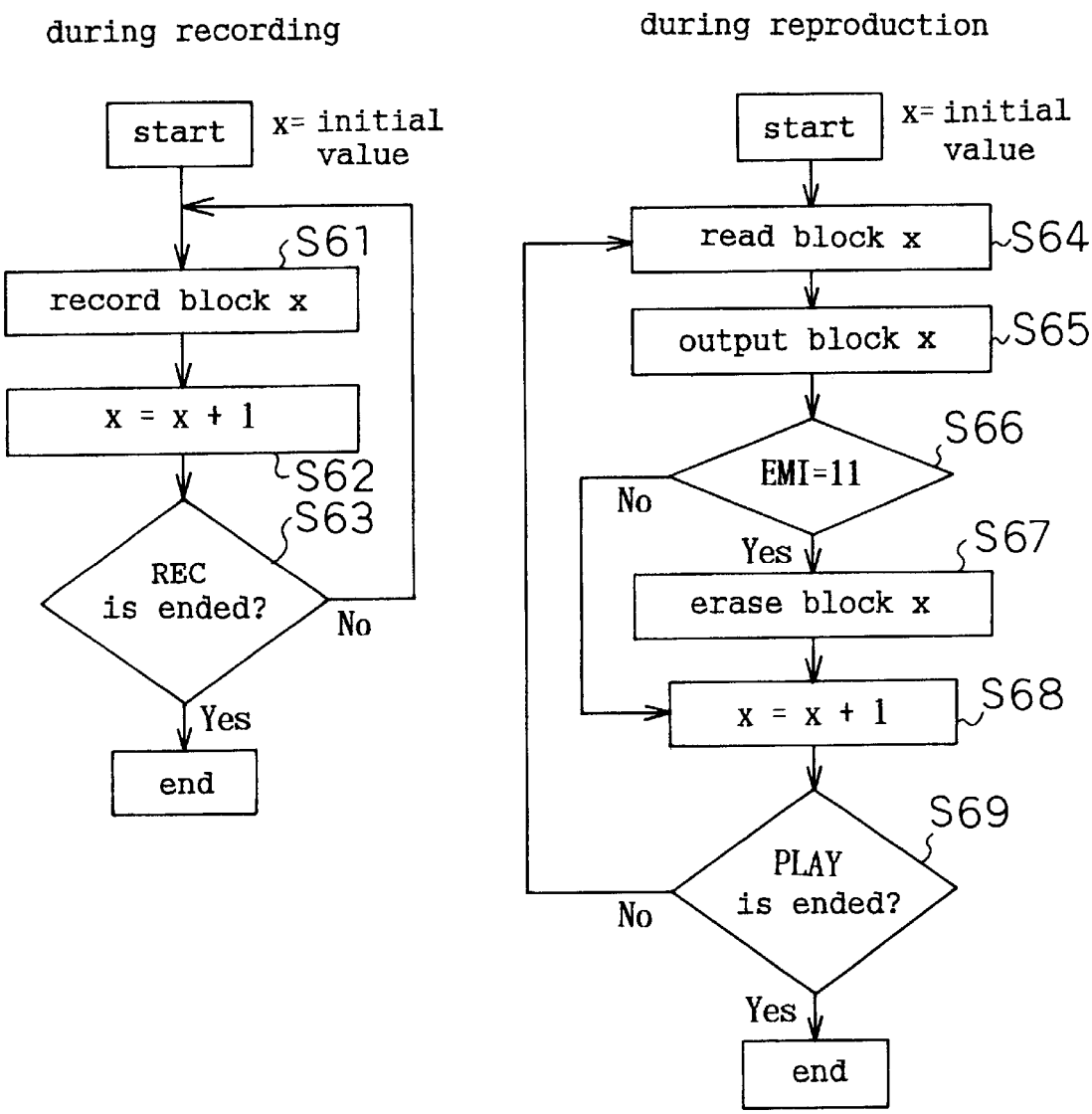
FIG. 47 is a flowchart showing the flow of processes in the eleventh embodiment of the invention in the case where an AV data is erased during reproduction of the AV data.

The second case will be described with reference to the flowchart of FIG. 47.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the EMI accessing means 211. At the same time, the data block accessing means 218 reads out an AV data from the disk medium 6 via the LBA accessing means 3 (S64). The EMI accessing means 211 reads out EMI information corresponding to the notified block number from the disk medium 6. The read out EMI information is subjected to judgement in the EMI judging means 212. The judgement result is sent to the authenticating and encrypting means 213 and the already-reproduction judging means 227.

When the EMI judgement result shows that EMI is 00 (S66), the changeover switch 225 is switched to the side in which the data does not pass through the encrypting means 223, and the AV data passes through the authenticating and encrypting means 213 and the digital I/F means 1 and is then output without being encrypted. When EMI is not 00 (S66), the changeover switch 225 is switched to the side in which the data passes through the encrypting means 223. Next, the changeover switch 219 is switched to the side of the authenticating and encrypting means 213, so that the AV data which is read out by the data block accessing means 218 is encrypted by the encrypting means 223, and then output via the digital I/F means 1. When EMI of block x is 11, the data block accessing means 218 erases block x, writes an invalid data, or erases link information to the recording position of block x on the disk (S67). Then, block x is set to x+1 (S68), and, if a command other than the reproduction command is received (S69), the process is ended. If not, the process which has been performed after the reception of the reproduction command is repeatedly performed until another command is received.

The case where an AV data is to be reproduced in the second case has been described.

In the case where EMI of an AV data recorded on a hard disk is 11 or "copy never," the AV data of "copy never" is allowed to be reproduced only once, by, after the AV data is output, erasing the data block of the AV data, writing an invalid data, or erasing link information to the recording position on the disk.

In the embodiment, the case where a command is executed in the access system 2 by the stream accessing means 216 has been described. Alternatively, a command may be executed in the access system 3 by the file accessing means 215. In this case, the order of recording and reproduction depends not on the order of block numbers, but on that of blocks which are managed by file management information. Namely, when a block which is to be recorded or reproduced in an x-th process is expressed by f(x), it is requested only to replace the description portion of block x in FIG. 46 or 47, with block f(x). Further, block x may be erased in the file management.

The embodiment may be implemented while, in the same manner as the tenth embodiment, EMI is recorded with being mixed with an AV data.

Embodiment 12

Next, a twelfth embodiment will be described.

In the embodiment, a VCR (Video Cassette Recorder) will be described as an example of a recording and reproducing apparatus in which, in the case where copy right information of an AV data sent from a broadcasting station is "copy never" that means copy inhibit, a program can be viewed or listened only once at an arbitrary time after a time zone when the program is broadcast.

In the embodiment, such a VCR is realized by setting an AV data in which copy right information is "copy never" to be recordable, and allowing the AV data to be reproduced only once by using reproduction information managing means.

Figure 36:
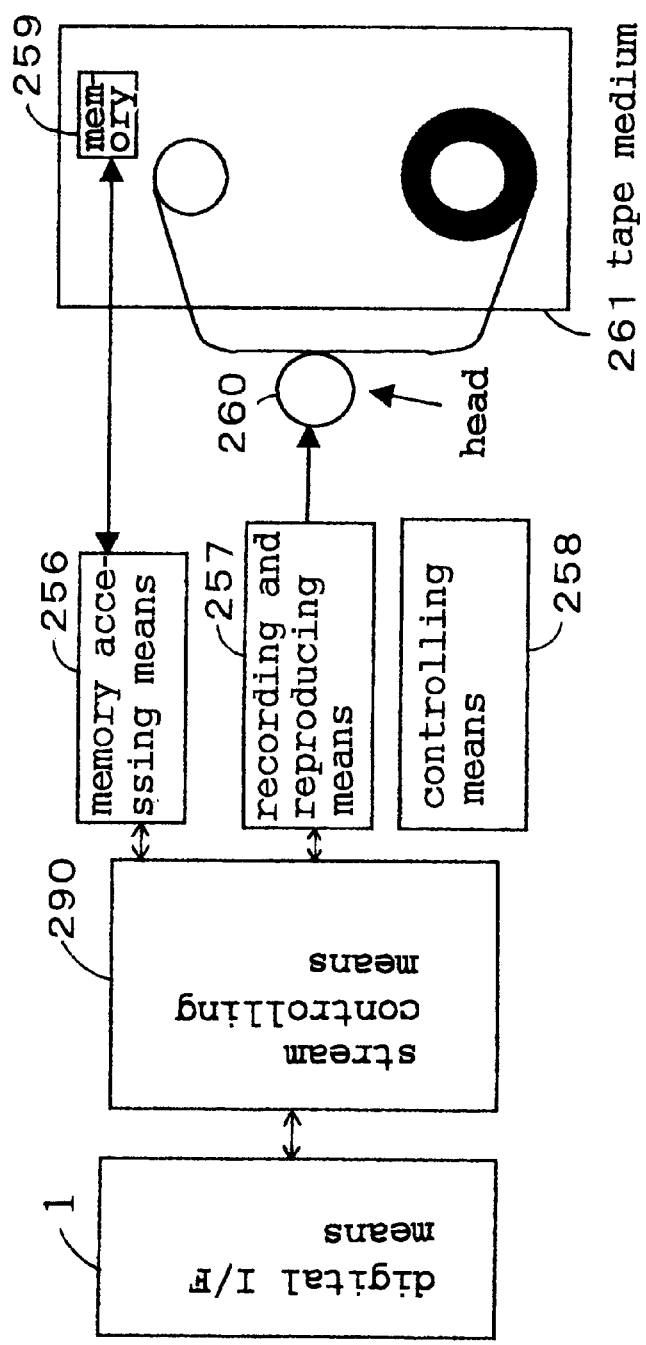
FIG. 36 is a basic configuration view of a VCR in the twelfth embodiment of the invention.

FIG. 36 shows the basic configuration of a VCR. The VCR is configured by digital I/F means 1, stream controlling means 290, memory accessing means 256, recording and reproducing means 257, controlling means 258, a head 260, a memory 259, and a tape medium 261.

The digital I/F means 1 is identical with that described in the ninth embodiment. With respect to the stream controlling means 290, only portions which are different from those described in the ninth embodiment will be described later. The memory accessing means 256 is means for recording and reproducing EMI information and reproduction information and the like with respect to the memory 259 disposed in the tape medium 261. The recording and reproducing means 257 is means for signal processing a reproduced signal from the head 260, and outputting a digital AV data, and for signal processing an AV data sent from the stream controlling means 290, and sending a record signal to the head 260. The controlling means 258 is means for controlling running of the tape medium 261, tracking of the head 260, and controlling the recording and reproducing means 257. The head 260 records a signal onto the tape medium 261, or reproduces a signal on the tape medium 261. The memory 259 is incorporated into the tape medium 261, and records and reproduces EMI information, reproduction information, and the like.

Figure 37:
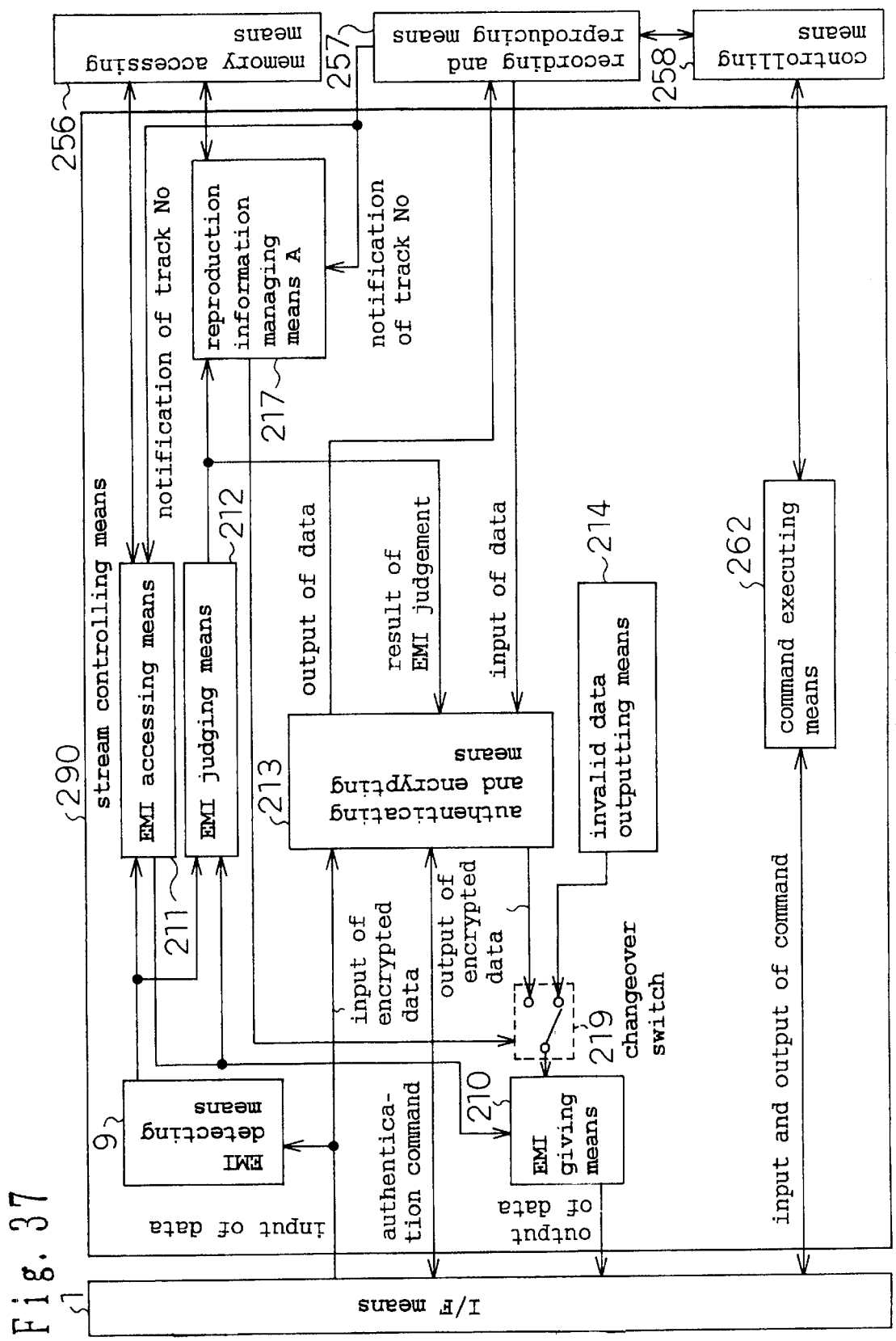
FIG. 37 is a block diagram showing the configuration of stream controlling means in the twelfth embodiment of the invention in the case where reproduction information is recorded into a memory, and an AV data is recorded onto a tape.

The portions of the stream controlling means 290 which are different from the ninth embodiment will be described with reference to FIG. 37 as described above. Command executing means 262 is means for executing a command received from the digital I/F means 1, or means for interpreting the contents of the command, and for instructing the controlling means 258 to perform reproduction, recording, stop, and the like. For example, such a command which is sent to the digital I/F means 1 is a system conforming to AV/C digital Interface Command Set VCR subunit Specification version 2.0.1 and the like. The recording and reproducing means 257 is an alternative of the data block accessing means 218 in the ninth embodiment. The recording and reproducing means 257 is means for notifying the number of a track which is currently recorded or reproduced, to the reproduction information managing means A.

When, in the operation of the ninth embodiment, "block" is replaced with "track," and the file accessing means 215 and the stream accessing means 216 are replaced with the command executing means 262, the operation of the embodiment is identical with that of the ninth embodiment. As a result, a VCR is realized in which, in the case where copy right information of an AV data sent from a broadcasting station is "copy never" that means copy inhibit, a program can be viewed or listened only once at an arbitrary time after a time zone when the program is broadcast.

As an example of storing reproduction information and an AV data onto the tape medium 261, the following two cases will be described.

Figure 38:
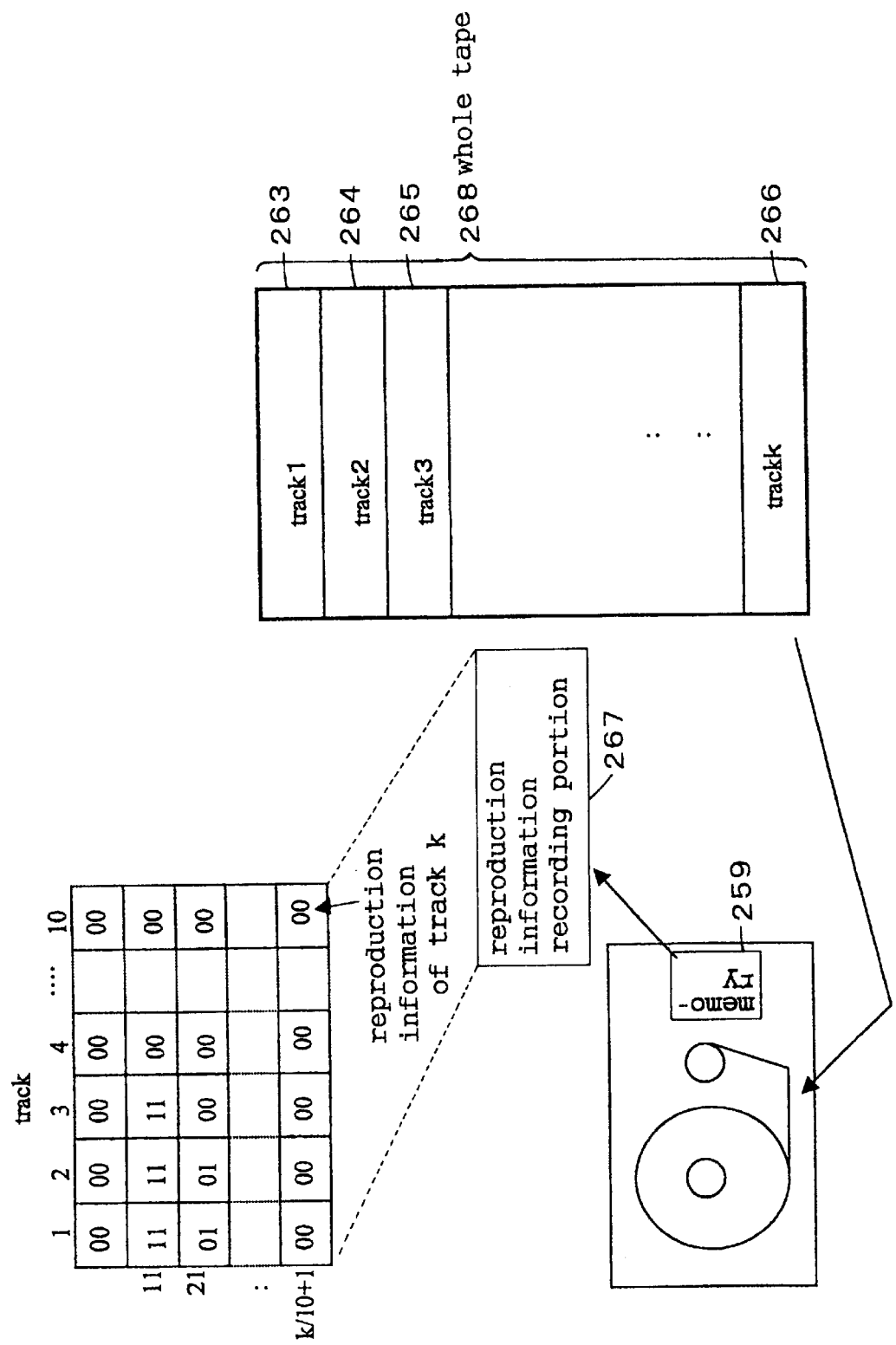
FIG. 38 is a view showing a recording method of recording reproduction information in the unit of track in the twelfth embodiment of the invention in the case where reproduction information is recorded into a memory, and an AV data is recorded onto a tape.

First, the case where reproduction information is provided in the unit of track will be described. Referring to FIG. 38, the tape medium 261 is configured by a k number of tracks. The memory 259 is incorporated into the tape medium 261. A reproduction information recording portion 267 is recorded into the memory 259. Referring to a table which is stored in the form of a bit map in the reproduction information recording portion 267, all reproduction information of track 1 (263), track 2 (264), track 3 (265), and track k (266) is 0. Namely, this shows that the area has not yet been reproduced. However, areas such as the track k (266) are areas which have not yet been used. It is assumed that, with respect to an unused area also, reproduction information is set to 0. Since reproduction information of track 211, track 212, and track 213 is 1, they are already-reproduced areas. The reproduction information recording portion 267 is produced and updated by the reproduction information managing means A 217. Since the reproduction information recording portion 267 is stored in the memory 259 incorporated into the tape medium 261, the user cannot easily tamper with contents of the reproduction information recording portion 267, so that an AV data cannot be unauthorizedly viewed or listened. Therefore, the VCR of the embodiment has high reliability.

Figure 39:
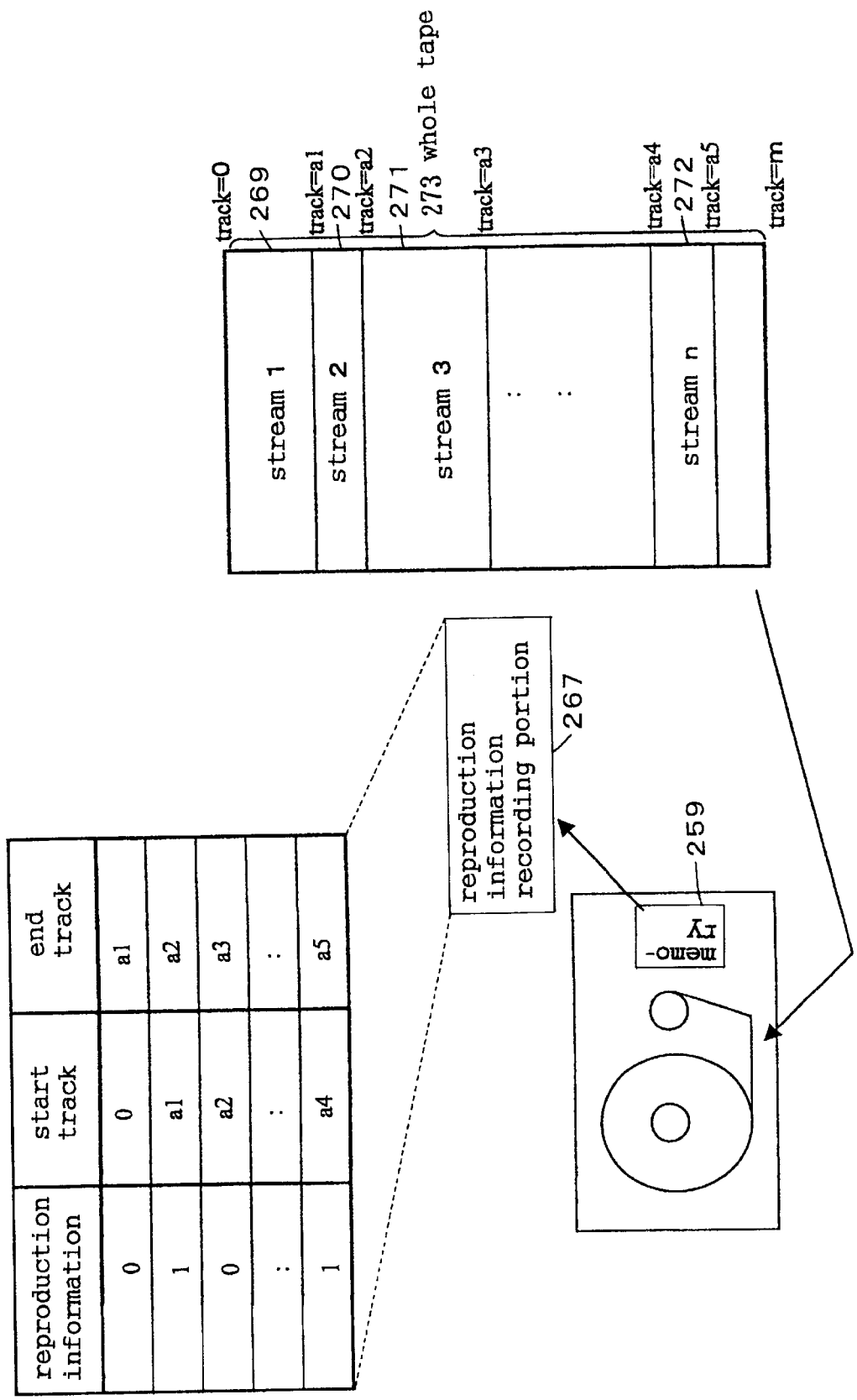
FIG. 39 is a view showing a recording method of recording reproduction information on the basis of a start track and an end track where reproduction information is varied in the twelfth embodiment of the invention in the case where reproduction information is recorded into a memory, and an AV data is recorded onto a tape.

Next, the case where reproduction information is managed by means of an address will be described. Referring to FIG. 39, a stream is defined while, in the portion of the whole tape 273 of the tape medium 261, dividing data each time when reproduction information is changed from already-reproduced to not-yet-reproduced or from not-yetreproduced to already-reproduced. The reproduction information recording portion 267 is expressed by a pair of reproduction information of the stream, and the start track and the end track of the stream. In stream 1 (269), the start track is 0[sic: a0], the end track is a1, and the entire stream is not-yet-reproduced. In stream 2 (270), the start track is a1, the end track is a2, and the entire stream is already-reproduced. In stream 3 (271), the start track is a2, the end track is a3, and the stream is not-yet-reproduced. In stream n (272), the start track is a4, the end track is a5, and reproduction information of the stream is already-reproduced. The reproduction information recording portion 267 is produced and updated by the reproduction information managing means A 217. Since the reproduction information recording portion 267 is stored in the memory 259 of the tape medium 261, the user cannot easily tamper with the contents of the reproduction information recording portion 267, so that an AV data cannot be unauthorizedly viewed or listened. Therefore, the VCR of the embodiment has high reliability.

Embodiment 13

Next, a thirteenth embodiment will be described.

In the embodiment, a VCR will be described as an example of a recording and reproducing apparatus in which, in the case where copy right information of an AV data sent from a broadcasting station is "copy never" that means copy inhibit, a program can be viewed or listened only once at an arbitrary time after a time zone when the program is broadcast. In the embodiment, unlike the twelfth embodiment, EMI information is stored onto a tape with being paired with an AV data. Such a VCR is realized by Betting an AV data which has copy right information of "copy never" to be recordable, and by erasing the AV data while reproducing.

Figure 40:
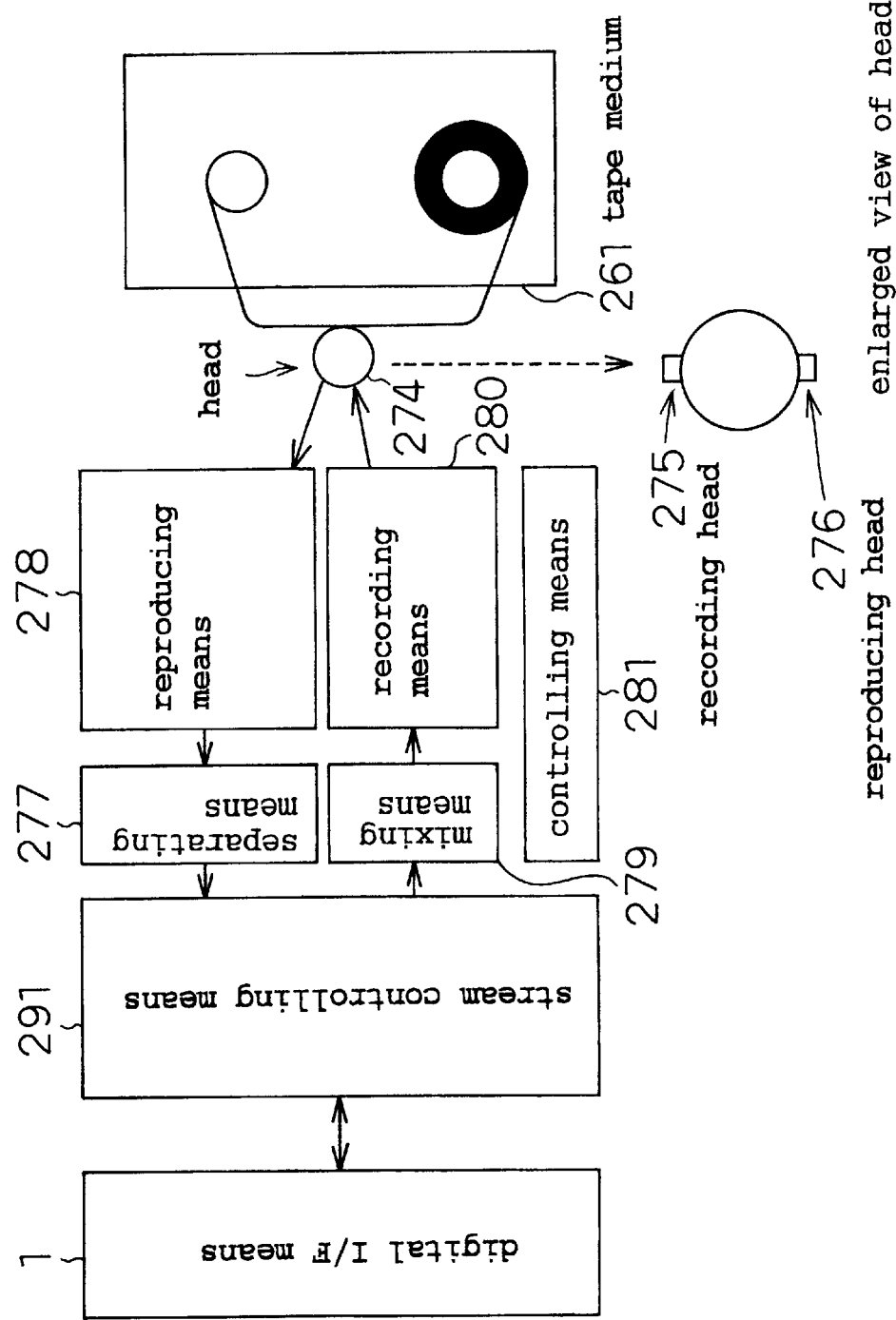
FIG. 40 is a basic configuration view of a VCR in the thirteenth embodiment of the invention.
Figure 41:
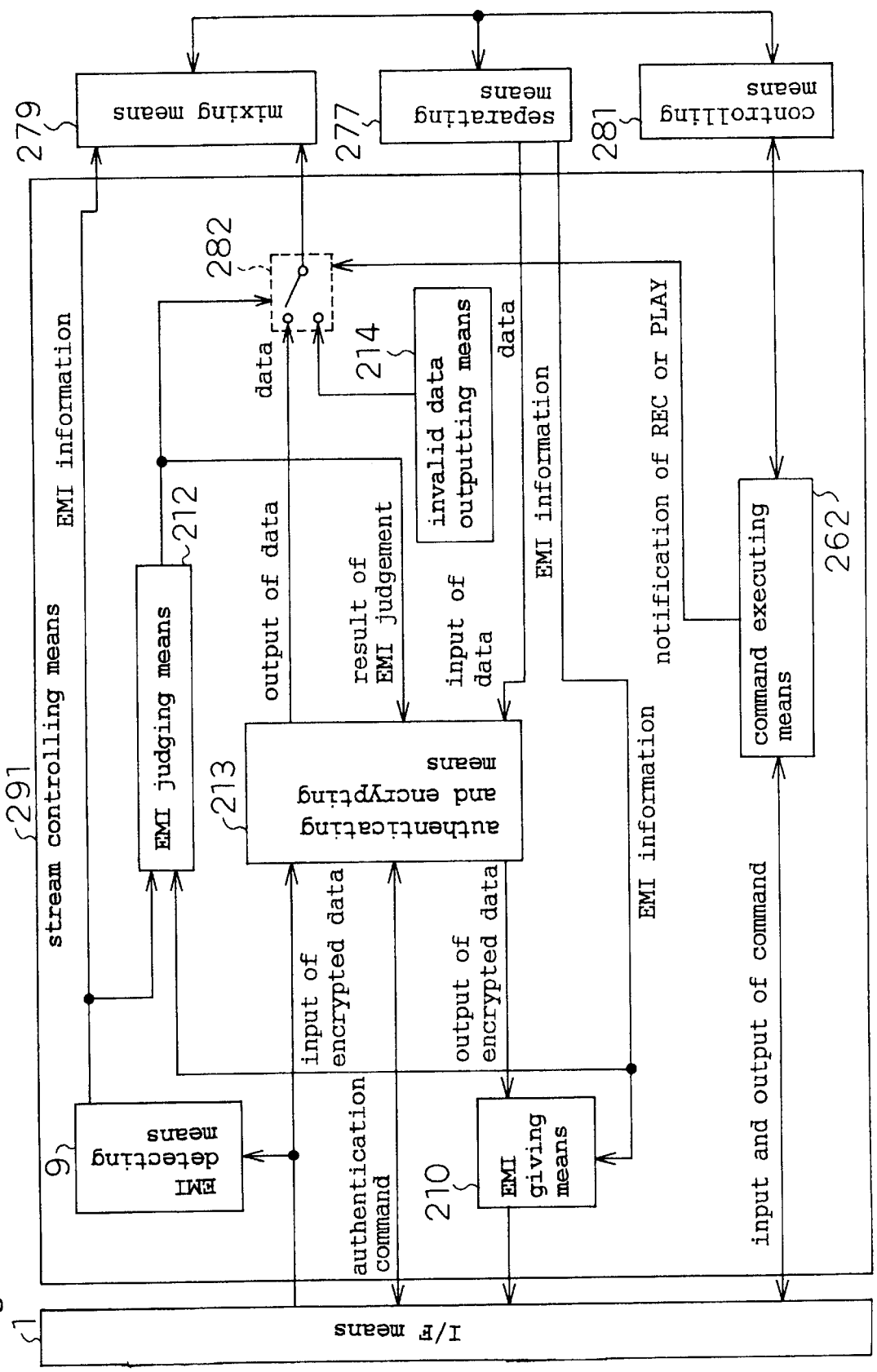
FIG. 41 is a block diagram showing the configuration of stream controlling means in the thirteenth embodiment of the invention in the case where an AV data is erased while being reproduced.

FIG. 40 shows the basic configuration of a VCR. As shown in FIG. 36, the VCR of the twelfth embodiment is recording and reproducing means. By contrast, the embodiment is different from the twelfth embodiment in that reproducing means and recording means are separately configured, a recording head and a reproducing head are separately disposed in a head, and separating means and mixing means are disposed. The VCR is configured by digital I/F means 1, stream controlling means 291, separating means 277, reproducing means 278, mixing means 279, recording means 280, controlling means 281, a head 274, a recording head 275, a reproducing head 276, and a tape medium 261.

The digital I/F means 1 is identical with that described in the ninth embodiment. With respect to the configuration of the stream controlling means 291, only portions which are different from those described in the twelfth embodiment will be described later. The separating means 277 is means for separating a data read out from the reproducing means 278, into EMI information and an AV data. The mixing means 279 is means for pairing EMI information and an AV data. The reproducing means 278 is means for reproducing EMI information and an AV data recorded on the tape medium 261, via the reproducing head 276 of the head 274. The recording means 280 is means for recording EMI information and an AV data onto the tape medium 261, via the recording head 275 of the head 274. The head 274 is configured by the recording head 275 and the reproducing head 276, and is means for reproducing a signal recorded on the tape medium 261 by means of the reproducing head 276, and recording a signal onto the tape medium 261 by means of the recording head 275. The controlling means 281 is means for controlling running of the tape medium 261, tracking of the head 274, controlling the reproducing means 278, and the recording means 280. The tape medium 261 is a medium on which a signal is to be recorded.

The stream controlling means 291 is different from the twelfth embodiment as described above, in the following points. During recording a changeover switch 282 is switched so that an output data from the authenticating and encrypting means 213 is output as it is to the mixing means 279, and, during reproduction, switched to the invalid data outputting means 214 in the case where a judgement result of the EMI judging means 212 shows that EMI=11. In the case where reproduction is being performed and EMI=01 or 10, connection is not made with respect to both the authenticating and encrypting means 213 and the invalid data outputting means 214. The command executing means 262 is means for notifying the changeover switch 282 of whether recording is being performed or reproduction is being performed, in addition to the contents which have been described in the twelfth embodiment. The reproduction information managing means A is not used in the embodiment.

Next, the operation of the embodiment will be described.

In the embodiment, it is assumed that, in the same manner as the ninth embodiment, a VCR records and reproduces an AV data sent from an STB. Authentication and key exchange between an STB and the VCR of the embodiment are identical with those of the ninth embodiment, and hence their description is omitted.

It is assumed that the command executing means 262 receives a record command via the digital I/F means 1. The command executing means 262 notifies the changeover switch 282 of the reception of the record command. Then, the changeover switch 282 is switched so that the sent AV data is transferred from the authenticating and encrypting means 213 to the mixing means 279. When EMI of the sent AV data is not 00, the changeover switch 224 is switched so that the AV data passes through the decoding means 220. When EMI is 00, the changeover switch 224 is switched so that the AV data does not pass through the decoding means 220. The decoding means 220 decodes the encrypted AV data by using the key received from the STB. The mixing means 279 receives the EMI information detected by the EMI detecting means 209, and also the AV data output from the authenticating and encrypting means 213 via the changeover switch 282. The mixing means 279 pairs the received EMI information and the AV data. Then, the recording means 280 records the paired AV data and EMI information onto the tape medium 261 via the recording head 275 of the head 274. In the case where EMI is 210 or "copy one generation," EMI information is recorded with rewriting EMI to 01 or "no more copy" when EMI information is to be recorded onto the disk medium 6. The format of the recording an AV data and EMI information onto the tape medium 261 will be described later. Such process is repeatedly performed until another command is received. The case where an AV data is to be recorded onto the tape medium 261 has been described.

Next, the case where the VCR reproduces an AV data will be described. The case where an AV data is to be reproduced on a television monitor will be considered. It is assumed that an AV data recorded on the VCR was recorded from the STB. Authentication and key exchange between the television monitor and the VCR of the embodiment are identical with those of the ninth embodiment, and hence their description is omitted.

It is assumed that the VCR receives a reproduction command from the digital I/F means 1. The command executing means 262 notifies the changeover switch 282 of the reception of the reproduction command. Then, the changeover switch 282 is switched to the side of the invalid data outputting means 282 in the case where the judgement result of the EMI judging means 212 is 211. In the case where EMI=10 or 01, the changeover switch 282 is connected to none of the authenticating and encrypting means 213 and the invalid data outputting means 214. The embodiment handles the case where a data which is obtained by recording an AV data sent from the STB is reproduced. Consequently, there is no AV data of EMI=10. Namely, when data are to be recorded from an STB, any EMI of an AV data which is 10 is rewritten to 01. The separating means 277 separates the AV data and the EMI information which are reproduced from the tape medium 261 via the head 274 and the reproducing means 278. The AV data is transferred to the authenticating and encrypting means 213. The EMI information is transferred to the EMI giving means 210. Also the AV data which is derived via the authenticating and encrypting means 213 passes through the EMI giving means 210 to be provided with EMI therein, and is then output via the digital I/F means 1. Immediately after the separating means 277 separates the AV data and the EMI information, when EMI is 11, the mixing means 279 writes an invalid data into the tape medium 261 via the recording means 280 and the recording head 275 of the head 274 by means of the invalid data outputting means 214. The AV data on the tape medium 261 which is reproduced as describe above is rewritten with an invalid data such as a blue back screen or a black screen. As a result, a VCR is realized in which, in the case where copy right information of an AV data sent from a broadcasting station is "copy never" that means copy inhibit, a program can be viewed or listened only once at an arbitrary time after a time zone when the program is broadcast.

The format in which, as described above, an AV data and EMI information are recorded onto the tape medium 261 will be described.

Figure 42:
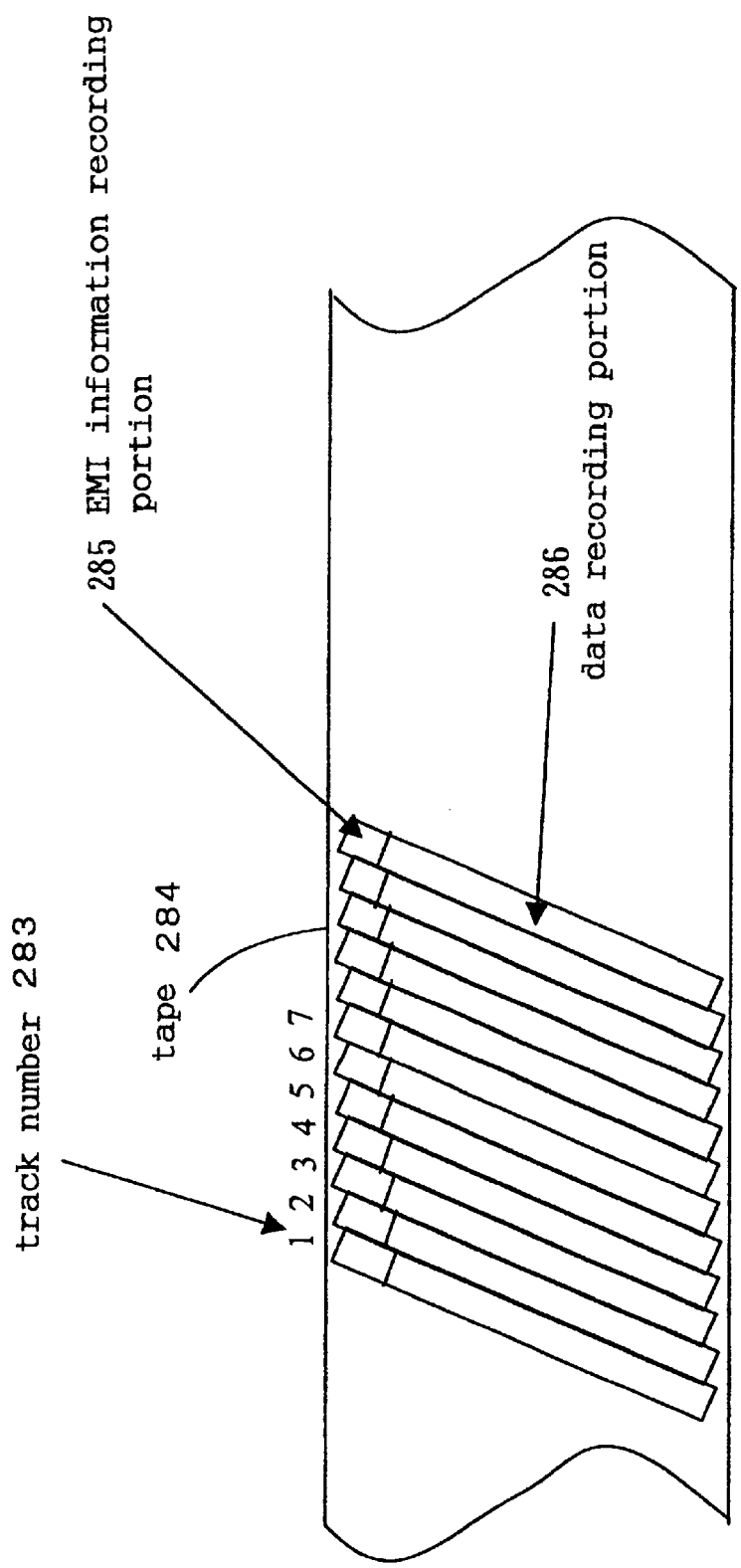
FIG. 42 is a view showing a recording method of recording EMI information and an AV data onto a tape in the thirteenth embodiment of the invention in the case where an AV data is erased while being reproduced.

As shown in FIG. 42, in a tape 284, recording is performed in the unit of track, and a track number 284 is added to a recorded track. One track is divided into an EMI information recording portion 285 and a data recording portion 286. The EMI information recording portion 285 records EMI information, and the data recording portion 286 records an AV data.

EMI information in the invention is not restricted that which is to be recorded into the EMI information recording portion of the embodiments described above. A memory may be mounted on a tape medium, and recording may be performed on the memory. According to this configuration, information is hardly tampered with, and the reliability of the system is improved.

Embodiment 14

Hereinafter, a fourteenth embodiment will be described.

In the embodiment, a hard disk apparatus will be described as an example of a recording and reproducing apparatus in which, in the case where copy right information of an AV data sent from a broadcasting station is "copy never" that means copy inhibit, a program can be viewed or listened only once at an arbitrary time after a time zone when the program is broadcast.

In the embodiment, such a hard disk apparatus is, realized by setting an AV data which has copy right information of "copy never" to be recordable, recording an AV data while reencrypting by second encrypting/decoding means, and, during reproduction, performing reproduction while erasing a key used in the second encrypting/decoding means.

Figure 43:
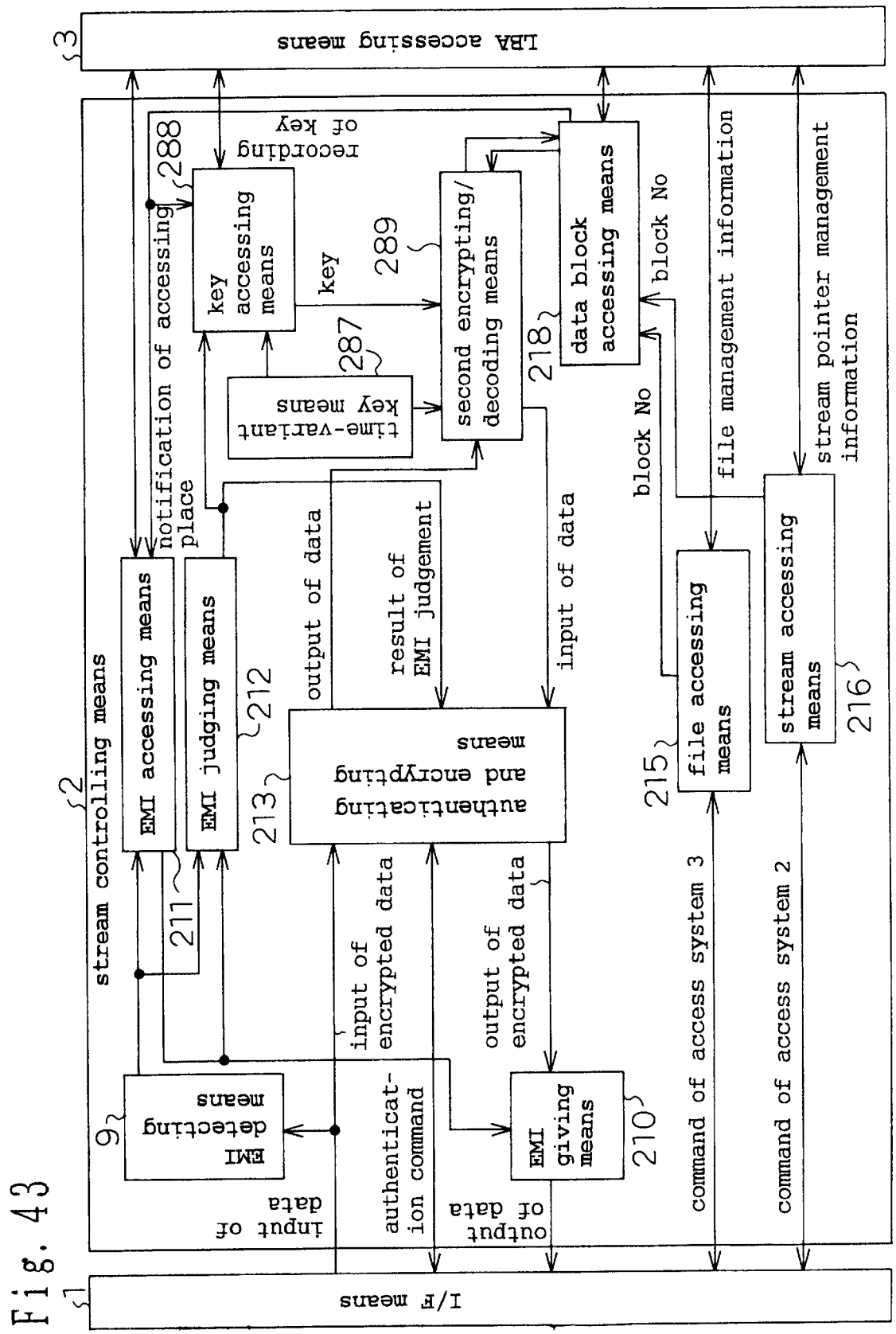
FIG. 43 is a block diagram showing the configuration of stream controlling means in the fourteenth embodiment of the invention in the case where, when an AV data is to be recorded onto a disk medium, the data is recorded with being reencrypted, and, when the data is to be reproduced, the AV data is decoded and output and a key recorded on the disk medium is then erased.

FIG. 1 is a basic configuration view of the hard disk apparatus of the invention. This is identical with that described in the ninth embodiment. The stream controlling means 2 of the hard disk apparatus in FIG. 1 is configured as shown in FIG. 43. Namely, the stream controlling means 2 is configured by EMI detecting means 209, EMI giving means 210, EMI accessing means 211, EMI judging means 212, authenticating and encrypting means 213, file accessing means 215, stream accessing means 216, data block accessing means 218, time-variant key means 287, key accessing means 288, and second encrypting/decoding means 289.

With respect to the configuration of the stream controlling means 2, only portions which are different from the ninth embodiment will be described. The time-variant key means 287 is means for producing a key which is randomly changed with the passage of time, and means for transferring the produced key to the key accessing means 288 and the second encrypting/decoding means 289. The key accessing means 288 is means for storing the key produced in the time-variant key means 287, correspondingly with a corresponding data block, recording the key into the disk medium 6, and reading out the key from the disk medium 6. The second encrypting/decoding means 289 is means for encrypting or decoding an AV data based on the input key.

Next, the operation of the embodiment will be described.

In the embodiment, it is assumed that, in the same manner as the ninth embodiment, a hard disk apparatus records and reproduces an AV data sent from an STB during recording. Authentication and key exchange between an STB and the hard disk apparatus of the embodiment are identical with those of the ninth embodiment, and hence their description is omitted.

It is assumed that the record command is received in the form of a command of the access system 2 via the digital I/F means 1. The subsequent process will be described with reference to the flowchart of FIG. 44. When EMI of the AV data sent via the digital I/F means 1 is not 00, the changeover switch 224 is switched so that the AV data passes through the decoding means 220. When EMI is 00, switching is performed so that the AV data does not pass through the decoding means 220. The decoding means 220 decodes the encrypted AV data by using the received key. The stream accessing means 216 instructs the data block accessing means 218 to record block x. The data block accessing means 218 notifies the number (=x) of the block which is currently accessed, to the EMI accessing means 211. The EMI accessing means 211 records the EMI information detected by the EMI detecting means 209, correspondingly with the notified block number. In the case where EMI is 10 or "copy one generation," when the EMI information is to be recorded onto the disk medium 6, recording is performed while rewriting EMI to 01 or "no more copy." The time-variant key means 87 produces a key. The produced key is transferred to the key accessing means 288, and then recorded onto the disk medium 6 via the LBA accessing means 3 (S26). The key is transferred also to the second encrypting/decoding means 289. The AV data received from the authenticating and encrypting means 213 is reencrypted, and the encrypted AV data is transferred to the data block accessing means 218, and then recorded onto the disk medium 6 via the LBA accessing means 3 (S27).

Next, the block number is incremented by one, or x=x+1 is set (S28). Next, it is judged whether another command from the digital I/F means 1 is received or not (S29). If another command is received, the process is ended. If not, the process which has been performed after the reception of the record command is repeatedly performed until another command is received. The case where an AV data is to be recorded onto the disk medium 6 has been described.

Next, the case where the hard disk apparatus reproduces an AV data will be described. The case where an AV data is to be reproduced on a television monitor will be considered. It is assumed that an AV data recorded on the hard disk was recorded from the STB. Authentication and key exchange between the television monitor and the hard disk apparatus of the embodiment are identical with those of the ninth embodiment, and hence their description is omitted.

The operation during reproduction is either of two kinds of operations depending on the timing when the key produced in the time-variant key means 287 is erased from the disk medium 6. In the first case, keys are collectively erased after reproduction is ended, and, in the second case, a key is erased during reproduction in the unit of block.

The first case will be described with reference to the flowchart of FIG. 44.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the EMI accessing means 211 and the key accessing means 288. At the same time, the data block accessing means 218 reads out an AV data from the disk medium 6 via the LBA accessing means 3 (S30). The EMI accessing means 211 reads out EMI information corresponding to the notified block number from the disk medium 6. The read out EMI information is subjected to judgement in the EMI judging means 212. The judgement result is sent to the authenticating and encrypting means 213 and the key accessing means 288. The key accessing means 288 reads out the key of block x from the disk medium 6 (S31). The key accessing means 288 transfers the read out key to the second encrypting/decoding means 289. The second encrypting/decoding means 289 decodes the AV data of block x which is received from the data block accessing means 218 (S32). The key accessing means 288 sets the erasure flag of the key of block x to 0 (S33). When the EMI judgement result shows that EMI is 00 (S34), the changeover switch 225 is switched to the side in which the data does not pass through the encrypting means 223, and the AV data is output without being encrypted. When EMI is not 00 (S34), the changeover switch 225 is switched to the side in which the data passes through the encrypting means 223.

In the case where EMI is 11 or "copy never," or the case where EMI is 01 or "no more copy," the second encrypting/decoding means 289 transfers the decoded AV data of block x to the authenticating and encrypting means 213.

Thereafter, the key accessing means 288 sets the erasure flag of the key of block x to 1 (S35). Next, the block number is incremented by one, or x=x+1 is set (S36). Next, it is judged whether another command from the digital I/F means 1 is received or not (S37). If another command is received, the process is ended. When the reproduction process is ended, the key accessing means erases keys of blocks of an erasure flag of 1 and from the initial number to the final number of blocks, only in the case where EMI is 11 (S38). The erasing means, for example, to overwrite the portion where the key is recorded, with an invalid data, or to erase link information to the recording position of the disk medium where the key is recorded.

Figure 45:
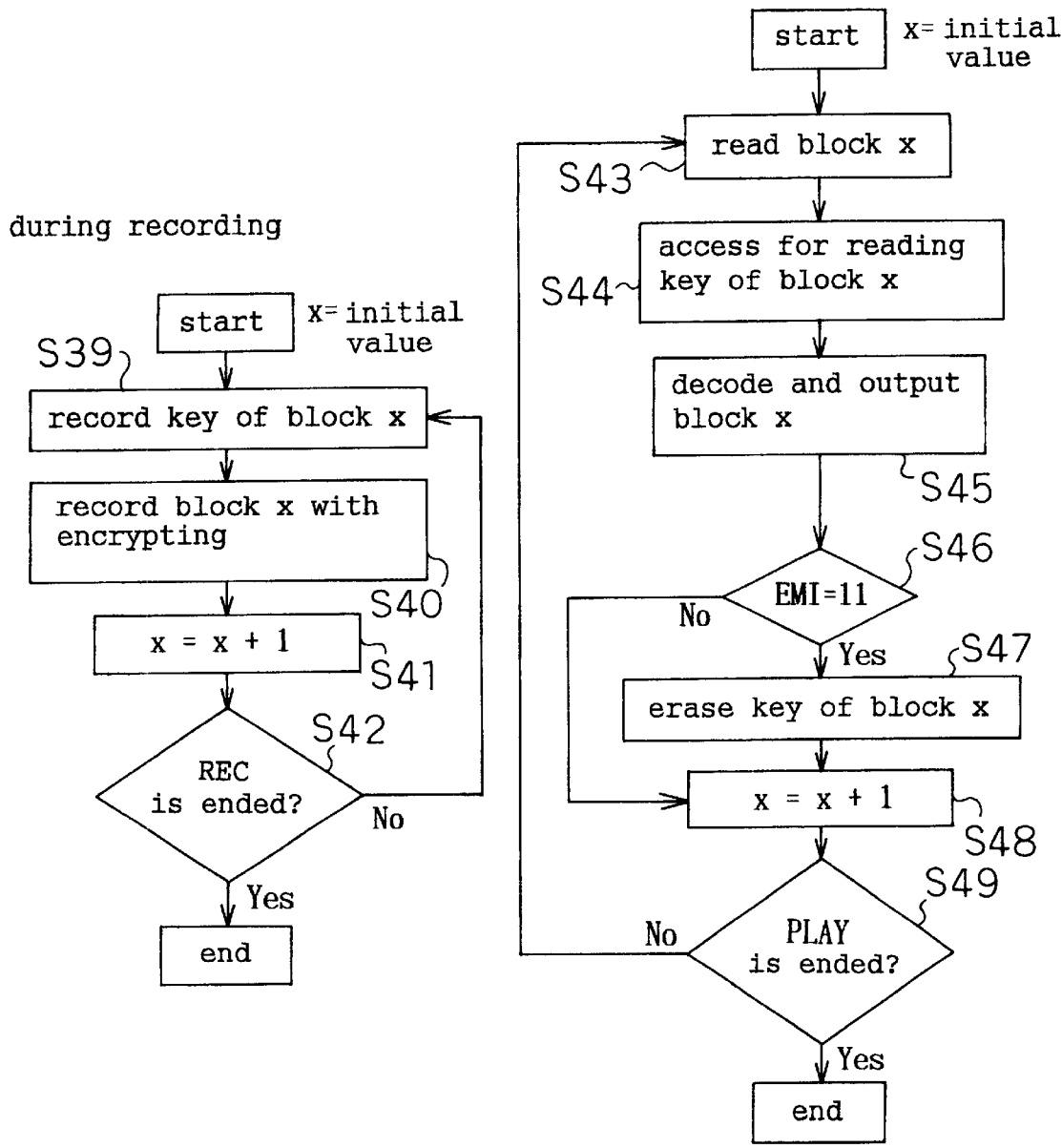
FIG. 45 is a flowchart showing the flow of processes in the fourteenth embodiment of the invention in the case where the key is erased during reproduction of an AV data.

The second case will be described with reference to the flowchart of FIG. 45.

It is assumed that the hard disk apparatus receives the reproduction command in the form of a command of the access system 2 from the digital I/F means 1. The stream accessing means 216 instructs the data block accessing means 218 to reproduce block x. The data block accessing means 218 notifies the number (=x) of the block which is currently accessed, to the EMI accessing means 211 and the key accessing means 288. At the same time, the data block accessing means 218 reads out an AV data from the disk medium 6 via the LBA accessing means 3 (S43). The EMI accessing means 211 reads out EMI information corresponding to the notified block number from the disk medium 6. The read out EMI information is subjected to judgement in the EMI judging means 212. The judgement result is sent to the authenticating and encrypting means 213 and the key accessing means 288. The key accessing means 288 reads out the key of block x from the disk medium 6 (S44). The key accessing means 288 transfers the read out key to the second encrypting/decoding means 289. The second encrypting/decoding means 289 decodes the AV data of block x which is received from the data block accessing means 218 (S45). When the EMI judgement result shows that EMI is 00 (S46), the changeover switch 225 is switched to the side in which the data does not pass through the encrypting means 223, and the AV data is output without being encrypted. When EMI is not 00 (S46), the changeover switch 225 is switched to the side in which the data passes through the encrypting means 223.

In the case where EMI is 11 or "no more copy," the second encrypting/decoding means 289 transfers the decoded AV data of block x to the authenticating and encrypting means 213. Thereafter, the key accessing means 288 erases the key of block x (S47). The erasing means to overwrite the portion where the key is recorded, with an invalid data, or to erase link information to the recording position of the disk medium where the key is recorded.

In the case where EMI is 01 or "no more copy," the second encrypting/decoding means 289 outputs the decoded AV data of block x. In this case, the key of block x is not erased (S47).

Next, the block number is incremented by one, or x=x+1 is set (S48). Next, it is judged whether another command from the digital I/F means 1 is received or not (S49). If another command is received, the process is ended.

As described above, in the embodiment, an AV data is encrypted and then recorded into a medium. In an exchangeable medium such as a DVD-RAM, therefore, safety against unauthorized use can be enhanced as compared with the case where an AV data which is not encrypted is recorded.

In the method of recording a key in the embodiment, a key may be recorded with being paired with an AV data, or alternatively recorded separately from an AV data. In this case, a key may be recorded into an area such as a system area which the user cannot directly access. An area which the user cannot directly access is not restricted to this, and may be an alternate sector area, a PCA, an RMA, a lead-in, a lead-out, or a header portion on a DVD-RAM as described in the ninth embodiment. In summary, any area may be useful as far as it is an area which the user cannot directly access a data. According to this configuration, there is no fear that the user accesses a data of a key to decrypt the key, and hence safety is improved.

In the embodiment, the method has been described in which reproduction is allowed only once by erasing a key during reproduction. Also when reproduction information for a key is managed, implementation can be performed. Specifically, information indicative of whether a key has already been read out or not is used as reproduction information of the key, and implementation is performed while managing the information in the same manner as reproduction information which has been described in the ninth or tenth embodiment, thereby allowing the key to be read out only once. As a result, during reproduction, an AV data which is encrypted and then recorded into a recording medium can be reproduced only once.

When also reproduction information of a key is recorded into an area which the user cannot access as described above, safety is further improved.

In the ninth to fourteenth embodiments, the apparatuses in which an-AV data of EMI=11 of "copy never" can be reproduced only once have been described. In the case where an AV data of EMI=10 of "copy one generation" is recorded with being set to that of EMI=01 of "no more copy," the AV data can be moved between apparatuses by reproducing only once the AV data with setting EMI=10 of "copy one generation." In this case, implementation can be performed in the same manner as the ninth to fourteenth embodiments except that an AV data which was recorded with setting EMI=01 is output with setting EMI=10. Movement of an AV data of EMI=11 has been described in the ninth embodiment. In this way, also an AV data other than EMI=11 can be moved. As a result, there is an advantage that the user can freely select a medium on which an AV data is to be stored.

In the ninth to fourteenth embodiments, EMI has been used. The invention is not restricted to the use of EMI. The presence or absence and the kind of a copy right may be judged by using a CGMS. In the case where the presence or absence and the kind of a copy right are judged by using a CGMS, the same effects as the case of using EMI are attained although the recording and reproducing apparatus of the invention requires a transport decoder in order to detect a CGMS and hence the apparatus has a complicated configuration. In the case of a CGMS, it is requested that an AV data which has been copied once while being maintained to "copy one generation" is again output while being maintained to "copy one generation" to be once reproduced.

In the present invention, an invalid data is not restricted to a blue back screen or a black screen in the embodiments, and may be any data except an AV data which is to be reproduced, such as a test pattern, a white screen, or a screen containing a message indicating that viewing or listening is not allowed.

The time-variant key producing means in the present invention is not restricted to the means for producing a key for each block as in the embodiment, and may be any means for producing a time-variant key, such as means for producing a key for every two blocks or for every four blocks.

The hard disk apparatus of the embodiment is an example of the recording and reproducing apparatus of the invention, also the VCR of the embodiment is an example of the recording and reproducing apparatus of the invention, the reproduction information managing means, the EMI accessing means, and the data block accessing means in the embodiment are examples of the recording means in the present invention, and the EMI accessing means, the reproduction information managing means, the data block accessing means, and the changeover switches in the embodiment are examples of the reproducing means in the present invention.

The recording and reproducing apparatus of the invention is not restricted to the hard disk apparatus and the VCR of the embodiment, and may be any apparatus which can perform recording and reproduction, such as an optical disk apparatus, or a DVD-RAM apparatus.

The LBA accessing means which has been described in the ninth to fourteenth embodiments may be accessing means by means of a head, a cylinder, and a sector, in the case of a hard disk apparatus, or accessing means by means of a minute, a second, and a frame (one frame equals to $\frac{1}{75}$ sec.) in the case of an optical disk apparatus. In summary, the means may be any means which can physically access a disk medium.

The ninth to fourteenth embodiments may be implemented so that, in place of outputting an invalid data to a counter apparatus to which an AV data of reproduction information indicative of already-reproduction is to be output, authentication is made fail or a key for decoding the AV data is not transferred.

Also a program recording medium which is characterized in that the medium stores a program for causing a computer to execute the whole or a part of the functions of the recording and reproducing apparatus of the invention belongs to the invention.

Embodiment 15

Hereinafter, a fifteenth embodiment will be described.

First, concepts of a caching apparatus, a noncaching apparatus, and a transmitting apparatus will be described with reference to FIGS. 54 and 55. These concepts are commonly used in sixteenth to twenty-first embodiments which will be described later.

Figure 55:
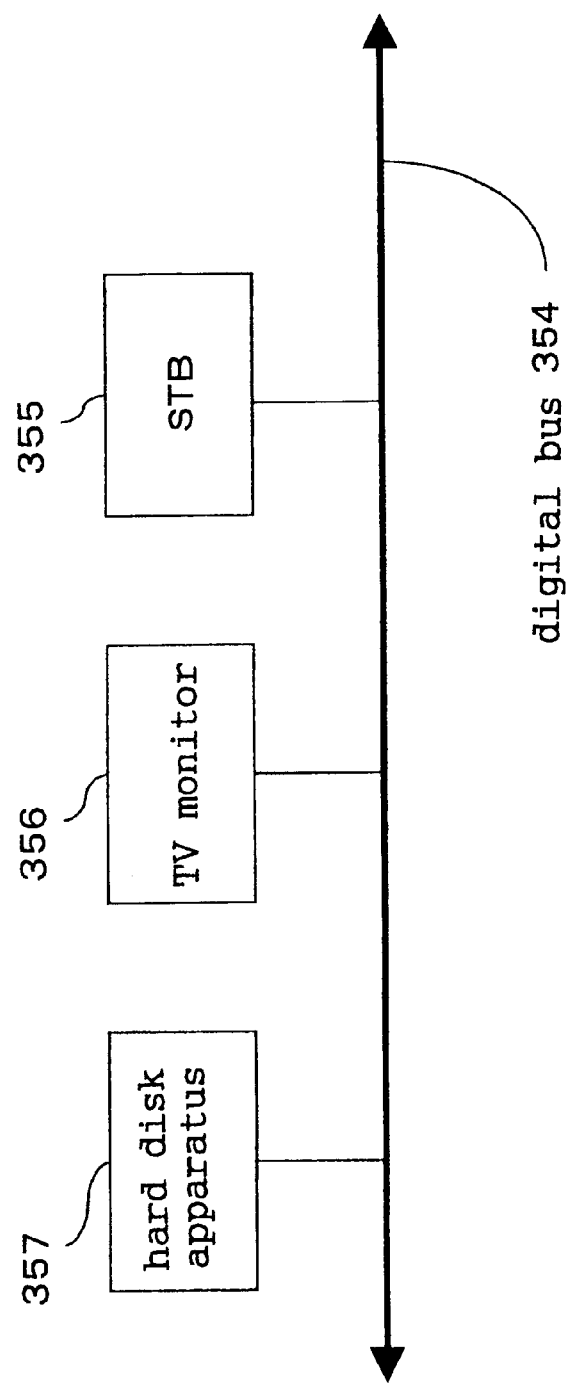
FIG. 55 is a block diagram showing connection of each apparatus to the digital bus in the fifteenth embodiment of the invention.

Referring to FIG. 55, a digital bus 354 is, for example, an IEEE standard for High performance Serial Bus which is described in IEEE 1394-1995 (hereinafter, referred to as IEEE 1394 bus), and is a bus through which a command and a data can be exchanged between apparatuses, such as an IEEE 1394 bus. An STB 355, a TV monitor 356, a hard disk apparatus 357, and the like are connected to the digital bus 354. The STB 355 receives a data sent from a broadcasting station, and transmits the data to the digital bus 354. The TV monitor 356 monitors the data sent to the digital bus 354. The hard disk apparatus 357 records the data sent to the digital bus 354, reproduces a recorded data, and transmits the reproduced data to the digital bus 354. In the embodiment, first, such various apparatuses are classified as a caching apparatus, a noncaching apparatus, and a transmitting apparatus.

Figure 54:
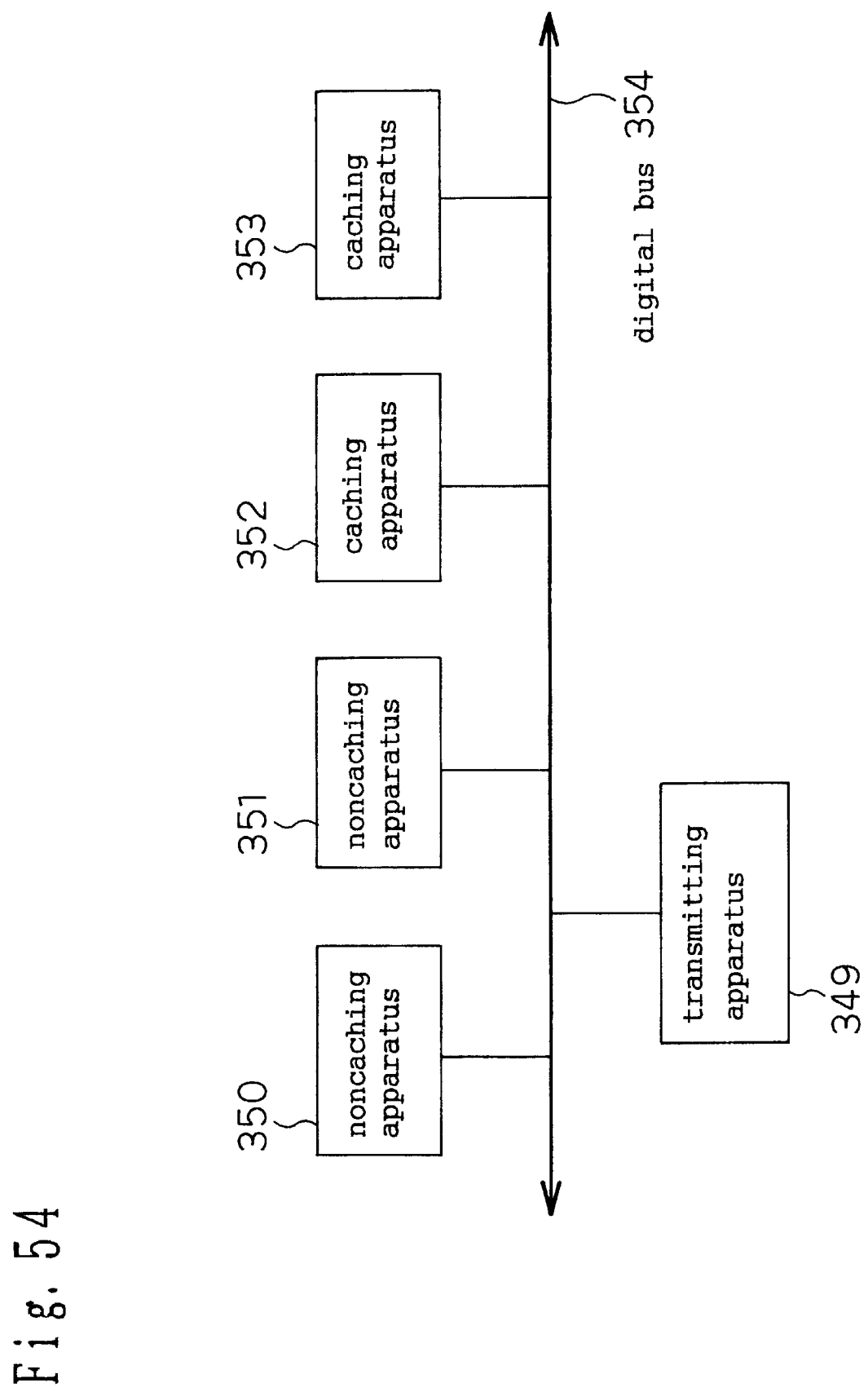
FIG. 54 is a view showing a state where a caching apparatus and a noncaching apparatus are connected to a digital bus in the fifteenth embodiment of the invention.

Referring to FIG. 54, the digital bus 354 is an IEEE 1394 bus, can exchange commands and data, and is connected to various apparatuses. Noncaching apparatuses 350 and 351, caching apparatuses 352 and 353, a transmitting apparatus 349, and the like are connected to the digital bus 354.

The noncaching apparatus 350 or 351 performs a normal process in accordance with the contents of the copyright of a data, such as the television monitor 356, or namely processes a data in accordance with the value of EMI which is contained in the copyright of the data. In the case of the television monitor 356, a data is monitored in any of the cases of EMI of "copy never," "copy one generation," and "no more copy." In the case where the noncaching apparatus 350 or 351 is an apparatus which performs recording and reproduction, such as a hard disk apparatus or a VCR, a data is not recorded when EMI is "copy never" or "no more copy." When EMI is "copy one generation," the data is recorded, and, in reproduction, output while changing EMI from "copy one generation" to "no more copy." In the case where a data sent from a broadcasting station is "copy never," the noncaching apparatus 352 or 353 does not record the data even when it is an apparatus for performing recording and reproduction, and therefore the program can be viewed or listened only during a time zone when the program is broadcast. As described above, the noncaching apparatus 350 or 351 is an apparatus which processes a data in accordance with the contents of the copyright of the data, and can be roughly classified into an apparatus which monitors a data, and an apparatus which performs recording and reproduction depending on the contents of a copyright.

The caching apparatus 352 or 353 is an apparatus which can record a data of EMI of "copy never" or "no more copy," reproduces only once the data, and does not reproduce the data two or more times. According to this configuration, a data can be viewed or listened in an arbitrary time zone when the user wishes to view or listen the data, while protecting the intention of the author. The apparatus can record also a data of EMI of "copy one generation," can reproduce only once the data, and, in reproduction, outputs the data while maintaining EMI to "copy one generation." According to this configuration, a data can be temporarily held until the user records the data into the noncaching apparatus 350 or 351 while protecting the intention of the author. Therefore, the user can sufficiently study an apparatus which records a data and then record the data into the noncaching apparatus 352 or 353 in a time zone convenient for the user.

The transmitting apparatus 349 is an apparatus which, unlike the STB 355 of FIG. 55, does not receive a data from the digital bus 354, but acquires a data from another place such as a broadcasting station, and transmits the data to the digital bus 354.

In the above, the contents of a copyright have been described on the basis of EMI. In the case where a caching apparatus or a noncaching apparatus has a transport stream decoder, a data is processed by a CGMS in accordance with the contents of a copyright. In the case where EMI or a CGMS is "copy free," the data is not copyrighted, and no restriction is therefore imposed on processing of the data.

A caching apparatus, a noncaching apparatus, and a transmitting apparatus have the above-described concepts.

In a situation in which the caching apparatus 350 or 351 is connected to the digital bus 354, it is impossible to protect the contents of the copyright of a copyrighted data. Hereinafter, therefore, it will be described that the embodiment can protect the contents of the copyright of a data even in a situation in which the caching apparatus 350 or 351 is connected.

First, (1) the case where the caching apparatus 352 transmits a copyrighted data to the digital bus 354 will be described, (2) the case where the transmitting apparatus 349 transmits a copyrighted data to the digital bus 354 will be then described, and (3) the case where the noncaching apparatus 350 transmits a copyrighted data to the digital bus 354 will be finally described.

(1) Description of the case where the caching apparatus 52[sic:352] transmits a copyrighted data to the digital bus 354.

When the caching apparatus 352 reproduces only once a copyrighted data, the data is transmitted to the digital bus 354. When the other caching apparatus 352 and the noncaching apparatus 350 or 351 simultaneously use the data, the contents of the copyright cannot be protected. In order to enable the contents of a copyright to be protected, therefore, the following rules are set.

Namely, the caching apparatus 352 selects an apparatus which receives a copyrighted data from the digital bus 354 and uses the data in accordance with the contents of the copyright.

The selection is performed in the following manner. In the case where a caching apparatus other than the caching apparatus 352 is connected to the digital bus 354, only one of the caching apparatuses is allowed to use the data in accordance with the contents of the copyright, and the other caching apparatus and noncaching apparatuses are not allowed to use the data. Alternatively, all noncaching apparatuses are allowed to use the data in accordance with the contents of the copyright, and the caching apparatuses are not allowed to use the data.

In the case where a caching apparatus other than the caching apparatus 352 is not connected to the digital bus 354, all apparatuses connected to the digital bus 354 are allowed to use the data in accordance with the contents of the copyright.

In the case where the caching apparatus 352 is an apparatus which can simultaneously perform both recording and reproduction, when one caching apparatus other than the caching apparatus 352 uses and records a copyrighted data which is output by the caching apparatus 352 itself, the caching apparatus 352 is not allowed to record the data which is output by itself. Namely, only one of apparatuses including the caching apparatus 352 which outputs a data is allowed to record the data. The caching apparatus which is allowed to use the data records the data, and reproduces only once the data. If the caching apparatus is the caching apparatus 353, the operation in which the caching apparatus 353 again reproduces only once the data is identical with that in which the caching apparatus 352 reproduces the data.

(2) Description of the case where the transmitting apparatus 349 transmits a copyrighted data to the digital bus 354.

The transmitting apparatus 349 transmits a copyrighted data to the digital bus 354. When the caching apparatuses 352 and 353 and the noncaching apparatuses 350 and 351 simultaneously use the data, the contents of the copyright cannot be protected. In order to enable the contents of a copyright to be protected, therefore, the following rules are set.

Namely, the transmitting apparatus 352 selects an apparatus which receives a copyrighted data from the digital bus 354 and uses the data in accordance with the contents of the copyright.

The selection is performed in the following manner. In the case where one or more caching apparatuses such as the caching apparatus 352 or 352[sic:353] are connected to the digital bus 354, only one of the caching apparatuses is allowed to use the data in accordance with the contents of the copyright, and the other caching apparatus and noncaching apparatuses are not allowed to use the data. Alternatively, all noncaching apparatuses are allowed to use the data in accordance with the contents of the copyright, and the caching apparatuses are not allowed to use the data.

In the case where a caching apparatus such as the caching apparatuses 352 and 353 is not connected to the digital bus 354, all apparatuses connected to the digital bus 354 are allowed to use the data in accordance with the contents of the copyright.

In the case where the transmitting apparatus 349 is an apparatus which receives a stream from the IEEE 1394 bus while performing transmission and which can perform also a monitor output of the received stream, when one caching apparatus other than the transmitting apparatus 349 uses and records a copyrighted data which is output by the transmitting apparatus 349 itself, the transmitting apparatus 349 is not allowed to receive the data which is output by itself. Namely, in the case where the transmitting apparatus has a function of a noncaching apparatus, the process is performed while deeming the function portion as one caching apparatus.

In the case where the transmitting apparatus 349 has a function of transmitting a data to the digital bus 354 and simultaneously monitor-outputting the data, when one caching apparatus uses and records the copyrighted data which is output by the transmitting apparatus 349, the monitor output is invalidated.

The caching apparatus which is allowed to use the data records the data, and reproduces only once the data. If the caching apparatus is the caching apparatus 352, the operation in which the caching apparatus 352 again reproduces only once the data is identical with that in "(1) Description of the case where the caching apparatus 352 transmits a copyrighted data to the digital bus 354."

(3) Description of the case where the noncaching apparatus 350 transmits a copyrighted data to the digital bus 354.

The noncaching apparatus 350 transmits a copyrighted data to the digital bus 354. When the caching apparatuses 352 and 353 and the noncaching apparatuses 50[sic:350] and 351 simultaneously use the data, the contents of the copyright cannot be protected. In order to enable the contents of a copyright to be protected, therefore, the following rules are set.

A configuration that can select an apparatus which receives a copyrighted data from the digital bus 354 and uses the data in accordance with the contents of the copyright is previously produced. This can be performed in one of the following two methods.

In the first method, authentication or a key which is different from that in the caching apparatuses 352 and 353 and the noncaching apparatuses 350 and 351 is supported. Namely, the authentication method is previously determined so that, in the case where an apparatus which issues an authentication request in order to receive a data from the noncaching apparatus 350 and performs authentication is the noncaching apparatus 351, the authentication succeeds. The authentication method is previously determined so that, in the case where an apparatus which issues an authentication request in order to receive a data from the noncaching apparatus 350 and performs authentication is the caching apparatus 352 or 353, the authentication fails. However, authentication in transmission from a caching apparatus to a noncaching apparatus must be performed as described in "(1) the case where the caching apparatus transmits a copyrighted data to the digital bus 354." Therefore, the authentication method is previously determined so that the authentication in this case succeeds. When the authentication method is determined as described above, an apparatus which, in the case where a copyrighted data is transmitted from the noncaching apparatus 350 to the digital bus 354, can use the data in accordance with the contents of the copyright is restricted to the noncaching apparatus 350 or 351. Therefore, the contents of the copyright can be protected. If the noncaching apparatus which receives the data is an apparatus which can perform recording and reproduction, it operates in the same manner as the noncaching apparatus 350 with starting from the beginning of this description or "(3) the case where the noncaching apparatus 350 transmits a copyrighted data to the digital bus 354."

In the second method, in the case where a copyrighted data is sent from the noncaching apparatus 350, the caching apparatus 352 or 353 switches the mode so as to operate in the same manner as a noncaching apparatus. In a mode switching method, a caching apparatus is set so as not to enter the mode in which it operates as a caching apparatus, unless it is authenticated as a caching apparatus. In the case where a data of EMI of "copy never" is sent from the noncaching apparatus 350, for example, identification as a noncaching apparatus is performed because the noncaching apparatus 350 fails to support the function of authenticating the caching apparatus 352 or 353 as a caching apparatus. Therefore, the caching apparatus 352 or 353 operates in a mode as a noncaching apparatus. Consequently, the caching apparatus 352 or 353 does not record the data. According to this configuration, also in the case where a data is sent from the noncaching apparatus 350, it is possible to protect a copyright. In the case of such a caching apparatus, when a data of "copy one generation" which is recorded in a noncache mode is to be transmitted in a cache mode, however, the data is set to "no more copy" because of the following reason. The case where a data of "copy one generation" which is recorded in a noncache mode is transmitted in a cache mode while maintaining it to "copy one generation" will be considered. For example, there are an n number of caching apparatuses in front of one noncaching apparatus, and an m number of caching apparatuses are connected to each of the caching apparatuses. When the n number of caching apparatuses record an n number of data of "copy one generation" which operate in a noncache mode and thereafter the n×m number of caching apparatuses enter the cache mode while maintaining "copy one generation" in the cache mode, there exist an n×m number of data of "copy one generation," with the result that the number of copies can be successively increased. A caching apparatus which receives a data operates as a noncaching apparatus, and therefore operates in the same manner as the description of the noncaching apparatus 350 in "(3) the case where the noncaching apparatus 350 transmits a copyrighted data to the digital bus 354."

In the embodiment, concepts of a caching apparatus, a noncaching apparatus, and a transmitting apparatus have been described. It has been shown that, even in the case where a caching apparatus is connected to a digital bus, it is possible to protect the copyright of a copyrighted data.

Embodiment 16

Next, a sixteenth embodiment will be described with reference to FIG. 49.

As described in the fifteenth embodiment, a caching apparatus selects, from apparatuses which receive a data, an apparatus which uses the data in accordance with the contents of the copyright. In the embodiment, a specific example in the case where an apparatus which outputs a data selects an apparatus which uses the data will be described.

Figure 49:
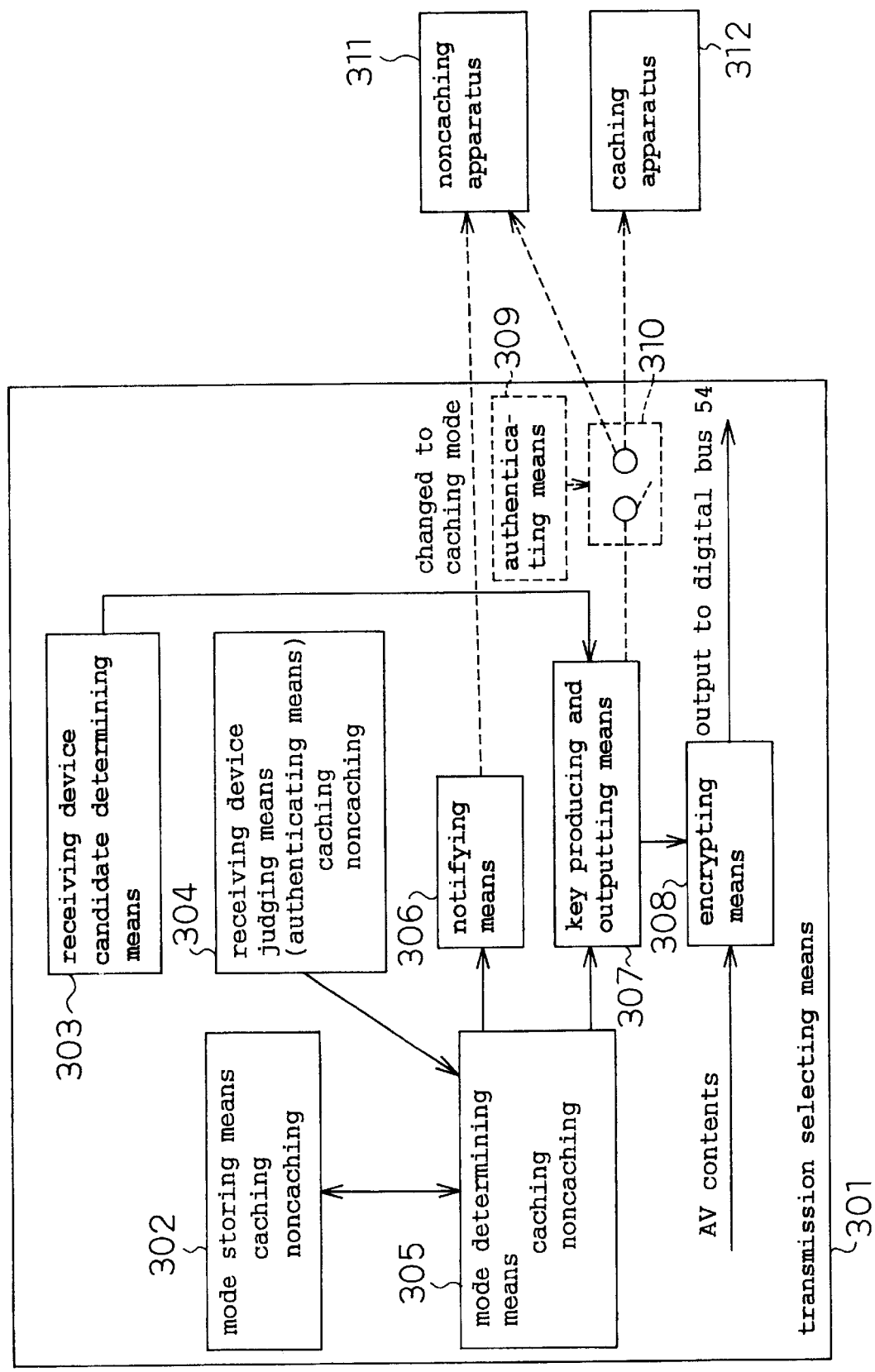
FIG. 49 is a block diagram showing the configuration of transmission selecting means in a sixteenth embodiment of the invention.

FIG. 49 is a block diagram of transmission selecting means 301 that is incorporated into a caching apparatus and a transmitting apparatus, and that selects an apparatus which uses a data. The transmission selecting means 301 is configured as described below.

Mode storing means 302 is means for storing as a mode whether a data is enabled to be used by a caching apparatus (hereinafter, referred to as cache mode) or by a noncaching apparatus (hereinafter, referred to as noncache mode) in accordance with the contents of the copyright. Receiving device candidate determining means 303 is means for detecting an apparatus in which a transmission request or an authentication request is produced in order to use a data, or, when a noncaching apparatus is not in a receiving state, an appropriate caching apparatus, and for determining a candidate for an apparatus which uses a data. Receiving device judging means 304 is means for performing authentication to judge an apparatus which wishes to use a data, as a caching apparatus or a noncaching apparatus. Mode determining means 305 is means for determining a mode as the cache mode or the noncache mode in accordance with the kind of an apparatus which uses a data. Notifying means is means for notifying the current mode, i.e., the cache mode or the noncache mode to a noncaching apparatus 311 and a caching apparatus 312. Key producing and outputting means 307 is means for, in the case of the cache mode, producing a key for enabling a specific one of caching apparatuses to decode a data which was encrypted for transmission, and transferring the key to the specific one, and for, in the case of the noncache mode, producing a key for enabling all of noncaching apparatuses to decode a data which was encrypted for transmission, and transferring the key to the all ones. Encrypting means 308 is means for encrypting a copyrighted data by using the key produced by the key producing and outputting means 307, and for outputting the encrypted data to the digital bus 354. Authenticating means 309 is means for performing authentication when a key for decoding the data encrypted by the encrypting means 308 is to be transferred to a caching apparatus or a noncaching apparatus. A changeover switch 310 is a switch which switches over an apparatus for performing authentication between a caching apparatus and a noncaching apparatus.

As an apparatus which uses the data from the transmission selecting means 301, the noncaching apparatus 311 and the caching apparatus 312 are connected to the digital bus 354.

Next, the operation of the embodiment will be described.

In advance to transmission of a copyrighted data from the transmission selecting means 301 to the digital bus 354, the receiving device candidate determining means 303 determines a candidate for a receiving apparatus. When a transmission request or an authentication request is issued by the noncaching apparatus 311 or the caching apparatus 312, an apparatus which issues the transmission request or the authentication request is set as a candidate for a receiving apparatus. When no noncaching apparatus issues a transmission request or an authentication request, the receiving device candidate determining means 303 detects a caching apparatus from apparatuses connected to the digital bus 354, and sends a command instructing the caching apparatus to issue an authentication request. In the case where no caching apparatus is connected, one of noncaching apparatuses may be selected, and a command instructing the selected noncaching apparatus to issue an authentication request may be sent. In this way, the receiving device candidate determining means 303 determines a candidate for a receiving apparatus. In order to detect a caching apparatus, for example, a command inquiring whether it is a caching apparatus or not is issued.

The receiving device judging means 304 judges the kind of a receiving apparatus from candidates which are determined by the receiving device candidate determining means 303. The judgement is performed in the following manner. Authentication as to whether a candidate for a receiving apparatus is a caching apparatus or not is performed. If a candidate receiving apparatus succeeds in authentication with respect to the receiving device judging means 304, the receiving apparatus is judged as a caching apparatus. If authentication fails, the receiving apparatus is judged as a noncaching apparatus.

Next, the mode determining means 305 determines one of the cache mode and the noncache mode, on the basis of the kind of the receiving apparatus candidate which is judged by the receiving device judging means 304. When the mode is determined, the determined mode is stored into the mode storing means 302. When the mode determining means 305 determines the cache mode, for example, the mode storing means 302 stores the cache mode as the current mode. The notifying means 306 notifies the receiving apparatus candidate determined by the receiving device candidate determining means 303, of the mode determined by the mode determining means 305. When the cache mode is determined, for example, the situation that the mode is the cache mode is notified to all receiving apparatus candidates. The copyrighted data is encrypted by the encrypting means 308, and then output to the digital bus 354. The mode determining means 305 determines one of the receiving apparatus candidates to which the key for decoding the encrypted data is to be sent.

The judgement criterion by which the mode determining means 305 determines one of the receiving apparatus candidates as an actual receiving apparatus may be decided according to one of the following judgement criteria.

As a first judgement criterion, a receiving apparatus which first issued a transmission request to the transmission selecting means 301 is judged as an actual receiving apparatus. As a second judgement criterion, the user previously assigns priority to receiving apparatuses, and a receiving apparatus of higher priority is judged as an actual receiving apparatus. As a third judgement criterion, a receiving apparatus which lastly issued a transmission request to the transmission selecting means 301 is judged as an actual receiving apparatus. As a fourth judgement criterion, among receiving apparatus candidates, a caching apparatus is judged as an actual receiving apparatus, in preference to a noncaching apparatus. As a fifth judgement criterion, among receiving apparatus candidates, a noncaching apparatus is judged as an actual receiving apparatus, in preference to a caching apparatus. As a sixth judgement criterion, an actual receiving apparatus is judged on the basis of the ability of an apparatus such as the recording time and the number of simultaneous recording channels. For example, an apparatus having a longer recording time and a larger number of channels which can be simultaneously recorded is judged as an actual receiving apparatus. As a seventh judgement criterion, an actual receiving apparatus is judged on the basis of the usage frequency of an apparatus. For example, an apparatus which is most frequently used is judged as an actual receiving apparatus. Alternatively, an apparatus which is most infrequently used is judged as an actual receiving apparatus.

In the above, the judgement criterion for determining one of the receiving apparatus candidates as an actual receiving apparatus by the mode determining means 305 has been described.

Next, in order to transfer the key, the authenticating means 309 performs authentication with respect to a receiving apparatus candidate to which the key is to be transferred. In the case where it has been determined that the key is to be transferred to the noncaching apparatus 311, for example, the means performs authentication with respect to the noncaching apparatus 311. If the authentication succeeds, the key producing and outputting means 307 produces the key for decoding the encrypted data, and sends the key to all noncaching apparatuses such as the noncaching apparatus 311. In the case where the candidate to which the key is to be transferred is a caching apparatus, the key is sent to only one caching apparatus among caching apparatus serving as candidates. The key is a temporary key which is used by the authenticating means 309 in authentication with respect to a receiving apparatus. The key is previously encrypted, and then transferred to one caching apparatus such as the caching apparatus 312. In the caching apparatus 312, a key for decoding a data is decoded by the temporary key, and then used.

When a caching apparatus receives the key for decoding a data, the data sent from the digital bus 354 and the key are recorded.

In the embodiment, a key for decoding an encrypted data is transferred to an apparatus which is selected by the transmission selecting means 301, thereby determining an apparatus which can use a copyrighted data. The manner of selecting an apparatus is identical with that which has been described in the 315$^{th}$[sic:15$^{th}$] embodiment.

Embodiment 17

Next, a seventeenth embodiment will be described with reference to FIG. 50.

As described in the fifteenth embodiment, a caching apparatus selects, from apparatuses which receive a data, an apparatus which uses the data in accordance with the contents of the copyright. Also in the embodiment, a specific example in the case where an apparatus which outputs a data selects an apparatus which uses the data will be described.

Figure 50:
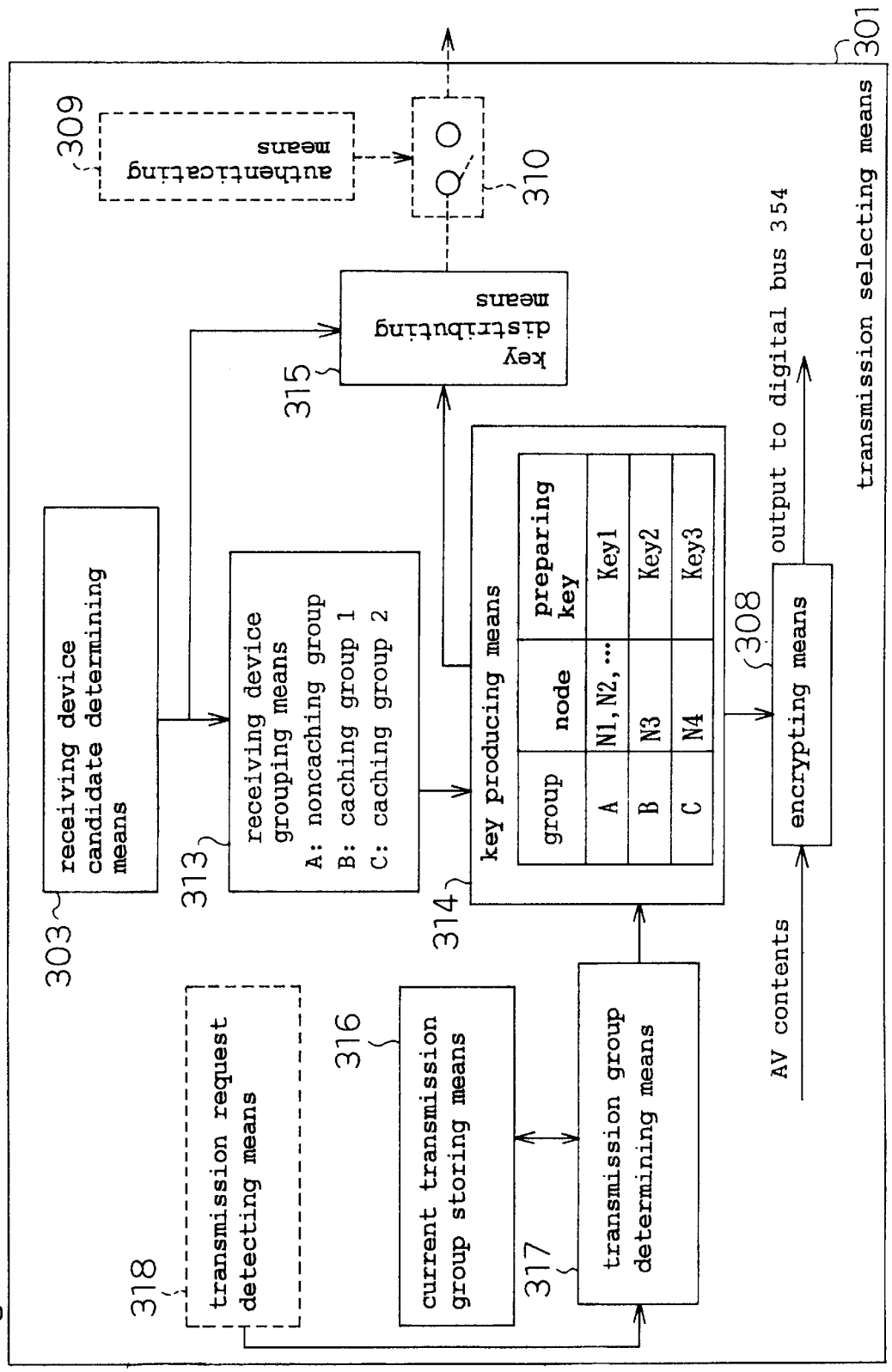
FIG. 50 is a block diagram showing the configuration of transmission selecting means in a seventeenth embodiment of the invention.

FIG. 50 is a block diagram of transmission selecting means 301 that is incorporated into a caching apparatus and a transmitting apparatus, and that selects an apparatus which uses a data. The transmission selecting means 301 is configured as described below.

Receiving device candidate determining means 303 is means for detecting an apparatus in which a transmission request or an authentication request is produced in order to use a data, or, when a noncaching apparatus is not in a receiving state, an appropriate caching apparatus, and for determining a candidate for an apparatus which uses a data. In order to detect a caching apparatus, for example, a command inquiring whether it is a caching apparatus or not is issued. Receiving device grouping means 313 is means for performing authentication with respect to receiving apparatus candidates, thereby grouping the candidates. Key producing means 314 is means for producing a key for decoding an encrypted data, for each of groups of receiving apparatus which have been grouped by the receiving device grouping means 313. Different keys are produced for different groups. Transmission request detecting means 318 is means for detecting a group which issues a transmission request. Transmission group determining means 317 is means for, from the group which is detected as a group issuing a transmission request by the transmission request detecting means 318, and the current transmission group, determining a group a key of which is to be used for encrypting a copyrighted key. Current transmission group storing means 316 is means for storing the determined group. Key distributing means 315 is means for distributing the key produced by the key producing means 314, to apparatuses of the groups. Authenticating means 309 is means for, when the key produced by the key producing means 314 is to be distributed, performing authentication with respect to an apparatus which issued a request for receiving a key, for encrypting a key for decoding a data by using a temporary key which is produced at this time, and for distributing the encrypted key. A changeover switch 310 switches over an apparatus which is to be subjected to authentication.

Next, the operation of the embodiment will be described.

In advance to transmission of a copyrighted data from the transmission selecting means 301 to the digital bus 354, the receiving device candidate determining means 303 determines a candidate for a receiving apparatus. When a transmission request or an authentication request is issued by a noncaching apparatus, a caching apparatus, or the like, an apparatus which issues the transmission request or the authentication request is set as a candidate for a receiving apparatus. When no noncaching apparatus issues a transmission request or an authentication request, the receiving device candidate determining means 303 detects a caching apparatus from apparatuses connected to the digital bus 354, and sends a command instructing the caching apparatus to issue an authentication request. In the case where no caching apparatus is connected, one of noncaching apparatuses may be selected, and a command instructing the selected noncaching apparatus to issue an authentication request may be sent. In this way, the receiving device candidate determining means 303 determines a candidate for a receiving device.

The receiving device grouping means 313 judges the kind of a receiving apparatus from the candidates determined by the receiving device candidate determining means 303, and performs grouping. The grouping is performed in the following manner. Authentication as to whether a candidate for a receiving apparatus is a caching apparatus or not is performed. When a candidate receiving apparatus succeeds in authentication with respect to the receiving device grouping means 313, the receiving apparatus is judged as a caching apparatus. If authentication fails, the receiving apparatus is judged as a noncaching apparatus. Furthermore, caching apparatuses distributed into different groups. All noncaching apparatuses are bundled into one group. At present, in the receiving device grouping means 313, apparatuses are divided into three kinds of groups, or groups A, B, and C. All apparatuses of the noncaching group are registered in A. One apparatus of the caching group is registered in B. Another apparatus of the caching group is registered in C.

The key producing means 314 produces a key for decoding a data, for each of the groups which have been grouped by the receiving device grouping means 313. The keys respectively for the groups are different from one another. Namely, a data which was encrypted by using the key for group A cannot be decoded by using the key for group B.

The authenticating means 309 performs authentication with respect to an apparatus belonging to each group, and, if the authentication succeeds, encrypts a key determined for each group by using a temporary key which is used in authentication. The key distributing means 315 distributes the key to apparatuses of the group. As described above, in advance to output of a data to the digital bus, apparatuses serving as candidates for a receiving device are grouped, and different keys are distributed for each of the groups, whereby an apparatus which receives the data can be selected.

The transmission request detecting means 318 detects a group which issues a transmission request. Based on the detection, the transmission group determining means 317 determines a group a key of which is to be used for encrypting and transmitting the data. The encrypting means 308 encrypts the data by using the key of the determined group, and outputs the encrypted data to the digital bus 354. As described above, the keys respectively for the groups are different from one another. Therefore, the data of only the determined group can be decoded.

In this way, selection of an apparatus such as that which has been described in the sixteenth embodiment is enabled.

Finally, the judgement criterion by which the transmission group determining means 317 determines a group a key of which is to be used for encrypting and transmitting a data will be described.

As a first judgement criterion, a receiving apparatus which first issued a transmission request to the transmission selecting means 301 is judged as an actual receiving apparatus. As a second judgement criterion, the user previously assigns priority to receiving apparatuses, and a receiving apparatus of higher priority is judged as an actual receiving apparatus. As a third judgement criterion, a receiving apparatus which lastly issued a transmission request to the transmission selecting means 301 is judged as an actual receiving apparatus. As a fourth judgement criterion, among receiving apparatus candidates, a caching apparatus is judged as an actual receiving apparatus, in preference to a noncaching apparatus. As a fifth judgement criterion, among receiving apparatus candidates, a noncaching apparatus is judged as an actual receiving apparatus, in preference to a caching apparatus. As a sixth judgement criterion, an actual receiving apparatus is judged on the basis of the ability of an apparatus such as the recording time and the number of simultaneous recording channels. For example, an apparatus having a longer recording time and a larger number of channels which can be simultaneously recorded is judged as an actual receiving apparatus. As a seventh judgement criterion, an actual receiving apparatus is judged on the basis of the usage frequency of an apparatus. For example, an apparatus which is most frequently used is judged as an actual receiving apparatus. Alternatively, an apparatus which is most infrequently used is judged as an actual receiving apparatus.

In the above, the judgement criterion by which the transmission group determining means 317 determines a group a key of which is to be used for encrypting and transmitting a data has been described.

In the embodiment, a counter apparatus which uses a data is selected by transferring a key for decoding the data. In addition to this, availability or nonavailability of a data may be previously notified to a counter apparatus serving as a candidate for using the data. According to this configuration, the counter apparatus knows availability or nonavailability of the data, and hence is not required to perform a process of decoding the sent data. As a result, a load on each apparatus can be reduced.

Embodiment 18

Next, an eighteenth embodiment will be described with reference to the drawings.

In the embodiment, an STB will be described as an example of an actual apparatus into which the transmission selecting means 301 described in the sixteenth or seventeenth embodiment is incorporated. The STB functions as a transmitting apparatus.

Figure 51:
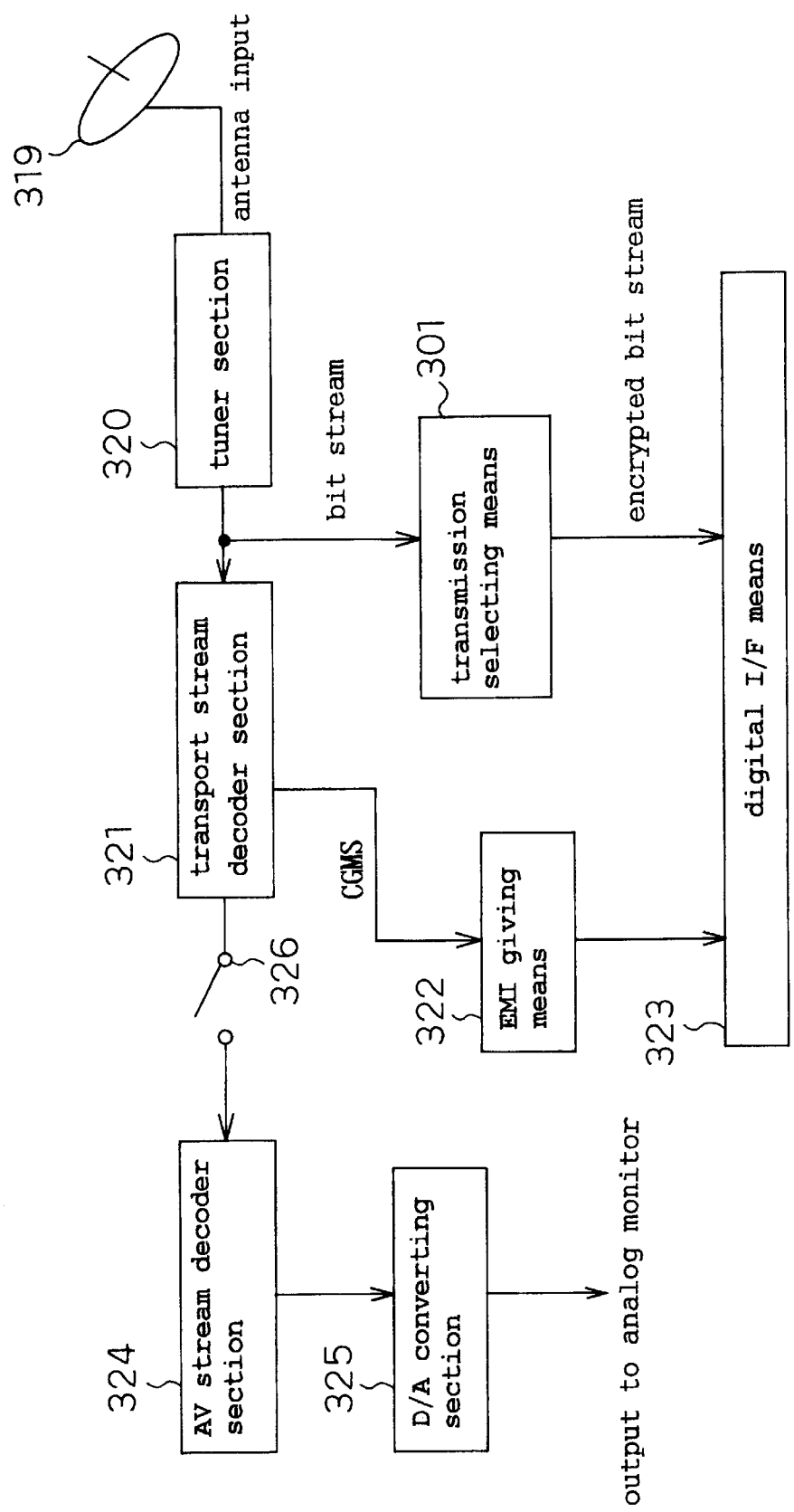
FIG. 51 is a block diagram showing the configuration of an STB serving as a transmitting apparatus in eighteenth and twenty-first embodiments of the invention.

Referring to FIG. 51, an antenna 319 is means for receiving a broadcast wave transmitted from a broadcasting station. A tuner section 320 is means for selecting a program in the broadcast wave, and for outputting a transport stream. A transport stream decoder section 321 is means for decoding the transport stream, and for detecting a CGMS. EMI giving means 322 is means for producing EMI from the detected CGMS, and for giving EMI. Digital I/F means 323 is means for exchange data and commands with the digital bus 354. Transmission selecting means 301 is used for selecting a caching apparatus or a noncaching apparatus to which a copyrighted data is to be sent, and is identical with that described in the sixteenth or seventeenth embodiment.

Next, the operation of the embodiment will be described.

A CGMS is embedded into a broadcast wave transmitted from a broadcasting station. The tuner section 320 which receives the broadcast wave selects a program. The selected program is transferred as a bit stream to the transmission selecting means 301. At the same time, the program is transferred also to the transport stream decoder section 321 to be decoded. During the decoding, the CGMS is detected, and the EMI giving means 322 produces EMI from the CGMS. The transmission selecting means 301 performs a process which is identical with that described in the sixteenth or seventeenth embodiment, and, in the case of a copyrighted data, selects an apparatus in the transmission destination which can use the data, in accordance with the contents of the copyright. The copyrighted data is encrypted, and then output to the digital I/F means 323. At this time, the EMI produced by the EMI giving means 322 is given.

As described above, the transmission selecting means 301 is incorporated into the STB, and the transmitting apparatus sends a data to a caching apparatus while observing the contents of a copyright. Therefore, in the case where EMI is "copy never," a program can be viewed or listened in an arbitrary time zone other than the broadcast time zone, or, in the case of "copy one generation," a data can be moved at an arbitrary time.

Embodiment 19

Figure 52:
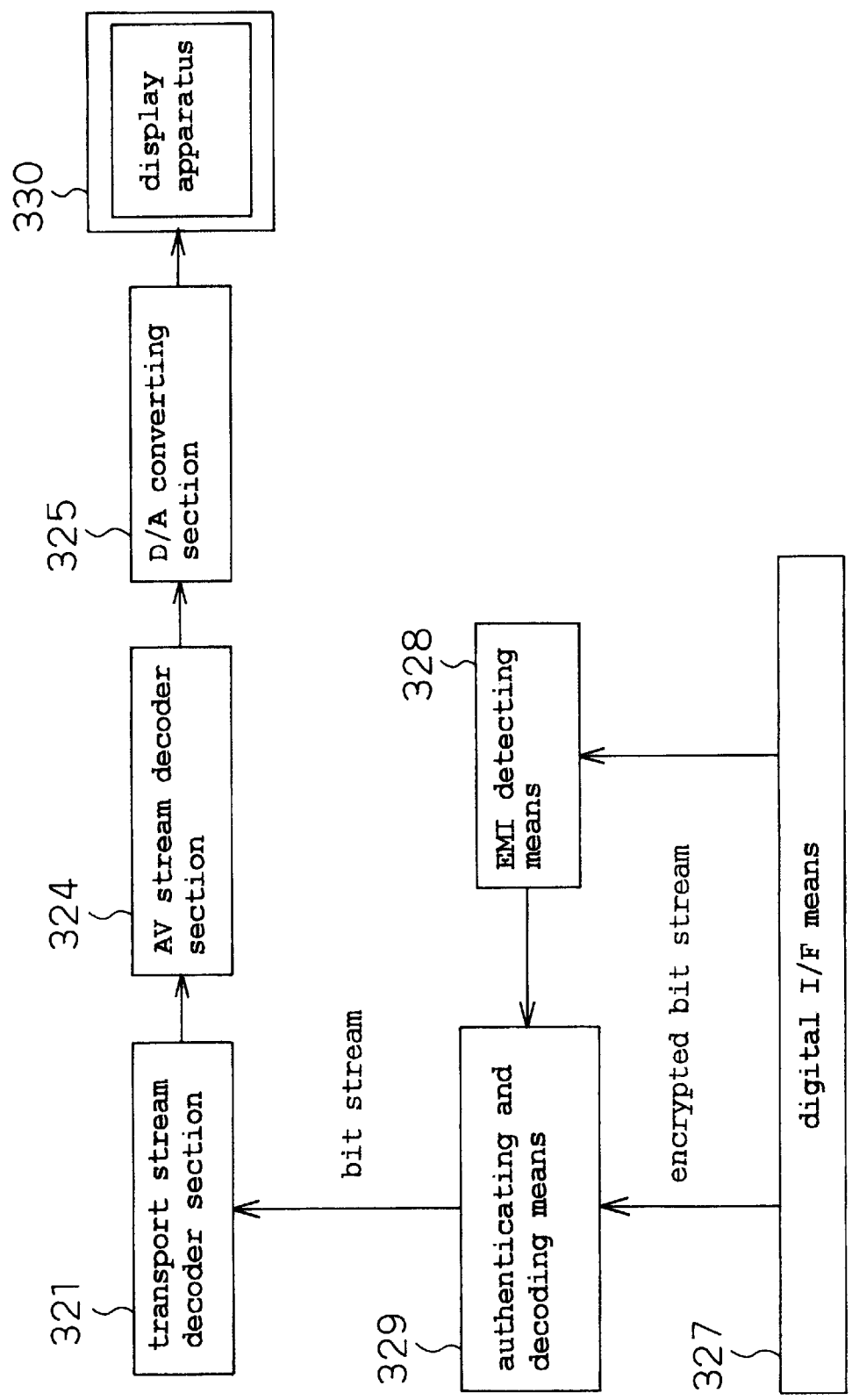
FIG. 52 is a block diagram showing the configuration of a TV monitor serving as a noncaching apparatus in a nineteenth embodiment of the invention.

Next, a nineteenth embodiment will be described with reference to FIG. 52.

In the embodiment, a TV monitor will be described as an example of a noncaching apparatus.

Digital I/F means 327 is means for receiving a data from the digital bus 354, and for exchanging commands. EMI detecting means 328 is means for detecting EMI from a data sent from the digital I/F means 327. Authenticating and decoding means 329 is means for, when a copyrighted data is to be received, performing authentication with respect to an apparatus which transmits the data, for, if the authentication succeeds, receiving a key for decoding an encrypted data, and for decoding the data. A transport stream decoder section 321 is means for decoding the decoded data (transport stream), and for separating multiplexed data. An AV stream decoder section 324 is means for expanding a compressed MPEG data, and for outputting the expanded data while attaining AV synchrony. It is means for separating multiplexed data. A D/A converting section 325 is means for converting the expanded AV digital data into an analog signal. A display apparatus 330 is means for displaying the analog signal on a display.

Next, the operation of the embodiment will be described.

First, the authenticating and decoding means 329 issues an authentication request for receiving a data, and performs authentication with respect to a data sending apparatus. When the authentication succeeds, a key for decoding the data is encrypted by using a key which is temporarily used in the authentication, and then transferred. At the same time, the EMI detecting means 328 detects EMI. In accordance with the value of EMI, the authenticating and decoding means 329 judges whether the data is to be decoded by using the key for decoding the data or not. When the authenticating and decoding means 329 decodes the data, the data is transferred to the transport stream decoder section 321, and multiplexed data are separated. The AV stream decoder section 324 expands an MPEG data. The D/A converting section 325 converts the digital data into an analog signal. The display apparatus 330 monitors the analog signal.

The TV monitor of a conventional configuration can function as a noncaching apparatus, even in a situation in which a caching apparatus and a noncaching apparatus exist.

Embodiment 20

Next, a twentieth embodiment will be described with reference to FIGS. 1 and 53.

In the embodiment, a hard disk apparatus functioning as a caching apparatus will be described.

Figure 53:
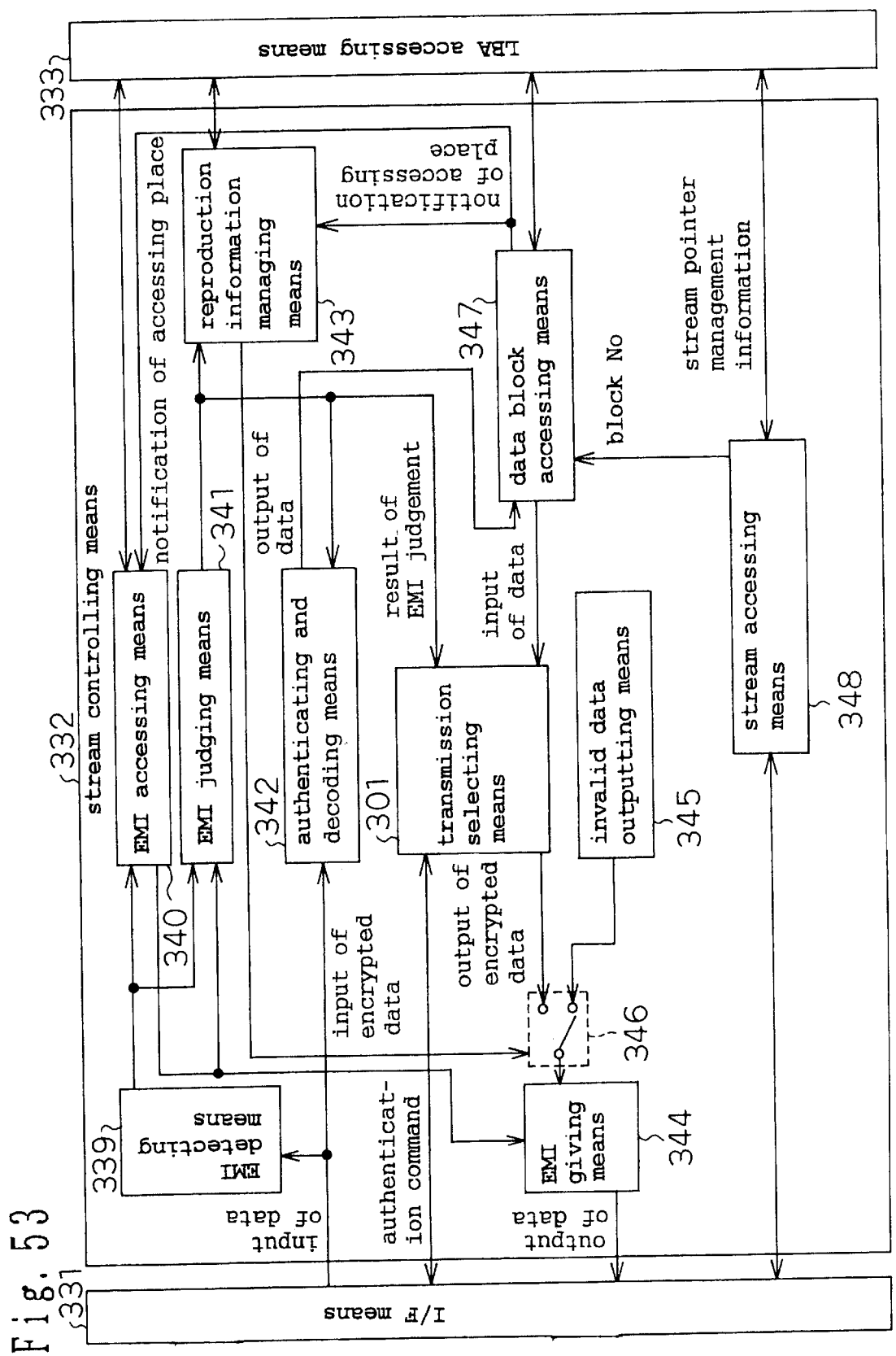
FIG. 53 is a block diagram showing the configuration of stream controlling means of a hard disk apparatus serving as a caching apparatus in the twentieth embodiment of the invention.

The stream controlling means 2 of the hard disk apparatus shown in FIG. 1 is configured as shown in FIG. 53.

Namely, the stream controlling means 2 is configured by EMI detecting means 339, EMI giving means 344, EMI accessing means 340, EMI judging means 341, authenticating and decoding means 342, invalid data outputting means 345, stream accessing means 348, reproduction information managing means 343, data block accessing means 347, a changeover switch 346, and transmission selecting means 301.

The EMI detecting means 339 is means for detecting a field in which EMI is described, from a header portion in an isochronous packet data which is input from the digital I/F means 1. The EMI giving means 344 is means for giving instructed EMI to a header portion in an isochronous packet data which is to be output to the digital I/F means 1. The EMI accessing means 340 is means for reading out detected EMI information via the LBA accessing means 3, and for recording and reproducing the detected EMI information correspondingly with a designated data block. The EMI judging means 341 is means for judging whether the data is copyrighted or not, and the kind of the copyright, from the EMI information. The authenticating and decoding means 342 is means for performing authentication among the AV apparatuses via the digital I/F means 1, and for decoding an AV data which is input from the digital I/F means 1. The data block accessing means 347 is means for recording or reproducing data of a designated block number via the LBA accessing means 3, and for notifying the number of a block which is currently accessed, to the EMI accessing means 340 and the reproduction information managing means 343. The stream accessing means 348 is means for designating the number of a block which is to be recorded or reproduced, to the data block accessing means 347 in order to execute a command in a predetermined access system which is received from the digital I/F means 1, for managing a stream pointer indicating the position of the block in which the stream currently exists, in accordance with instructions such as reproduction, recording, or stop while assuming the initial data block to the final data block of the user area of the disk medium 6 shown in FIG. 1 as one tape, and for performing recording or reading of stream pointer management information on the disk medium 6 via the LBA accessing means 3. The predetermined access system is a system conforming to, for example, AV/C Digital Interface Command Set VCR subunit Specification version 2.0.1. The changeover switch 346 is means for, in outputting of an AV data to the digital I/F means 1 via the EMI giving means 344, when a result of the reproduction information managing means 343 shows that reproduction has been performed, turning off the switch or changing the switch to the invalid data outputting means 345 to output an invalid data such as a blue back screen or a black screen, and for, when reproduction has not yet been performed, changing the switch to the authenticating and decoding means 342 to output an encrypted AV data. The reproduction information managing means 343 is means for recording and reading out reproduction information corresponding to a designated data block, and for judging from the reproduction information whether reproduction has been performed or not. The transmission selecting means 301 is identical with that described in the sixteenth or seventeenth embodiment.

Next, the operation of the embodiment will be described.

First, the recording operation of the hard disk apparatus will be described.

The case where a source apparatus sending an AV data is an STB will be described. The STB is the transmitting apparatus of the invention, and comprises the transmission selecting means 301. There is a controller which sends a record start command, a record stop command, and the like to the hard disk apparatus via an IEEE 1394 bus. The description of exchange of commands between the controller and the hard disk apparatus departs from the spirit of the embodiment. In the embodiment, therefore, the description is omitted.

First, the hard disk apparatus issues an authentication request to the STB, by means of the authenticating and decoding means 342. As a result, in the transmission selecting means 301 on the side of the STB, the hard disk apparatus becomes a receiving device candidate. Next, when the hard disk apparatus receives the record start command from the digital I/F means 1, the digital I/F means 1 confirms the number of a channel which is intended to be acquired by oneself, and fetches the corresponding isochronous packet data. The EMI detecting means 339 detects EMI information held in the header portion of the fetched isochronous packet data. The EMI judging means 341 judges whether the data is copyrighted or not, and the contents of the copyright, from the detected EMI information. It is assumed that the hard disk apparatus is recognized as a caching apparatus by the transmission selecting means 301 on the side of the STB, and finally selected as one specific caching apparatus which transmits the AV data. The authenticating and decoding means 342 receives the key sent from the STB, via the digital I/F means 1. When EMI is "copy free," however, the authenticating and decoding means 342 does not receive the key sent from the STB. In this case, the AV data itself is not encrypted. In the case where EMI is "copy never," the case where EMI is "copy one generation," and the case where EMI is "no more copy," the authenticating and decoding means 342 receives the key.

In the case where EMI of an AV data is not "copy free," the authenticating and decoding means 342 decodes the AV data via the digital I/F means 1. In the case where EMI is "copy free," the AV data is not encrypted, and hence the authenticating and decoding means 342 allows the AV data to pass therethrough. The stream accessing means 348 instructs the data block accessing means 347 to record block x. The data block accessing means 347 notifies the number (=x) of the block which is currently accessed, to the EMI accessing means 340. The EMI accessing means 340 records the EMI information detected by the EMI detecting means 339, correspondingly with the notified block number. Since the hard disk apparatus of the invention functions as a caching apparatus, in the case where EMI is "copy one generation," when the EMI information is to be recorded onto the disk medium 6, recording is performed without rewriting EMI to "no more copy." The data block accessing means 347 notifies the number (=x) of the block which is currently accessed, to the reproduction information managing means 343. During recording, the reproduction information managing means 343 stores reproduction information in the form of a table, correspondingly with the notified block number (=x). Furthermore, information that the data has not yet been reproduced is registered into reproduction information. Namely, reproduction information is updated with play_flag=0. Next, the reproduction information managing means 343 records reproduction information onto the disk medium 6 via the LBA accessing means 3. Next, the block number is incremented by one, or x=x+1 is set. Next, it is judged whether another command from the digital I/F means 1 is received or not. If another command is received, the process is ended. If not, the process which has been performed after the reception of the record command is repeatedly performed until another command is received. The case where an AV data is to be recorded onto the disk medium 6 has been described.

Next, the reproducing operation of the hard disk apparatus will be described. The case where the counter apparatus receiving an AV data is a TV monitor will be described. There is a controller which sends a reproduction start command, a reproduction stop command, and the like to the hard disk apparatus. The description of exchange of commands between the controller and the hard disk apparatus departs from the spirit of the embodiment. In the embodiment, therefore, the description is omitted.

First, the TV monitor issues an authentication request to the hard disk apparatus. As a result, in the transmission selecting means 301 of the hard disk apparatus, the TV monitor becomes a receiving device candidate. Next, by the operation of the transmission selecting means 301 which has been described in the sixteenth or seventeenth embodiment, authentication is performed with respect to the TV monitor (noncaching apparatus), and a key is transferred. Next, when the hard disk apparatus receives the reproduction start command, the stream accessing means 348 instructs the data block accessing means 347 to reproduce block x. The data block accessing means 347 notifies the number (=x) of the block which is currently accessed, to the EMI accessing means 340 and the reproduction information managing means 343. At the same time, the data block accessing means 347 reads out an AV data from the disk medium 6 via the LBA accessing means 3. The EMI accessing means 340 reads out EMI information corresponding to the notified block number, from the disk medium 6. The read out EMI information is subjected to judgement in the EMI judging means 341. The judgement result is sent to the transmission selecting means 301, the reproduction information managing means 343, and the authenticating and decoding means 342.

When the EMI judgement result shows that EMI is "copy free," the transmission selecting means 301 does not encrypt the data, and the AV data is output without being encrypted. When EMI is not "copy free," the transmission selecting means 301 encrypts the data and outputs the encrypted data. During reproduction, the reproduction information managing means 343 updates reproduction information, and checks the judgement result of the read out EMI information.

When EMI is not "copy free," the reproduction information managing means 343 judges whether the AV data has been reproduced or not. In the case where EMI is "copy never" and reproduction has been performed, the changeover switch 346 is switched to the side of the invalid data outputting means 345 to output an invalid data such as a blue back screen or a black screen.

Next, the block number is incremented by one, or x=x+1 is set. Next, it is judged whether another command from the digital I/F means 1 is received or not. If another command is received, the process is ended. When the reproduction process is ended, reproduction information from the initial number to the final number of reproduced blocks is accessed by the reproduction information managing means 343, and updated to already-reproduction or play_flag=1. If not, the process which has been performed after the reception of the reproduction command is repeatedly performed until another command is received. The case where an AV data is to be reproduced has been described.

In the case where EMI of an AV data recorded in the hard disk apparatus is not "copy free," the AV data which is not "copy free" is allowed to be reproduced only once, by switching over the changeover switch 346 in accordance with judgement by the reproduction information managing means 343, and managing reproduction information by the reproduction information managing means 317.

The reproduction information managing means, the EMI accessing means, and the data block accessing means in the embodiments are examples of the recording means in the invention, and the EMI accessing means, the reproduction information managing means, the data block accessing means, and the changeover switches are examples of the recording means in the invention.

Embodiment 21

Next, a twenty-first embodiment will be described with reference to FIG. 51.

In the embodiment, the case where an analog monitor is connected to the STB of the eighteenth embodiment will be described.

In the embodiment, portions which are different from the eighteenth embodiment will be mainly described.

The STB serving as the transmitting apparatus of the invention comprises an AV stream decoder section 324 and a D/A converting section 325 in addition to the configuration of the eighteenth embodiment, connected to an analog monitor through an analog terminal, and configured so that a program received by the STB can be viewed or listened through the analog monitor.

The AV stream decoder section 324 is means for expanding an MPEG data output from the transport stream decoder section 321. The D/A converting section 325 is means for converting the expanded digital data into an analog signal.

Next, the operation of the embodiment will be described.

The configuration in which, with respect to a broadcast wave transmitted from a broadcasting station, a counter apparatus is selected by the transmission selecting means 301 and a data is used in accordance with the copyright has been described in the sixteenth and seventeenth embodiments. Since the analog monitor is connected to the STB, it is possible to always view or listen a data. Consequently, there arises a problem in that, when a data is output to the digital bus 354 while viewing or listening the data through the analog monitor, the copyright cannot be protected.

To comply with this, in the embodiment, when the transmission selecting means 301 enables a caching apparatus to use a data, a changeover switch 326 is turned off so that the data is not output to the analog monitor. Alternatively, the changeover switch 326 may not be used, and a data in a scrambled state may be output to the analog monitor.

In order to realize this, the mode or the group which is stored in the mode storing means 302 or the current transmission group storing means 316 constituting the transmission selecting means 301 is referred, and, when it is of a caching apparatus, the changeover switch may be turned off or a data may be scrambled as described above.

According to this configuration, it is possible to protect a copyright even when a monitor is connected to an STB.

In the embodiment, a transmitting apparatus has been described. When a similar process is applied to a caching apparatus to which a monitor is connected, a data can be output while observing a copyright.

The digital I/F means of the embodiment is an example of the outputting means in the invention, may be an IEEE 1394 interface, or may be an interface conforming to another standard.

The embodiment has been described by using mainly EMI. The invention is not restricted to this. A CGMS may be used, or both EMI and a CGMS may be used.

The caching apparatus of the invention is not restricted to the hard disk apparatus of the embodiment. Also a VCR, an optical disk apparatus, a DVD-RAM apparatus, and the like, or in summary an apparatus which can perform recording and reproduction may be used as the caching apparatus. In this case, as described in the twentieth embodiment, the recording means, the reproducing means, and the transmission selecting means in the invention must be disposed.

In the configuration example of the caching apparatus of the invention, with respect to the configuration other than the transmission selecting means 301, any configuration may be employed as far as it can realize a function of performing only once reproduction, correspondingly with EMI or a CGMS.

In the transmitting apparatus or the caching apparatus of the invention, when keys for encrypting/decoding AV data of "copy never," "copy one generation," and "no more copy" are different from each other, safety can be enhanced. The authentication methods of transferring/obtaining keys for "copy never," "copy one generation," and "no more copy" may be different from one another. For example, a public key system may be used for "copy never," and a common key system may be used for "copy one generation" and "no more copy." According to this configuration, safety is further improved.

The functions of the components of the transmitting apparatus or the caching apparatus of the invention may be realized by dedicated hardware, or alternatively by means of software of a computer.

Also a program recording medium which is characterized in that the medium stores a program for causing a computer-to execute the whole or a part of the functions of the transmitting apparatus or the caching apparatus of the invention belongs to the invention.

Industrial Applicability

As apparent from the above description, the invention can provide a recording and reproducing apparatus in which EMI is recorded in a recording process, and the user cannot easily tamper with the recorded EMI, so that an AV data cannot be unauthorizedly used.

Furthermore, the invention can provide also a recording and reproducing apparatus and a program recording medium in which, in the case where information indicative of copy right information of a program indicates copy inhibit, a user can view or listen an AV data in accordance with the intention of the author that viewing or listening is permitted only once, and the user can view or listen the AV data without limiting a time zone after the AV data is broadcast. Furthermore, the invention can provide also a recording and reproducing apparatus in which, in the case where copy right information indicates copy inhibit or allowance of copy of one generation, an AV data can be moved by reproducing only two times the data, and the user can freely select a medium on which the data is to be stored.

Furthermore, the invention can provide a caching apparatus, a transmitting apparatus, and a program recording medium in which, with respect to a copyrighted data, the copyright can be protected in accordance with the intention of the author, the data can be viewed or listened in an arbitrary time zone other than a time zone when the data is broadcast, and, even in the case where a monitor terminal is disposed and a monitor is connected to the terminal, when the data is copyrighted, the copyright can be protected in accordance with the intention of the author.

Moreover, as apparent from the above description, the invention can provide a recording and reproducing apparatus and a program recording medium in which, in the case where information indicative of copy right information of a program indicates copy inhibit, a user can view or listen an AV data in accordance with the intention of the author that viewing or listening is permitted only once, and the user can view or listen the AV data without limiting a time zone after the AV data is broadcast. Furthermore, the invention can provide also a recording and reproducing apparatus in which, in the case where copy right information indicates copy inhibit or allowance of copy of one generation, an AV data can be moved by reproducing only once the data, and the user can freely select a medium on which the data is to be stored.

Moreover, as apparent from the above description, the invention can provide a caching apparatus, a transmitting apparatus, and a program recording medium in which, with respect to a copyrighted data, the copyright can be protected in accordance with the intention of the author, the data can be viewed or listened in an arbitrary time zone other than a time zone when the data is broadcast, and, even in the case where a monitor terminal is disposed and a monitor is connected to the terminal, when the data is copyrighted, the copyright can be protected in accordance with the intention of the author.

What is claimed is:

1. A recording and reproducing apparatus characterized in that said apparatus comprises:
   recording means for recording an AV data; and
   playing back means for, in the case where the data is copyrighted, playing back only once for use in time shifting the data without changing contents of a copyright of the data which is recorded by said recording means.

2. A recording and reproducing apparatus characterized in that said apparatus comprises:
   recording means for recording an AV data; and
   playing back means for, in the case where signal information indicating copy right information of the AV data shows "copy never" allowing viewing or listening to be performed only once, playing back only once for viewing only the AV data which is recorded by said recording means.

3. A recording and reproducing apparatus characterized in that said apparatus comprises:
   recording means for recording an AV data; and
   playing back means for, in the case where signal information indicating copy right information of the AV data shows "copy one generation" allowing copying to be performed only once, playing back only once for copying the AV data while setting signal information indicating copy right information of the AV data which has been copied once by said recording means, to "copy one generation" allowing copying to be again performed only once.

4. A recording and reproducing apparatus according to claim 2 or 3, characterized in that the copy right information is held as EMI in a header of a packet according to IEEE 1394, and sent to said apparatus as a packet data on the basis of IEEE 1394.

5. A recording and reproducing apparatus according to claim 2 or 3, characterized in that the copy right information is a CGMS which is embedded into a content of a packet according to IEEE 1394, and sent to said apparatus as a packet data on the basis of IEEE 1394.

6. A recording and reproducing apparatus according to any one of claims 2 or 3, characterized in that, in the case where the copy right information shows "copy never" or "copy one generation," when the AV data is to be recorded, said recording means adds reproduction information indicating that the data has not yet been reproduced, and in the case where the copy right information shows "copy never" or "copy one generation," when the AV data is to be reproduced, said reproducing means adds the reproduction information indicating that the data has already been reproduced, to a reproduced portion of the AV data, thereby discriminating the portion from a not-yet-reproduced portion of the AV data.

7. A recording and reproducing apparatus according to any one of claims 2 or 3, characterized in that, in the case where the copy right information shows "copy never" or "copy one generation," when the AV data is to be reproduced, said reproducing means deletes allocation information relating to the AV data on a recording medium, and sets an area occupied by the AV data to a space area.

8. A recording and reproducing apparatus according to any one of claims 2 or 3, characterized in that, in the case where the copy right information shows "copy never" or "copy one generation," when the AV data is to be reproduced, said reproducing means erases a recording portion on a recording medium in which the AV data is recorded.

9. A recording and reproducing apparatus according to claim 6, characterized in that said recording means records the AV data and the reproduction information into a same area with being correlated with each other.

10. A recording and reproducing apparatus according to claim 6, characterized in that said recording means records the AV data and the reproduction information into different areas with being correlated with each other.

11. A recording and reproducing apparatus according to claim 6, characterized in that said recording means records the reproduction information into an area which a user cannot access.

12. A recording medium characterized in that said medium records the reproduction information according to claim 6.

13. A recording and reproducing apparatus according to claim 6, characterized in that, when the AV data is to be reproduced, in the case where the copy right information shows that the AV data is "copy never" or "copy one generation," when the reproduction information shows that a whole or a part of the AV data has not yet been reproduced, said reproducing means encrypts the AV data in the portion and then outputs the encrypted data.

14. A recording and reproducing apparatus according to claim 6, characterized in that, when the AV data is to be reproduced, in the case where the copy right information shows that the AV data is "copy never" or "copy one generation," when the reproduction information shows that a whole or a part of the AV data has already been reproduced, said reproducing means encrypts the AV data in the portion and then outputs the encrypted data, and does not output a key for decoding.

15. A recording a reproducing apparatus according to claim 6, characterized in that, when the AV data is to be reproduced, in the case where the copy right information shows "copy never" or "copy one generation," when the reproduction information shows that a whole or partial portion of the AV data has already been reproduced, said reproducing means does not output the AV data in the part, and outputs an invalid data.

16. A recording and reproducing apparatus according to any one of claims 2 or 3, characterized in that said apparatus has:

time-variant key producing means for producing a series of keys which are changed with a passage of time;

recording encrypting means for encrypting the AV data by using the key; and reproduction decoding means for decoding the encrypted AV data, when the AV data is to be recorded, in the case where the copy right information shows "copy never" or "copy one generation," said recording encrypting means sequentially encrypts the AV data by using the key produced by said time-variant key producing means, said recording means records the key and the AV data with correlating with each other, when the AV data is to be reproduced, in the case where the copy right information shows "copy never" or "copy one generation," said reproducing means fetches the encrypted AV data and the key, and erases a recording portion of the fetched key, and said reproduction decoding means decodes the encrypted AV data by using the fetched key.

17. A recording and reproducing apparatus according to claim 16, characterized in that, when the recording portion of the fetched key is to be erased, said reproducing means deletes an information related to a recorded position of said key on the medium.

18. A recording and reproducing apparatus according to any one of claims 2 or 3, characterized in that said apparatus has:

time-variant key producing means for producing a series of keys which are changed with a passage of time;

recording encrypting means for encrypting the AV data by using the key; and reproduction decoding means for decoding the encrypted AV data, when the AV data is to be recorded, in the case where the copy right information shows "copy never" or "copy one generation," said recording encrypting means sequentially encrypts the AV data by using the key produced by said time-variant key producing means, said recording means records the key and the AV data with correlating with each other, and performs recording with adding key reading out information indicating that the key have not yet been read out, when the AV data is to be reproduced, in the case where the copy right information shows "copy never" or "copy one generation," said reproducing means fetches the encrypted AV data and the key, and adds the key reading out information indicating that the fetched key has already been read out, and said reproduction decoding means decodes the encrypted AV data by using the fetched key.

19. A recording and reproducing apparatus according to claim 16, characterized in that said recording means records the key or the key reading out information into a same area as the AV data with being correlated with each other.

20. A recording a reproducing apparatus according to claim 16, characterized in that said recording means records the key or the key reading out information into an area different from the AV data with being correlated with each other.

21. A recording an reproducing apparatus according to claim 16, characterized in that said recording means records the key or the key reading out information into an area which a user cannot access.

22. A recording a reproducing apparatus according to claim 11, characterized in that said area which a user cannot access is an area which cannot be accessed in the unit of LBA (logical block address), an area in which an area which can be accessed in the unit of LBA is limited, an alternate sector area, an area (AUX) other than an area which is to be reproduced as an AV data, a RAM added to a recording medium, a header area of an optical disk, a power calibration area, a recording management area, a lead-in area, or a lead-out area.

23. A recording medium characterized in that said medium records the key reading out information according to claim 18.

24. A program recording medium characterized in that said medium stores a program for causing a computer to execute a whole or part of functions of said recording and reproducing apparatus according to any one of claims 2 or 3.

* * * * *